United States Patent
Katoh et al.

(10) Patent No.: US 10,989,095 B2
(45) Date of Patent: Apr. 27, 2021

(54) CONTROL DEVICE FOR INTERNAL COMBUSTION ENGINE

(71) Applicant: TOYOTA JIDOSHA KABUSHIKI KAISHA, Toyota (JP)

(72) Inventors: Kazumasa Katoh, Mishima (JP); Takahiko Fujiwara, Sunto-gun (JP); Kenji Igawa, Sunto-gun (JP); Kentaro Mineo, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/992,476

(22) Filed: Aug. 13, 2020

(65) Prior Publication Data

US 2020/0370485 A1 Nov. 26, 2020

Related U.S. Application Data

(63) Continuation of application No. 16/724,622, filed on Dec. 23, 2019.

(30) Foreign Application Priority Data

Dec. 25, 2018 (JP) .............................. JP2018-241662
Nov. 27, 2019 (JP) .............................. JP2019-214722

(51) Int. Cl.
*F01N 11/00* (2006.01)
*F02D 41/14* (2006.01)
(Continued)

(52) U.S. Cl.
CPC ........ *F01N 11/002* (2013.01); *F02D 41/1446* (2013.01); *F02N 11/0818* (2013.01);
(Continued)

(58) Field of Classification Search
CPC .... F01N 11/00; F01N 11/002; F01N 2260/22; F01N 2550/00; F01N 2550/04;
(Continued)

(56) References Cited

U.S. PATENT DOCUMENTS

| 5,860,277 A | 1/1999 | Schnaibel et al. |
| 2006/0089783 A1* | 4/2006 | Braun ................... F01N 11/005 |
| | | 701/114 |

(Continued)

FOREIGN PATENT DOCUMENTS

| CN | 107121450 A | 9/2017 |
| CN | 105089759 B | 5/2019 |

(Continued)

*Primary Examiner* — Jonathan R Matthias
(74) *Attorney, Agent, or Firm* — Oblon, McClelland, Maier & Neustadt, L.L.P.

(57) ABSTRACT

A control device comprising a first exhaust temperature calculation part calculating a temperature of exhaust flowing into a PM trapping device as a first exhaust temperature, a second exhaust temperature calculation part calculating a temperature of exhaust flowing out from the PM trapping device as a second exhaust temperature, a rate of change over time calculation part calculating a rate of change over time of the first exhaust temperature and a rate of change over time of the second exhaust temperature, and a judgment part judging if the PM trapping device is in a removed state removed from the exhaust passage based on a difference between the rate of change over time of the first exhaust temperature and the rate of change over time of the second exhaust temperature.

8 Claims, 36 Drawing Sheets

(51) Int. Cl.
*F02N 11/08* (2006.01)
*B60R 25/30* (2013.01)
*F02D 41/02* (2006.01)
*F02D 41/22* (2006.01)

(52) U.S. Cl.
CPC ............. *B60R 25/30* (2013.01); *F01N 11/005* (2013.01); *F01N 2550/24* (2013.01); *F01N 2900/0422* (2013.01); *F01N 2900/1411* (2013.01); *F02D 41/029* (2013.01); *F02D 41/1441* (2013.01); *F02D 41/22* (2013.01); *F02D 2200/0414* (2013.01); *F02D 2200/0802* (2013.01)

(58) Field of Classification Search
CPC ............. F01N 2550/24; F01N 2590/11; F01N 2900/0421; F01N 2900/0422; F01N 2900/1411; F02D 41/1446; F02N 11/0814; F02N 11/0818; F02N 11/084
See application file for complete search history.

(56) References Cited

U.S. PATENT DOCUMENTS

| | | | |
|---|---|---|---|
| 2008/0041035 A1* | 2/2008 | Sawada | F01N 11/005 60/277 |
| 2010/0050608 A1* | 3/2010 | Jayachandran | F01N 11/005 60/286 |
| 2016/0084137 A1 | 3/2016 | Cunningham et al. | |
| 2016/0265413 A1 | 9/2016 | Willimowski et al. | |
| 2016/0363069 A1 | 12/2016 | Mazzara Bologna et al. | |
| 2018/0163661 A1 | 6/2018 | Ohori et al. | |
| 2018/0283248 A1* | 10/2018 | Upadhyay | F01N 3/2066 |

FOREIGN PATENT DOCUMENTS

| | | | | |
|---|---|---|---|---|
| DE | 44 26 020 A1 | 2/1996 | | |
| DE | 10 2015 223 686 A1 | 6/2017 | | |
| EP | 2 458 167 A1 | 5/2012 | | |
| JP | 2003-65027 A | 3/2003 | | |
| JP | 2007-138837 A | 6/2007 | | |
| JP | WO2011/048632 A1 | 4/2011 | | |
| JP | 2015-194440 A | 11/2015 | | |
| JP | 2016-535831 A | 11/2016 | | |
| WO | WO-2010013365 A1 * | 2/2010 | ............ | F01N 3/2066 |
| WO | 2015/015260 A1 | 2/2015 | | |
| WO | WO 2015/059050 A1 | 4/2015 | | |

* cited by examiner

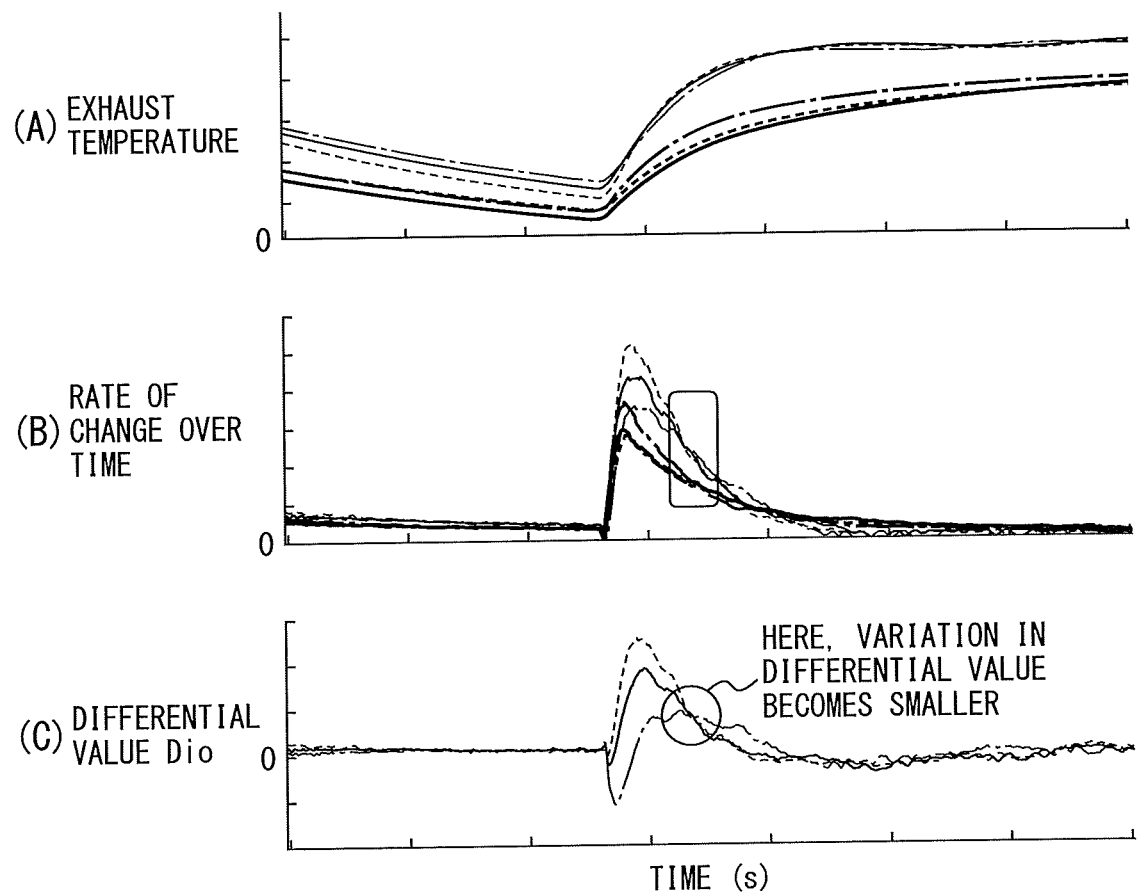

CONTROL DEVICE FOR INTERNAL COMBUSTION ENGINE

INCORPORATION BY REFERENCE

This application is a continuation of U.S. application Ser. No. 16/724,622, filed Dec. 23, 2019, which is based upon and claims the benefit of priority from Japanese Patent Application No. 2018-241662 filed on Dec. 25, 2018, and Japanese Application No. 2019-214722, filed Nov. 27, 2019, the entire contents of each of which are incorporated herein by reference.

FIELD

The present invention relates to a control device for an internal combustion engine.

BACKGROUND

Japanese Unexamined Patent Publication No. 2007-138837 discloses an anti-theft device of an exhaust after-treatment system installed in an exhaust pipe of an internal combustion engine. It detects cutting of electrical wiring of a temperature sensor attached to the exhaust after-treatment system so as to detect removal of the exhaust after-treatment system from the exhaust pipe.

SUMMARY

However, in the above-mentioned conventional anti-theft device of an exhaust after-treatment system, there is the problem that if the exhaust after-treatment system is removed from the exhaust pipe without cutting the electrical wiring of the temperature sensor, it is not possible to detect the removal of the exhaust after-treatment system from the exhaust pipe.

The present invention was made focusing on such a problem and has as its object to utilize a heat capacity of an exhaust after-treatment system to detect if the exhaust after-treatment system has been removed from the exhaust pipe.

To solve the above problem, the internal combustion engine according to one aspect of the present invention is provided with an engine body and an exhaust after-treatment system installed in an exhaust passage of the engine body. Further, a control device for this internal combustion engine comprises a first exhaust temperature calculation part configured to calculate a temperature of exhaust flowing into the exhaust after-treatment system as a first exhaust temperature, a second exhaust temperature calculation part configured to calculate a temperature of exhaust flowing out from the exhaust after-treatment system as a second exhaust temperature, a rate of change over time calculation part configured to calculate a rate of change over time of the first exhaust temperature and a rate of change overtime of the second exhaust temperature, and a judgment part configured to judge if a state is a removed state where the exhaust after-treatment system is removed from the exhaust passage based on the difference between the rate of change over time of the first exhaust temperature and the rate of change over time of the second exhaust temperature.

According to this aspect of the present invention, it is possible to utilize a heat capacity of an exhaust after-treatment system to detect removal of an exhaust after-treatment system from an exhaust pipe.

BRIEF DESCRIPTION OF DRAWINGS

FIG. 30B is a time chart showing, for each response speed of each exhaust temperature sensor, the temperature changes etc. of a first exhaust temperature and a second exhaust temperature at a time of acceleration in a case where the internal combustion engine is being operated in a normal state where the PM trapping device is not removed.

DESCRIPTION OF EMBODIMENTS

Figure 1:
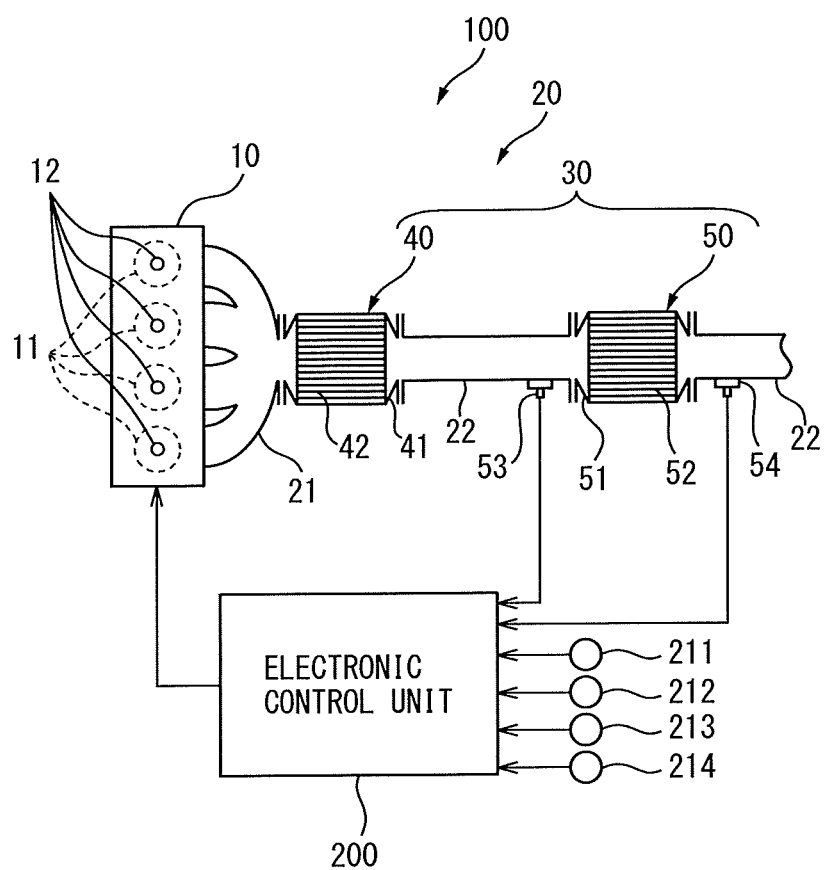
FIG. 1 is a schematic view of the configuration of an internal combustion engine according to a first embodiment of the present invention and an electronic control unit for controlling the internal combustion engine.

Below, referring to the drawings, embodiments of the present invention will be explained in detail. Note that, in the following explanation, similar component elements will be assigned the same reference signs.

First Embodiment

FIG. 1 is a schematic view of the configuration of an internal combustion engine 100 and an electronic control unit 200 for controlling the internal combustion engine 100 according to a first embodiment of the present invention.

The internal combustion engine 100 according to the present embodiment is a spark ignition type gasoline engine provided with an engine body 10 including a plurality of cylinders 11 and with an exhaust system 20. Note that, the type of the internal combustion engine 100 is not particularly limited and may also be a premix charged compressive ignition type gasoline engine or may be a diesel engine.

The engine body 10 burns fuel injected from fuel injectors 12 at the inside of the cylinders 11 to thereby, for example, generate power for driving the vehicle etc. Note that, in FIG. 1, to keep the figure from becoming complicated, illustration of the intake system, spark plugs, etc. is omitted. Further, the fuel injection system is not limited to a direct injection system and may also be a port injection system.

The exhaust system 20 is a system for purifying exhaust gas (combustion gas) produced inside the cylinders 11 and discharging it into the outside air and is provided with an exhaust manifold 21, exhaust pipe 22, and exhaust aftertreatment system 30.

The exhaust produced in the cylinders 11 of the engine body 10 is collected by the exhaust manifold 21 and discharged into the exhaust pipe 22. The exhaust contains unburned gases (carbon monoxide (CO) and hydrocarbons (HC)) and nitrogen oxides ($NO_X$), particulate matter (PM), and other harmful substances. For this reason, in the present embodiment, the exhaust pipe 22 is provided with a catalyst device 40 and PM trapping device 50 as an exhaust aftertreatment system 30 for removing these harmful substances in the exhaust. Further, in the present embodiment, a first exhaust temperature sensor 53 and a second exhaust temperature sensor 54 are provided in the exhaust pipe 22 before and after the PM trapping device 50.

The catalyst device 40 is provided with a casing 41 and an exhaust purification catalyst 42 supported on a honeycomb shaped support made of cordierite (ceramic) held inside the casing 41. The exhaust purification catalyst 42 is, for example, an oxidation catalyst (two-way catalyst) or three-way catalyst. The invention is not limited to these. A suitable catalyst can be used in accordance with the type or application of the internal combustion engine 100. In the present embodiment, a three-way catalyst is used as the exhaust purification catalyst 42. If using a three-way catalyst as the exhaust purification catalyst 42, the unburned gases (CO and HC) and $NO_X$ in the exhaust flowing into the catalyst device 40 are removed by the exhaust purification catalyst 42.

The PM trapping device 50 is provided in the exhaust pipe 22 at the downstream side from the catalyst device 40 in the direction of exhaust flow. The PM trapping device 50 is provided with a casing 51 and a wall flow type of filter 52 held inside the casing 51. Due to the filter 52, the PM in the exhaust flowing into the PM trapping device 50 is trapped. Further, in the present embodiment, this filter 52 as well is made to support a three-way catalyst as an exhaust purification catalyst. Due to this, in the PM trapping device 50 as well, it is made possible to remove the unburned gases and $NO_x$ in the exhaust flowing into the PM trapping device 50. Note that, the exhaust purification catalyst supported at the filter 52 is not limited to a three-way catalyst. It is possible to use a suitable catalyst in accordance with the type or application of the internal combustion engine 100.

In the case where the internal combustion engine 100 is a gasoline engine, the PM trapping device 50 is sometimes called a "GPF (gasoline particulate filter)", while in the case where the internal combustion engine 100 is a diesel engine, it is sometimes called a "DPF (diesel particulate filter)".

The first exhaust temperature sensor 53 is a sensor for detecting the temperature of the exhaust flowing in to the inside of the PM trapping device 50 (below, referred to as the "first exhaust temperature"). In the present embodiment, the first exhaust temperature sensor 53 is attached to the exhaust pipe 22 in the vicinity of the inlet side of the PM trapping device 50.

The second exhaust temperature sensor 54 detects the temperature of the exhaust flowing out from the PM trapping device 50 (below, referred to as the "second exhaust temperature"). In the present embodiment, the second exhaust temperature sensor 54 is attached to the exhaust pipe 22 in the vicinity of the outlet of the PM trapping device 50.

The electronic control unit 200 is a microcomputer provided with components connected with each other by a bidirectional bus such as a central processing unit (CPU), read only memory (ROM) or random access memory (RAM) or various other memories, an input port, and an output port.

The electronic control unit 200 receives as input the output signals from various types of sensors such as the above-mentioned first exhaust temperature sensor 53 and second exhaust temperature sensor 54 plus an air flow meter 211 for detecting the flow rate of intake air Ga [g/s] being taken into the engine body 10, an outside air temperature sensor 212 for detecting the outside air temperature, a load sensor 213 generating an output voltage proportional to the amount of depression of an accelerator pedal (not shown) corresponding to the load of the engine body 10 (engine load), and a crank angle sensor 214 generating an output pulse each time a crankshaft (not shown) of the engine body 10 for example rotates by 15° as a signal for calculating the engine speed etc.

The electronic control unit 200 controls the fuel injectors 12 etc. to control the internal combustion engine 100 based on output signals of the various types of sensors which are input etc.

Further, the electronic control unit 200 performs self diagnosis for detecting abnormalities in the exhaust system 20 so that the internal combustion engine 100 is not operated in a state where the amount of discharge of harmful substances discharged through the exhaust system 20 into the outside air has exceeded the control values set by the government etc.

For example, if the internal combustion engine 100 is operated in the removed state where the PM trapping device 50 has been removed (state where piping of same size as exhaust pipe 22 has been connected in place of the PM trapping device 50 due to theft or vehicle remodeling etc. at the position where the PM trapping device 50 had been attached), the amount of discharge of PM discharged through the exhaust system 20 into the outside air will be liable to exceed the control value. Therefore, the present embodiment performs self diagnosis as to whether the internal combustion engine 100 is being operated in the removed state where the PM trapping device 50 has been removed, that is, performs diagnosis of removal of whether the PM trapping device 50 has been removed.

Below, details of the diagnosis of removal of the PM trapping device 50 according to the present embodiment will be explained with reference to FIG. 2 and FIG. 3.

Figure 2:
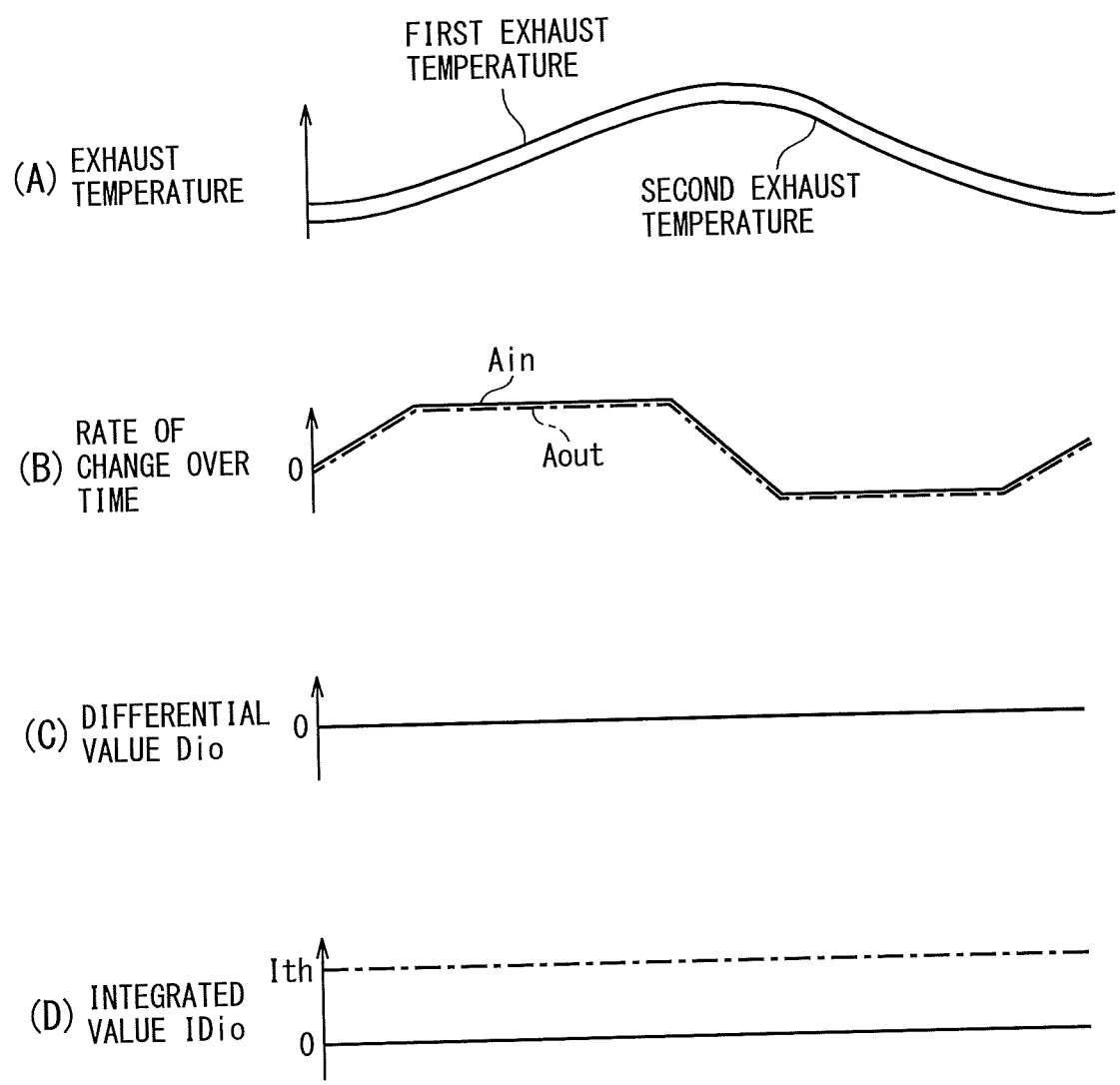
FIG. 2 is a view showing a temperature change etc. of a first exhaust temperature and a second exhaust temperature when operating an internal combustion engine in a removed state where a PM trapping device is removed.
Figure 3:
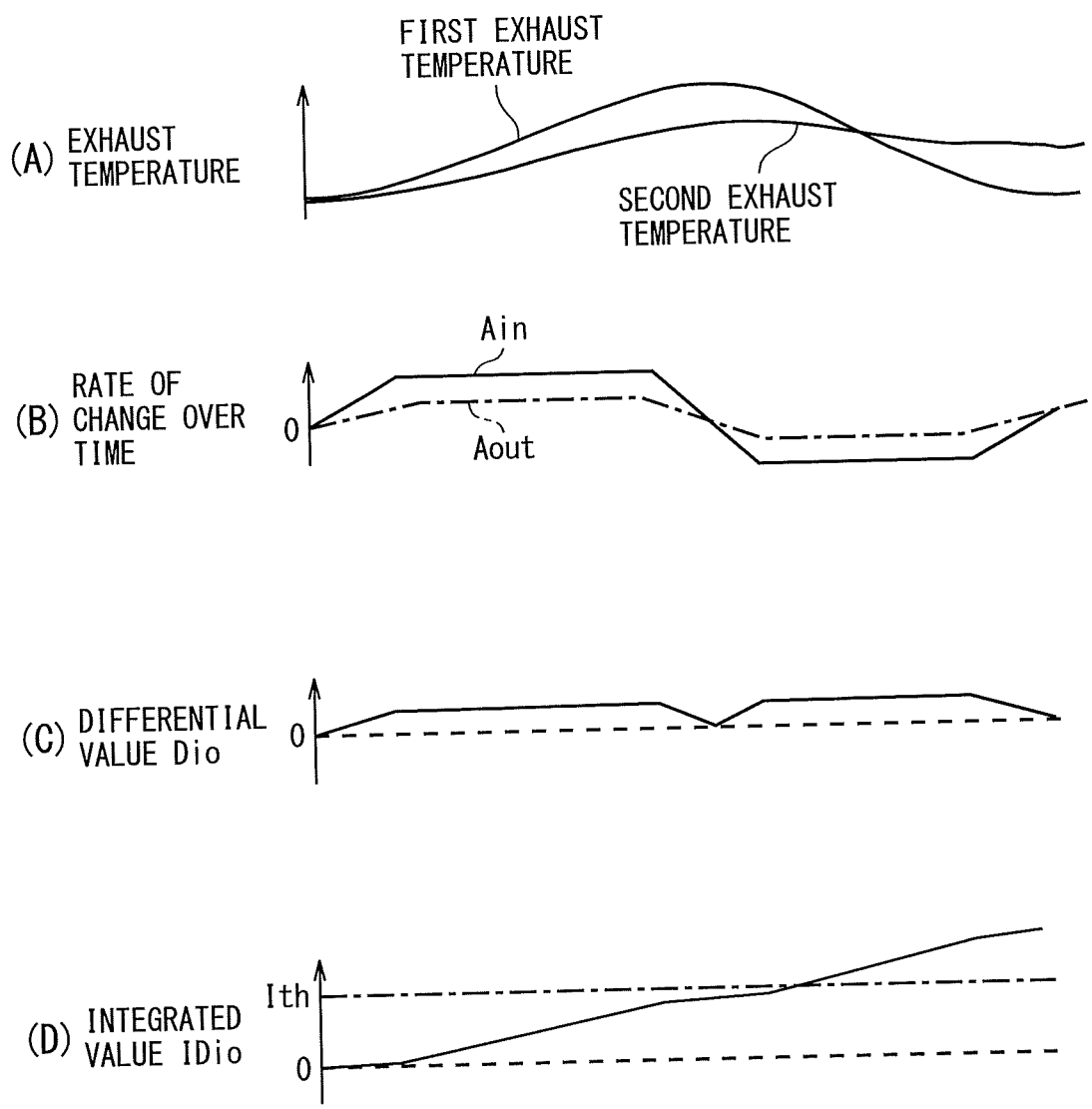
FIG. 3 is a view showing a temperature change etc. of a first exhaust temperature and a second exhaust temperature when operating an internal combustion engine in a normal state where a PM trapping device is not removed.

FIG. 2 is a time chart showing the changes in temperature of the first exhaust temperature and the second exhaust temperature etc. when the internal combustion engine 100 has been operated in the removed state where the PM trapping device 50 has been removed. On the other hand, FIG. 3 is a time chart showing the changes in temperature of the first exhaust temperature and the second exhaust temperature etc. when the internal combustion engine 100 has been operated in the normal state where the PM trapping device 50 has not been removed.

As shown in FIG. 2(A), in the removed state where the PM trapping device 50 has been removed, the heat of the exhaust flowing from the first exhaust temperature sensor 53 to the second exhaust temperature sensor 54 is just discharged to the outside air through piping connected to the position where the PM trapping device 50 had been attached, so although the second exhaust temperature becomes lower than the first exhaust temperature, the shape of the curve of temperature change of the second exhaust temperature becomes substantially the same shape as the shape of the curve of temperature change of the first exhaust temperature.

For this reason, as shown in FIG. 2(B), the rate of change over time Ain of the first exhaust temperature [° C./s] (that is, the slant of the curve of temperature change of the first exhaust temperature) and the rate of change over time Aout of the second exhaust temperature [° C./s] (that is, the slant of the curve of temperature change of the second exhaust temperature) become substantially the same values. As shown in FIG. 2(C), the differential value Dio of the absolute value of the rate of change over time Ain of the first exhaust temperature and the absolute value of the rate of change over time Aout of the second exhaust temperature basically becomes zero.

As a result, in the removed state where the PM trapping device 50 has been removed, as shown in FIG. 2(D), an integrated value IDio of the differential value Dio also basically becomes zero (or a value close to zero).

As opposed to this, as shown in FIG. 3(A), in the normal state where the PM trapping device 50 has not been removed, the temperature change of the second exhaust temperature becomes more moderate than the temperature change of the first exhaust temperature by exactly the amount of the heat capacity of the PM trapping device 50.

For example, as shown in FIG. 3(A), in the case where the first exhaust temperature is rising, when the temperature of the PM trapping device 50 is lower than the first exhaust temperature, heat of the exhaust flowing into the PM trapping device 50 is robbed by the PM trapping device 50, so the amount of rise of the second exhaust temperature becomes smaller than the amount of rise of the first exhaust temperature. Therefore, as shown in FIG. 3(B), if comparing the absolute value of the rate of change over time Ain of the first exhaust temperature and the absolute value of the rate of change over time Aout of the second exhaust temperature, the absolute value of the rate of change over time Aout of the second exhaust temperature becomes smaller than the absolute value of the rate of change over time Ain of the first exhaust temperature.

Further, in the case where the first exhaust temperature is falling, when the temperature of the PM trapping device 50 is higher than the first exhaust temperature, the exhaust flowing into the PM trapping device 50 receives heat from the PM trapping device 50, so the extent of drop of the second exhaust temperature becomes smaller than the amount of drop of the first exhaust temperature. Therefore, as shown in FIG. 3(B), if comparing the absolute value of the rate of change over time Ain of the first exhaust temperature and the absolute value of the rate of change over time Aout of the second exhaust temperature, the absolute value of the rate of change over time Aout of the second exhaust temperature becomes smaller than the absolute value of the rate of change over time Ain of the first exhaust temperature.

For this reason, as shown in FIG. 3(B), the rate of change over time Ain of the first exhaust temperature and the rate of change over time Aout of the second exhaust temperature do not become the same value and, as shown in FIG. 3(C), the differential value Dio arises. As a result, in the normal state where the PM trapping device 50 has not been removed, as shown in FIG. 3(D), an integrated value IDio of the differential value Dio gradually becomes larger.

Therefore, during operation of the internal combustion engine 100, if an integrated value IDio of the differential value Dio of the absolute value of the rate of change over time Ain of the first exhaust temperature and the absolute value of the rate of change over time Aout of the second exhaust temperature in a certain constant time period is less than a predetermined threshold value Ith, it is possible to judge that the state is a removed state where the PM trapping device 50 has been removed.

In this way, in the present embodiment, whether the state is a removed state is judged based on the difference between the rate of change over time Ain of the first exhaust temperature and the rate of change over time Aout of the second exhaust temperature, but, for example, it may also be considered to judge whether the state is a removed state just based on the temperature difference between the first exhaust temperature and the second exhaust temperature. However, the inventors engaged in intensive research and as a result learned that the following problem arises with this latter method.

That is, the first exhaust temperature sensor 53 and the second exhaust temperature sensor 54, for example, sometimes cannot be attached near the PM trapping device 50 due to mounting space or problems with heat resistance. If so, for example, if the first exhaust temperature sensor 53 has been attached to a position away from the inlet of the PM trapping device 50, the temperature of the exhaust will fall in the process of the exhaust flowing through the exhaust pipe 22 from the first exhaust temperature sensor 53 to the PM trapping device 50 due to heat being radiated from the exhaust pipe 22. Further, if the second exhaust temperature sensor 54 has been attached to a position away from the PM trapping device 50, the temperature of the exhaust will fall in the process of the exhaust flowing through the exhaust pipe 22 from the PM trapping device 50 to the second exhaust temperature sensor 54 due to heat being radiated from the exhaust pipe 22.

Therefore, the further the positions of attachment of the exhaust temperature sensors 53 and 54 from the PM trapping device 50, the greater the error between the temperature difference of the first exhaust temperature and the second exhaust temperature detected by the exhaust temperature sensors 53 and 54 and the actual temperature difference arising before and after the PM trapping device 50. As a result, the further the positions of attachment of the exhaust temperature sensors 53 and 54 from the PM trapping device 50, the higher the possibility of mistakenly judging the state to be a removed state regardless of the state being a normal state or of mistakenly judging the state to be a normal state regardless of the state being a removed state.

If, in this way, trying to judge whether the state is a removed state just based on the temperature difference between the first exhaust temperature and the second exhaust temperature, the problem arises that the further the positions of attachment of the first exhaust temperature sensor 53 and the second exhaust temperature sensor 54 from the PM trapping device 50, the worse the accuracy of judgment due to the effect of heat radiated from the exhaust pipe 22.

As opposed to this, if considering the rate of change over time Ain of the first exhaust temperature, that is, the slant of the curve of temperature change of the first exhaust temperature, since the amount of heat radiated from the exhaust pipe 22 per unit length is basically constant, even if the first exhaust temperature sensor 53 had been attached to a position away from the inlet of the PM trapping device 50, the slant of the curve of temperature change of the first exhaust temperature in the process of exhaust flowing through the exhaust pipe 22 from the first exhaust temperature sensor 53 to the inlet of the PM trapping device 50 becomes basically constant. For this reason, the difference between the slant of the curve of temperature change of the first exhaust temperature at the position separated from the inlet of the PM trapping device 50 and the slant of the curve of temperature change of the first exhaust temperature near the inlet of the PM trapping device 50 is small.

Further, if considering the rate of change over time Aout of the second exhaust temperature, that is, the slant of the curve of temperature change of the second exhaust temperature, a certain degree of distance (time) is required until the slant of the curve of temperature change of the second exhaust temperature changes to the slant affected by the radiation of heat from the exhaust pipe 22 in the process of exhaust gas flowing through the exhaust pipe 22 from the outlet of the PM trapping device 50 to the second exhaust temperature sensor 54. For this reason, the difference between the slant of the curve of temperature change of the second exhaust temperature near the outlet of the PM trapping device 50 and the slant of the curve of temperature change of the second exhaust temperature at a position a certain degree of distance away from the outlet of the PM trapping device 50 is also small.

Therefore, by judging whether the state is a removed state based on the difference between the rate of change over time Ain of the first exhaust temperature and the rate of change over time Aout of the second exhaust temperature like in the present embodiment, it is possible to more accurately judge whether the state is a removed state than when judging whether the state is a removed state based simply on the temperature difference between the first exhaust temperature and the second exhaust temperature.

Figure 4:
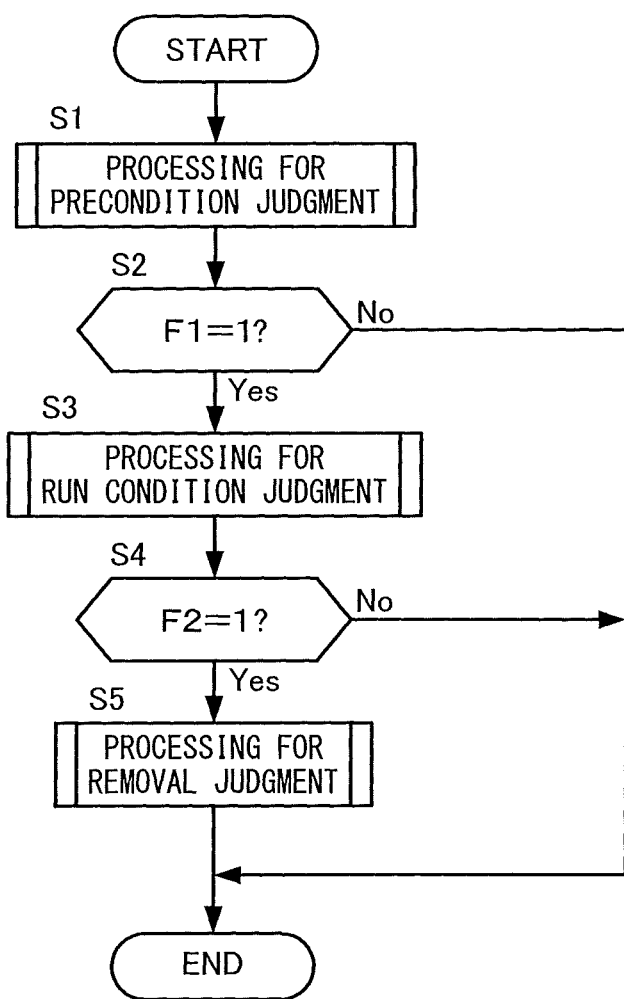
FIG. 4 is a flow chart for explaining control for removal diagnosis for diagnosing removal of a PM trapping device according to the first embodiment of the present invention.

FIG. 4 is a flowchart for explaining diagnosis of removal for diagnosing removal of the PM trapping device 50 according to this present embodiment.

At step S1, the electronic control unit 200 performs processing for precondition judgment for judging if a precondition for detecting removal of the PM trapping device 50 stands. Details of the processing for precondition judgment will be explained later with reference to FIG. 5.

At step S2, the electronic control unit 200 judges if a precondition standing flag F1 has been set to "1". The precondition standing flag F1 is a flag set to "1" or "0" in the processing for precondition judgment. The initial value of the precondition standing flag F1 is set to "0". The flag is set to "1" when it is judged in the processing for precondition judgment that the precondition for detecting removal of the PM trapping device 50 stands. If the precondition standing flag F1 is set to "1", the electronic control unit 200 proceeds to the processing of step S3. On the other hand, if the precondition standing flag F1 is set to "0", the electronic control unit 200 ends the current processing.

At step S3, the electronic control unit 200 performs processing for run condition judgment for judging if a run condition for accurately detecting removal of the PM trapping device 50 stands. Details of the processing for run condition judgment will be explained later with reference to FIG. 6.

At step S4, the electronic control unit 200 judges if a run condition standing flag F2 has been set to "1". The run condition standing flag F2 is a flag set to "1" or "0" in the processing for run condition judgment. The initial value of the run condition standing flag F2 is set to "0". The flag is set to "1" when it is judged that the run condition for accurately detecting removal of the PM trapping device 50 stands in the processing for run condition judgment. If the run condition standing flag F2 is set to "1", the electronic control unit 200 proceeds to the processing of step S5. On the other hand, if the run condition standing flag F2 is set to "0", the electronic control unit 200 ends the current processing.

At step S5, the electronic control unit 200 performs processing for removal judgment for judging if the PM trapping device 50 has been removed. Details of the processing for removal judgment will be explained later with reference to FIG. 7.

Figure 5:
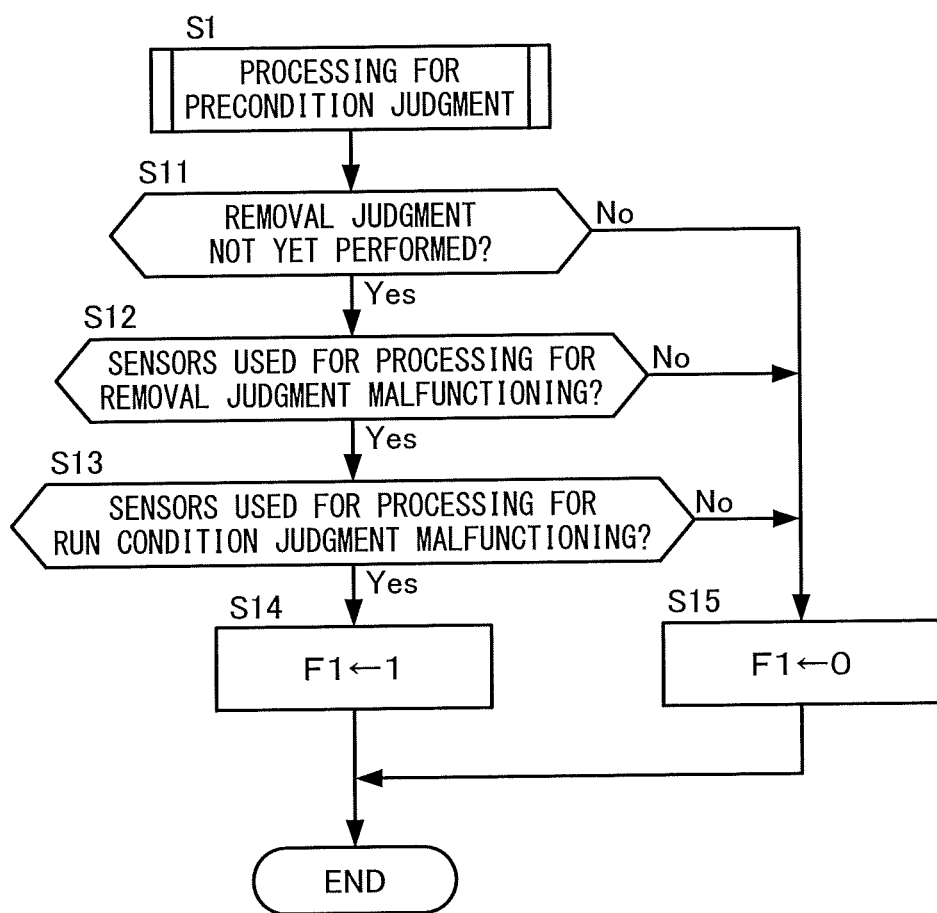
FIG. 5 is a flow chart for explaining details of processing for precondition judgment according to the first embodiment of the present invention.

FIG. 5 is a flowchart for explaining details of processing for precondition judgment.

At step S11, the electronic control unit 200 judges if judgment as to whether the PM trapping device 50 has been removed has still not been performed in a current trip (during one trip of vehicle). In the present embodiment, if the run completion flag F3 of the later explained processing for removal judgment (see FIG. 7) is set to "0", the electronic control unit 200 judges that judgment as to whether the PM trapping device 50 has been removed has still not been performed in the current trip and proceeds to the processing of step S12. On the other hand, if the run completion flag F3 of the later explained processing for removal judgment is set to "1", the electronic control unit 200 judges that judgment as to whether the PM trapping device 50 has been removed has already been performed during the current trip and proceeds to the processing of step S15.

At step S12, the electronic control unit 200 judges if the sensors required for calculating parameters used for performing the processing for removal judgment might have malfunctioned. In the present embodiment, the electronic control unit 200 judges whether the first exhaust temperature sensor 53 and the second exhaust temperature sensor 54 might have malfunctioned. If the first exhaust temperature sensor 53 and the second exhaust temperature sensor 54 have not malfunctioned, the electronic control unit 200 proceeds to the processing of step S13. On the other hand, if either of the first exhaust temperature sensor 53 or the second exhaust temperature sensor 54 has malfunctioned, the electronic control unit 200 proceeds to the processing of step S15.

At step S13, the electronic control unit 200 judges if the sensors used for judging if the run condition stands in the processing for run condition judgment might have malfunctioned. In the present embodiment, the electronic control unit 200 judges whether the first exhaust temperature sensor 53, air flow meter 211, and outside air temperature sensor 212 might have malfunctioned. If the first exhaust temperature sensor 53, air flow meter 211, and outside air temperature sensor 212 have not malfunctioned, the electronic control unit 200 proceeds to the processing of step S14. On the other hand, if any one of the first exhaust temperature sensor 53, air flow meter 211, or outside air temperature sensor 212 has malfunctioned, the electronic control unit 200 proceeds to the processing of step S15.

At step S14, the electronic control unit 200 sets the precondition standing flag F1 to "1".

At step S15, the electronic control unit 200 sets the precondition standing flag F1 to "0".

Figure 6:
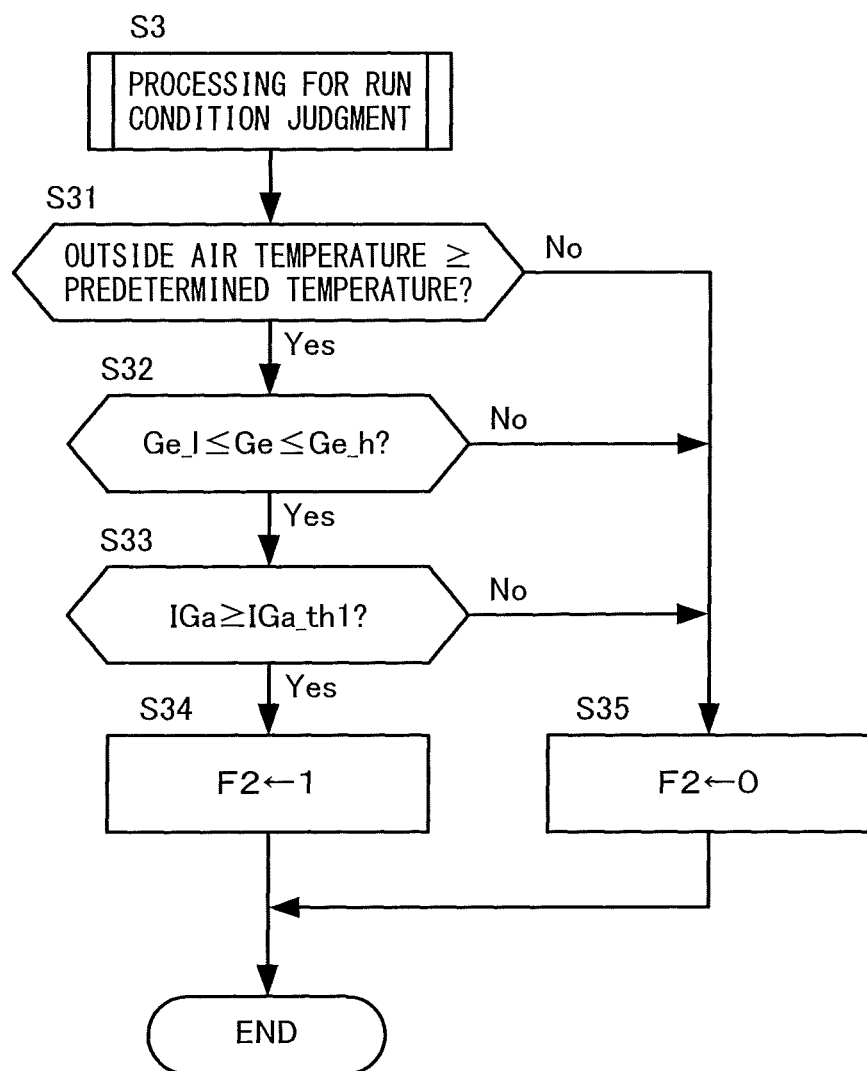
FIG. 6 is a flow chart for explaining details of processing for run condition judgment according to the first embodiment of the present invention.

FIG. 6 is a flowchart for explaining details of processing for run condition judgment.

At step S31, the electronic control unit 200 judges if the outside air temperature calculated based on the detection value of the outside air temperature sensor 212 is a predetermined temperature (for example, −15[° C.]) or more. If the outside air temperature is the predetermined temperature or more, the electronic control unit 200 proceeds to the processing of step S32. On the other hand, if the outside air temperature is less than the predetermined temperature, the electronic control unit 200 proceeds to the processing of step S35. Note that, such a judgment is performed due to the following reason.

As explained above, in the removed state where the PM trapping device 50 has been removed, the heat of the exhaust flowing from the first exhaust temperature sensor 53 to the second exhaust temperature sensor 54 is radiated to the outside air through the piping which was connected to the position where the PM trapping device 50 had been attached. At this time, when the outside air temperature is low, the amount of heat radiated to the outside air becomes greater compared to when it is high. For this reason, when the outside air temperature is low, due to the effect of the amount of heat radiated to the outside air becoming greater, the shape of the curve of temperature change of the second exhaust temperature at the time of the removed state is liable to not become the same shape as the shape of the curve of temperature change of the first exhaust temperature and the accuracy of the judgment of whether the state is a removed state is liable to fall.

At step S32, the electronic control unit 200 judges if the flow rate Ge [g/s] of exhaust flowing into the PM trapping device 50 (below, referred to as the "exhaust flow rate") falls within a predetermined range. If the exhaust flow rate Ge falls within a predetermined range, the electronic control unit 200 proceeds to the processing of step S33. On the other hand, if the exhaust flow rate Ge does not fall within the predetermined range, the electronic control unit 200 proceeds to the processing of step S35.

The reason why this judgment is performed is that detecting a change of temperature of the first exhaust temperature and the second exhaust temperature requires at least the exhaust flowing into the PM trapping device 50, and that the greater the exhaust flow rate Ge, even if heat is robbed by the PM trapping device 50 or conversely heat is received from the PM trapping device 50, the change of temperature of the exhaust passing through the PM trapping device 50 will become smaller. That is, at the time of the normal state where the PM trapping device 50 has not been removed, if the exhaust flow rate Ge becomes greater, it will become harder to discern a difference between the rate of change over time Ain of the first exhaust temperature and the rate of change over time Aout of the second exhaust temperature and the accuracy of judgment of whether the state is a removed state is liable to fall.

In the present embodiment, at step S32, the electronic control unit 200 judges if the following formula (1) has been satisfied, that is, if the exhaust flow rate Ge is a predetermined lower limit flow rate Ge_l (for example, 2 [g/s]) or more and a predetermined upper limit flow rate Ge_h (for example, 20 [g/s]) or less.

$$Ge\_l \leq Ge \leq Ge\_h \tag{1}$$

Note that the exhaust flow rate Ge may simply be made the flow rate of intake air Ga [g/s] calculated based on the detection value of the air flow meter 211, but in the present embodiment, the sum of the flow rate of intake air Ga and the mass flow rate Gf [g/s] of the fuel ejected from the fuel injectors 12 is calculated as the exhaust flow rate Ge (=Ga+Gf).

At step S33, the electronic control unit 200 judges if an integrated value IGa of the flow rate of intake air Ga from startup of the internal combustion engine 100 is a predetermined first integrated value IGa_th1 or more. The "startup of the internal combustion engine 100" for example includes restart in the case where the internal combustion engine 100 is started and stopped a plurality of times during one trip in a vehicle provided with an idling stop function or in a hybrid vehicle. If the integrated value IGa from startup of the internal combustion engine 100 is the first integrated value IGa_th1 or more, the electronic control unit 200 proceeds to the processing of step S34. On the other hand, if the integrated value IGa from startup of the internal combustion engine 100 is less than the first integrated value IGa_th1, the electronic control unit 200 proceeds to the processing of step S35.

Note that, such a judgment is performed for the following reason. That is, right after the startup of the internal combustion engine 100, in the removed state where the PM trapping device 50 has been removed, the piping connected to the position where the PM trapping device 50 had been attached is relatively low in temperature, so the amount of discharge of heat from this piping tends to become great. For this reason, in the same way as when the outside air temperature is low, the shape of the curve of temperature change of the second exhaust temperature at the time of the removed state is liable to not become the same shape as the shape of the curve of temperature change of the first exhaust temperature and the accuracy of judgment of whether the state is a removed state is liable to fall. Note that the first integrated value IGa_th1 is made a predetermined constant value in the present embodiment, but, for example, it may also be made a variable value becoming larger the longer the stopped time of the internal combustion engine 100.

At step S34, the electronic control unit 200 sets the run condition standing flag F2 to "1".

At step S35, the electronic control unit 200 sets the run condition standing flag F2 to "0".

Figure 7:
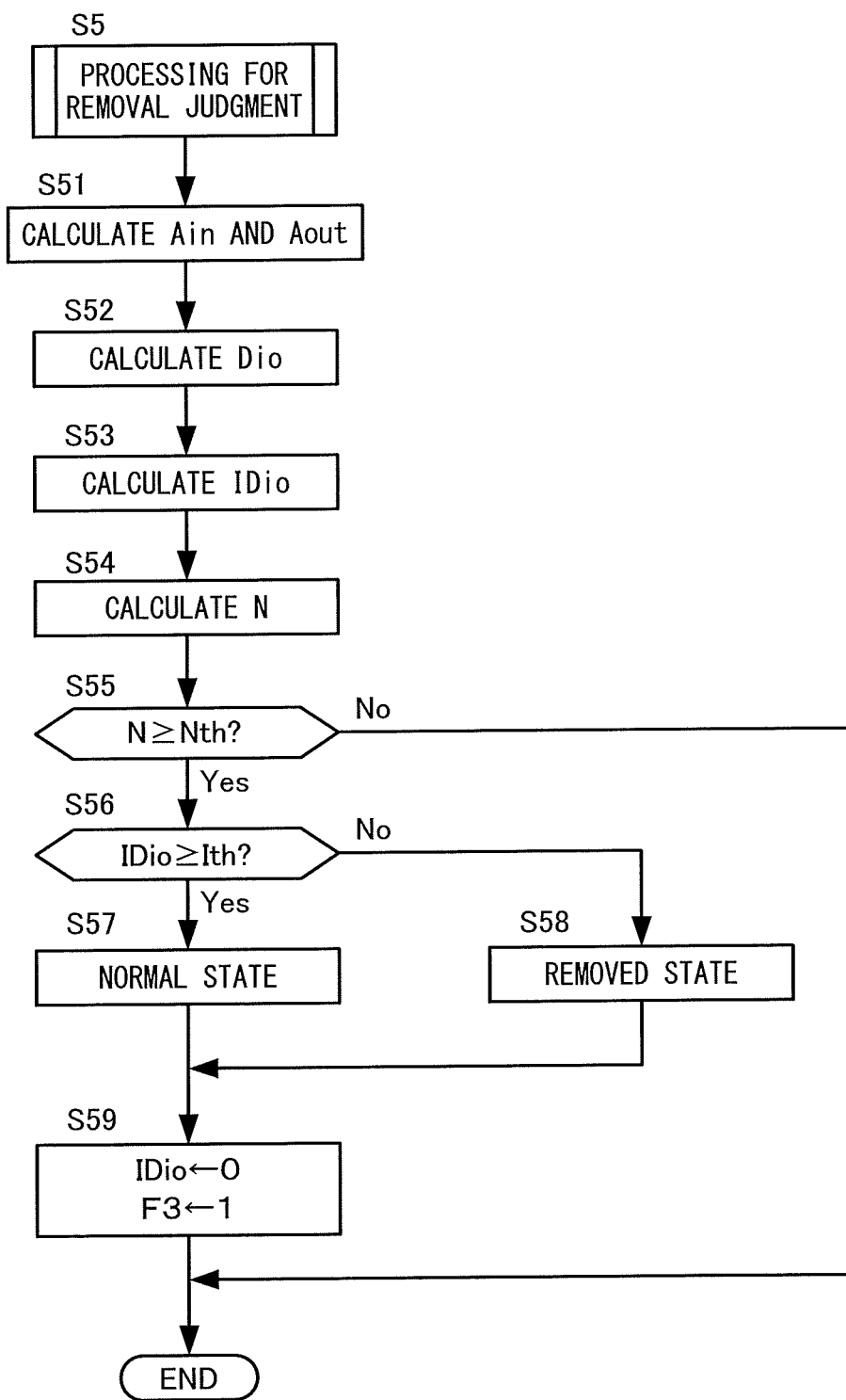
FIG. 7 is a flow chart for explaining details of processing for removal judgment according to the first embodiment of the present invention.

FIG. 7 is a flowchart for explaining details of the processing for removal judgment.

At step S5, the electronic control unit 200 calculates the rate of change overtime Ain of the first exhaust temperature based on the detection value of the first exhaust temperature sensor 53 and calculates the rate of change over time Aout of the second exhaust temperature based on the detection value of the second exhaust temperature sensor 54.

At step S52, the electronic control unit 200 calculates the differential value Dio (=|Ain|−|Aout|) between the absolute value of the rate of change over time Ain of the first exhaust temperature and the absolute value of the rate of change over time Aout of the second exhaust temperature.

At step S53, the electronic control unit 200 calculates an integrated value IDio of the differential value Dio (=IDio (previous value)+Dio).

At step S54, the electronic control unit 200 calculates the number of samples N (=N (previous value)+1) of the differential value Dio used when calculating the integrated value IDio, that is, the number of values of the differential value Dio integrated.

At step S55, the electronic control unit 200 judges if the number of samples N is a predetermined number Nth or more. If the number of samples N is the predetermined number Nth or more, the electronic control unit 200 proceeds to the processing of step S56. On the other hand, if the number of samples N is less than the predetermined number Nth, the electronic control unit 200 ends the current processing.

At step S56, the electronic control unit 200 judges if the integrated value IDio is a predetermined threshold value Ith or more. If the integrated value IDio is the predetermined threshold value Ith or more, the electronic control unit 200 proceeds to the processing of step S57. On the other hand, if the integrated value IDio is less than the predetermined threshold value Ith, the electronic control unit 200 proceeds to the processing of step S58.

At step S57, the electronic control unit 200 judges that the state is a normal state where the PM trapping device 50 has not been removed.

At step S58, the electronic control unit 200 judges that the state is a removed state where the PM trapping device has been removed.

At step S59, the electronic control unit 200 returns the integrated value IDio to the initial value of zero and sets the run completion flag F3 of the processing for removal judgment to 1. The run completion flag F3 of the processing for removal judgment is returned to the initial value of 0 at the time of the end of the trip or the time of the start.

The internal combustion engine 100 according to the present embodiment explained above is provided with the engine body 10 and the PM trapping device 50 as the exhaust after-treatment system 30 provided in the exhaust pipe 22 (exhaust passage) of the engine body 10.

Further, the electronic control unit 200 (control device) for controlling this internal combustion engine 100 is provided with a first exhaust temperature calculation part calculating the temperature of the exhaust flowing into the PM trapping device 50 as a first exhaust temperature, a second exhaust temperature calculation part calculating the temperature of the exhaust flowing out from the PM trapping device 50 as a second exhaust temperature, a rate of change over time calculation part calculating a rate of change over time Ain of the first exhaust temperature and a rate of change over time Aout of the second exhaust temperature, and a judgment part judging if the state is a removed state where the PM trapping device 50 has been removed from the exhaust pipe 22 based on the difference between the rate of change over time Ain of the first exhaust temperature and the rate of change over time Aout of the second exhaust temperature.

Note that in the present embodiment, the first exhaust temperature calculation part calculates the first exhaust temperature based on the detection value of the first exhaust temperature sensor 53 provided in the exhaust pipe 22 at the upstream side of the PM trapping device 50 in the direction of exhaust flow. Further, the second exhaust temperature calculation part calculates the second exhaust temperature based on the detection value of the second exhaust temperature sensor 54 provided in the exhaust pipe 22 at the downstream side from the PM trapping device 50 in the direction of exhaust flow.

By judging if the state is a removed state based on the difference between the rate of change over time Ain of the first exhaust temperature and the rate of change over time Aout of the second exhaust temperature in this way, it is possible to utilize the heat capacity of the PM trapping device 50 to accurately detect removal of the PM trapping device 50 from the exhaust pipe 22.

Further, by judging if the state is a removed state based on the difference between the rate of change over time Ain of the first exhaust temperature and the rate of change over time Aout of the second exhaust temperature in this way, even if the position of attachment of the first exhaust temperature sensor 53 and the second exhaust temperature sensor 54 is away from the PM trapping device 50, it is possible to accurately judge if the state is a removed state compared with when judging if the state is a removed state based on simply the temperature difference between the first exhaust temperature and the second exhaust temperature.

Further, the first exhaust temperature sensor 53 and the second exhaust temperature sensor 54 sometimes vary in their detection values within ranges of allowable error for individual sensors due to individual differences. Therefore, if judging if the state is a removed state based on the temperature difference between the first exhaust temperature and the second exhaust temperature, the accuracy of judgment is liable to fall due to the effect of the variations in detection values due to such individual differences in the first exhaust temperature sensor 53 and the second exhaust temperature sensor 54. As opposed to this, by judging if the state is a removed state based on the difference between the rate of change over time Ain of the first exhaust temperature and the rate of change over time Aout of the second exhaust temperature like in the present embodiment, it is possible to eliminate the variation in detection values arising due to such individual differences, so it is possible to keep the accuracy of judgment from falling.

The judgment part according to the present embodiment more specifically is provided with a differential value calculation part calculating a differential value Dio of the absolute value of the rate of change over time Ain of the first exhaust temperature and the absolute value of the rate of change over time of the second exhaust temperature and an integrated value calculation part calculating an integrated value IDio obtained by integrating a certain number or more of the values of the differential value Dio. It is configured so that if the integrated value IDio is less than a predetermined threshold value Ith, it judges that the state is a removed state.

By judging if the state is a removed state based on the integrated value IDio obtained by integrating a certain number or more of the values of the differential value Dio in this way, it is possible to judge if the state is a removed state more accurately.

Further, the judgment part according to the present embodiment is further configured so that when a predetermined condition stands, it performs judgment of whether the state is a removed state based on the difference between the rate of change over time Ain of the first exhaust temperature and the rate of change over time Aout of the second exhaust temperature. The predetermined condition is that the exhaust flow rate Ge be a predetermined lower limit flow rate Ge_l or more.

When exhaust is not flowing, that is, when heat is not being transferred between the PM trapping device 50 and the exhaust, the rate of change over time Ain of the first exhaust temperature and the rate of change over time Aout of the second exhaust temperature basically end up becoming the same value, so the state is liable to be mistakenly judged to be a removed state. For this reason, by judging if the state is a removed state if the exhaust flow rate Ge is a predetermined lower limit flow rate Ge_l or more, it is possible to improve the accuracy of judgment of whether the state is a removed state.

Further, in the present embodiment, as a predetermined condition, the exhaust flow rate Ge being a predetermined upper limit flow rate Ge_h or less larger than the lower limit flow rate Ge_l is further added.

If the exhaust flow rate Ge becomes greater, even if heat is robbed by the PM trapping device 50 or conversely heat is received from the PM trapping device 50, the change of temperature of the exhaust passing through the PM trapping device 50 becomes smaller. Therefore, by performing the judgment as to if the state is a removed state if the exhaust flow rate Ge is the upper limit flow rate Ge_h or less, it is possible to improve the accuracy of judgment of whether the state is a removed state.

Further, in the present embodiment, as a predetermined condition, the outside air temperature being a predetermined temperature or more is further added.

As explained above, in the removed state where the PM trapping device 50 has been removed, the heat of the exhaust flowing from the first exhaust temperature sensor 53 to the second exhaust temperature sensor 54 is radiated to the outside air through the piping connected to the position where the PM trapping device 50 was attached. At this time, when the outside air temperature is low, compared to when it is high, the amount of heat radiated to the outside air becomes greater. For this reason, when the outside air temperature is low, due to the effect of the amount of heat radiated to the outside air becoming greater, the shape of the curve of temperature change of the second exhaust temperature at the time of the removed state is liable to not become the same shape as the shape of the curve of temperature change of the first exhaust temperature and the accuracy of judgment of whether the state is a removed state is liable to fall. Therefore, by performing judgment as to whether the state is a removed state when the outside air temperature is a predetermined temperature or more, it is possible to improve the accuracy of judgment of whether the state is a removed state.

Further, in the present embodiment, as a predetermined condition, the integrated value IGa of the flow rate of intake air Ga from when the internal combustion engine 100 is started up being a first integrated value (predetermined integrated value) IGa_th1 or more is further added.

Right after the startup of the internal combustion engine 100, in a removed state where the PM trapping device 50 has been removed, the piping connected to the position where the PM trapping device 50 had been attached is relatively low in temperature, so the amount of radiation of heat from this piping tends to become great. For this reason, in the same way as when the outside air temperature is low, the shape of the curve of temperature change of the second exhaust temperature at the time of a removed state is liable to not become the same shape as the shape of the curve of temperature change of the first exhaust temperature and the accuracy of judgment of whether the state is a removed state is liable to fall. Therefore, by performing the judgment of whether the state is a removed state when an integrated value IGa of the flow rate of intake air Ga is the first integrated value IGa_th1 or more, it is possible to improve the accuracy of judgment of whether the state is a removed state.

Note that it is also possible to calculate the engine stopping time from when the internal combustion engine 100 is stopped to when it is restarted and make the first integrated value IGa_th1 larger when the engine stopping time is long compared to when it is short. Due to this, it is possible to judge if the state is a removed state at a suitable timing corresponding to the degree of drop of temperature of the exhaust passage after the engine is stopped.

Second Embodiment

Next, a second embodiment of the present invention will be explained. This embodiment differs from the first embodiment on the point that the average value ADio of differential value Dio is compared with a predetermined threshold value Ath to judge whether the state is a removed state. Below, the point of difference will be focused on in the explanation.

Figure 8:
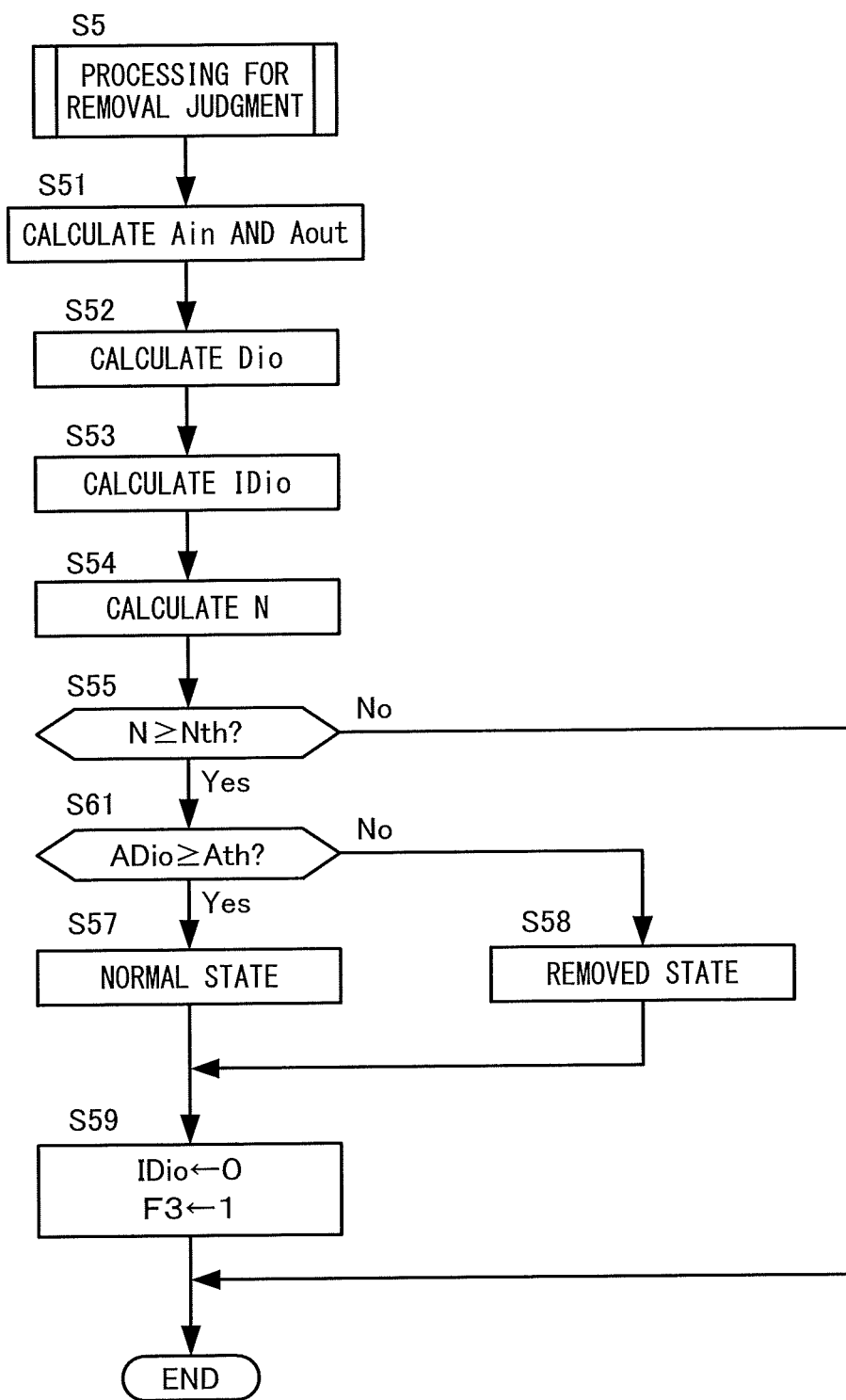
FIG. 8 is a flow chart for explaining details of processing for removal judgment according to a second embodiment of the present invention.

FIG. 8 is a flowchart for explaining details of processing for removal judgment according to the present embodiment. Note that in FIG. 8, the contents of the processing from step S51 to step S55 and the processing from step S57 to step S59 are contents similar to the processing explained above in the first embodiment, so here explanations will be omitted.

At step S61, the electronic control unit 200 divides the integrated value IDio by the number of samples N of the differential value Dio used when calculating the integrated value IDio so as to calculate the average value ADio of the differential value Dio and judges if this average value ADio is a predetermined threshold value Ath or more. If the average value ADio is the predetermined threshold value Ath or more, the electronic control unit 200 proceeds to the processing of step S57. On the other hand, if the average value ADio is less than the predetermined threshold value Ath, the electronic control unit 200 proceeds to the processing of step S58.

As shown in the embodiment explained above, even if calculating the differential value of the absolute value of the rate of change over time Ain of the first exhaust temperature and the absolute value of the rate of change over time Aout of the second exhaust temperature, calculating the average value ADio of a constant number or more of the differential values Dio, and judging that the state is a removed state if the average value ADio is less than a predetermined threshold value Ath, advantageous effects similar to the first embodiment can be obtained.

Third Embodiment

Next, a third embodiment of the present invention will be explained. This embodiment differs from the first embodiment in the position of attachment of the first exhaust temperature sensor 53. Below, the points of difference will be focused on in the explanation.

Figure 9:
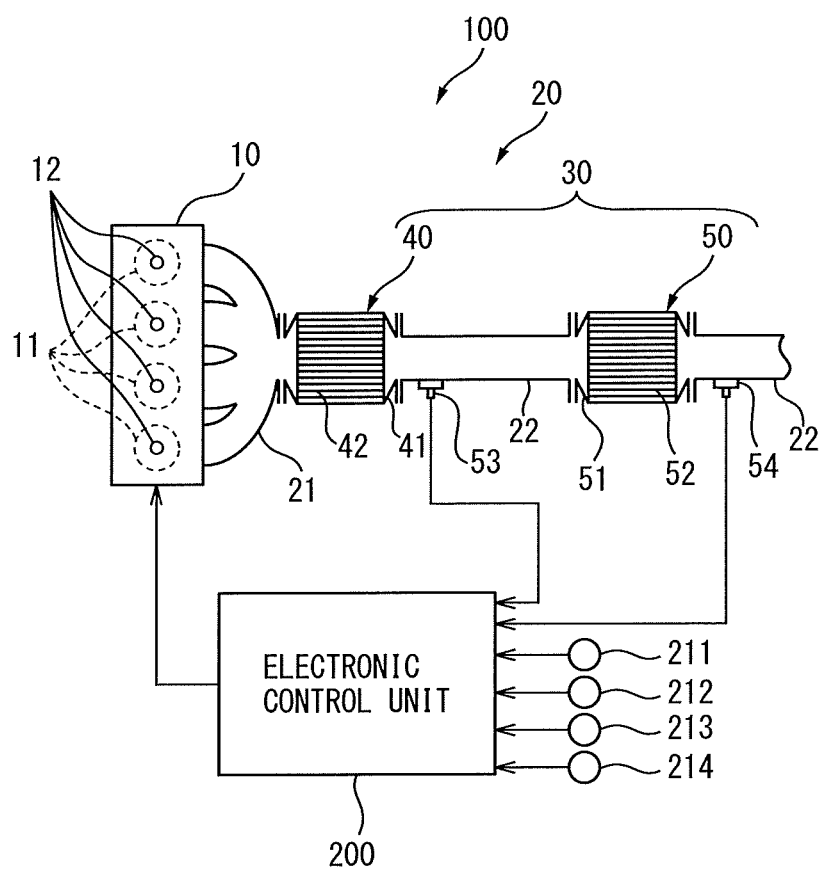
FIG. 9 is a schematic view of the configuration of an internal combustion engine according to a third embodiment of the present invention and an electronic control unit for controlling the internal combustion engine.

FIG. 9 is a schematic view of the configuration of an internal combustion engine 100 and an electronic control unit 200 for controlling the internal combustion engine 100 according to a third embodiment of the present invention.

As shown in FIG. 9, in the present embodiment, due to the mounting space or problems with heat resistance such as explained above, the first exhaust temperature sensor 53 is attached to the exhaust pipe 22 at a position at the upstream side from the PM trapping device 50 in the direction of exhaust flow and away from the inlet of the PM trapping device 50. In such a case, if the distance from the first exhaust temperature sensor 53 to the inlet of the PM trapping device 50 is long, the accuracy of judgment when using the rate of temperature change Ain of the first exhaust temperature detected by the first exhaust temperature sensor 53 to judge if the state is a removed state is liable to fall.

Therefore, in such a case, it is sometimes preferable to calculate an estimated exhaust temperature near the inlet of the PM trapping device 50 based on the detection value of the first exhaust temperature sensor 53 (below, referred to as the "estimated first exhaust temperature") and use the rate of temperature change Ain of the estimated first exhaust temperature to judge if the state is a removed state like in the first embodiment. Therefore, in the present embodiment, it was decided to calculate the estimated first exhaust temperature based on the detection value of the first exhaust temperature sensor 53.

Figure 10:
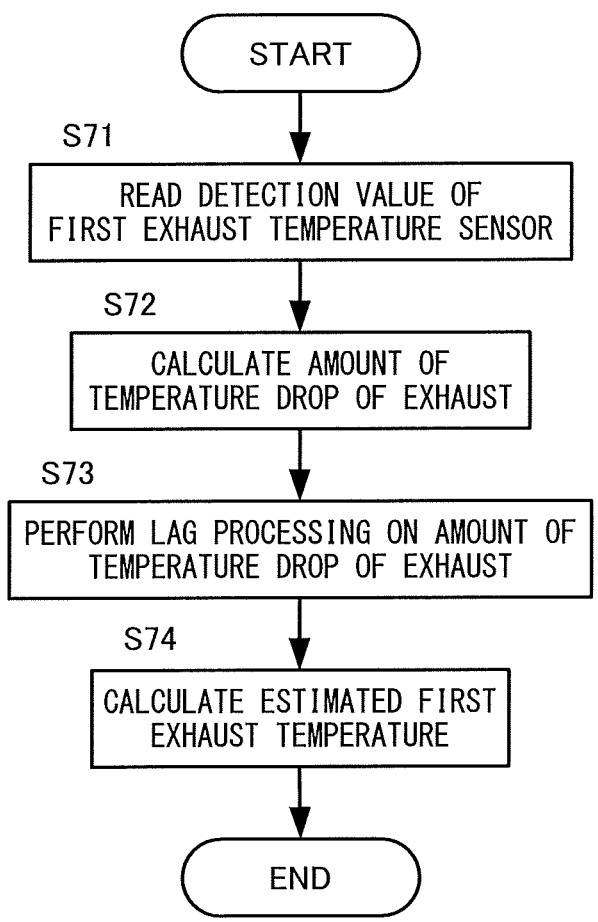
FIG. 10 is a flow chart for explaining control for estimation for calculating an estimated first exhaust temperature.

FIG. 10 is a flow chart for explaining estimation control calculating the estimated first exhaust temperature based on the first exhaust temperature sensor 53 attached to the exhaust pipe 22 at a position away from the inlet of the PM trapping device 50.

At step S71, the electronic control unit 200 reads the detection value of the first exhaust temperature sensor 53.

Figure 11:
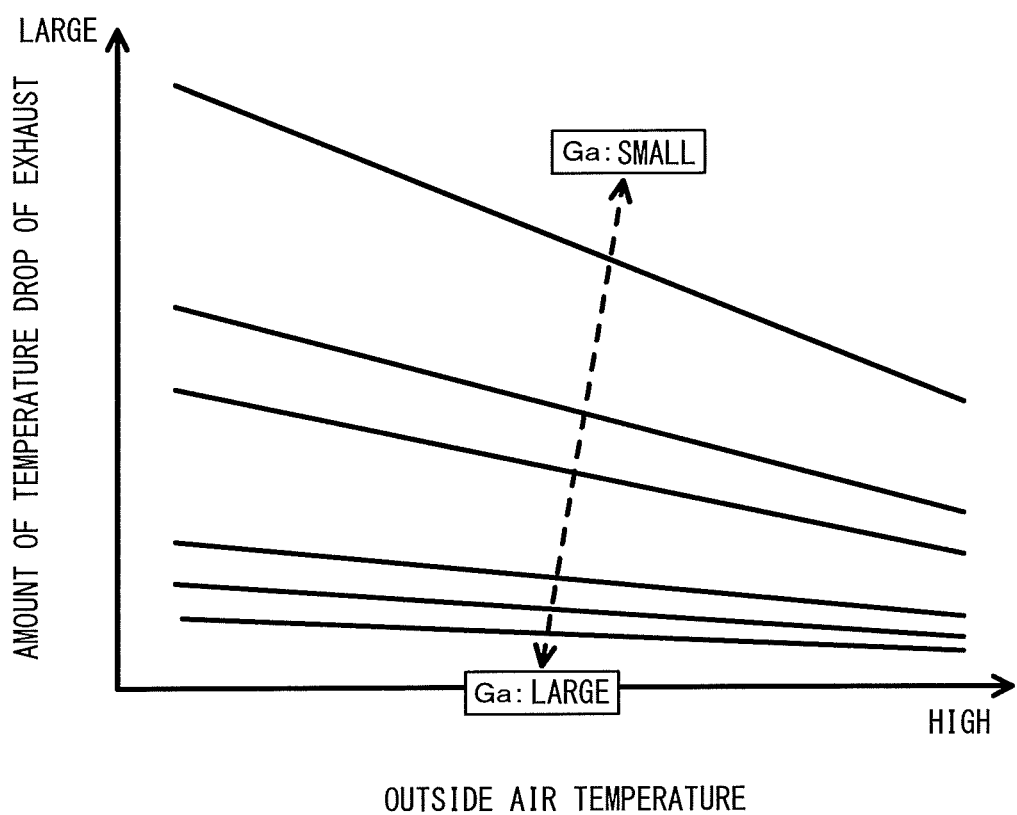
FIG. 11 is a map for calculating an amount of temperature drop of exhaust in a process of flowing through an exhaust pipe from a first exhaust temperature sensor to the PM trapping device based on a flow rate of intake air and an outside air temperature.

At step S72, the electronic control unit 200 refers to a map of FIG. 11 prepared in advance by experiments etc. and calculates the amount of temperature drop of the exhaust falling in the process of flowing through the exhaust pipe 22 from the first exhaust temperature sensor 53 to the PM trapping device 50 based on the flow rate of intake air Ga and the outside air temperature. As shown by the map of FIG. 11, the amount of temperature drop of the exhaust tends to become greater the smaller the flow rate of intake air Ga and, further, the lower the exhaust temperature.

At step S73, the electronic control unit 200 processes the amount of temperature drop of the exhaust by, for example, first order lag processing or other lag processing. Such lag processing is performed since it takes a certain degree of time until the detection value of the first exhaust temperature sensor 53 changes to a value corresponding to the exhaust temperature of the exhaust actually passing near the first exhaust temperature sensor 53, so such a response speed of the first exhaust temperature sensor 53 is considered.

At step S74, the electronic control unit 200 subtracts from the exhaust temperature corresponding to the detection value of the first exhaust temperature sensor 53 the amount of temperature drop of the exhaust processed by the lag processing and calculates the result as the estimated first exhaust temperature.

In the present embodiment explained above as well, the electronic control unit 200 (control device) controlling the internal combustion engine 100 is provided with components similar to the first embodiment such as the first exhaust temperature calculation part, second exhaust temperature calculation part, rate of change over time calculation part, and judgment part. Further, in the present embodiment, the first exhaust temperature calculation part is provided with a drop calculation part calculating an amount of temperature drop of the exhaust in the process of flowing through the exhaust pipe 22 from the position of attachment of the first exhaust temperature sensor 53 to the PM trapping device 50 as the exhaust after-treatment system 30 and is configured so as to calculate the detection value of the first exhaust temperature sensor 53 minus the amount of temperature drop of the exhaust as the first exhaust temperature. More specifically, the drop calculation part is configured to calculate the amount of temperature drop of the exhaust based on the integrated value of the flow rate of intake air Ga and the outside air temperature.

Due to this, if the distance from the first exhaust temperature sensor 53 to the inlet of the PM trapping device 50 is long, it is possible to keep the accuracy of judgment of whether the state is a removed state from falling.

Fourth Embodiment

Next, a fourth embodiment of the present invention will be explained. This embodiment differs from the first embodiment in the contents of the processing for run condition judgment. Below, the points of difference will be focused on in the explanation.

Figure 12:
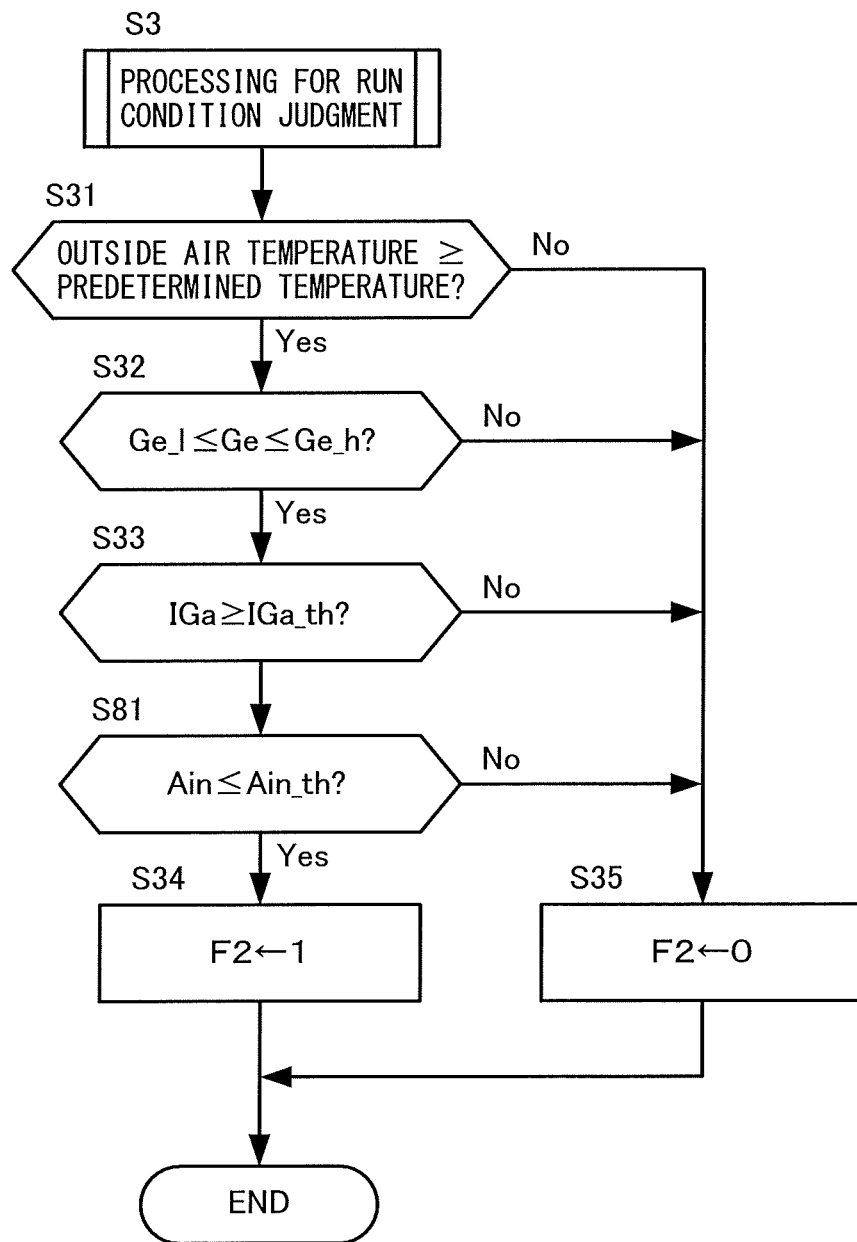
FIG. 12 is a flow chart for explaining details of processing for judgment of a run condition according to a fourth embodiment of the present invention.

FIG. 12 is a flow chart for explaining details of the processing for run condition judgment according to the present embodiment. Note that in FIG. 12, the contents of the processing from step S31 to step S35 are contents similar to the processing explained above in the first embodiment, so here explanations will be omitted.

At step S81, the electronic control unit 200, for example, judges if the time is the time of deceleration or another state where the first exhaust temperature is falling. Such a judgment is performed since compared with the time of rise of temperature of the first exhaust temperature, at the time of fall of temperature, the change of temperature of the second exhaust temperature tends to be more moderate than the change of temperature of the first exhaust temperature and the differential value Dio tends to become larger. That is, compared with the time of rise of temperature of the first exhaust temperature, at the time of fall of temperature, it is possible to accurately detect whether the state is a removed state where the PM trapping device 50 has been removed.

In the present embodiment, at step S81, the electronic control unit 200 judges if the rate of change over time Ain of the first exhaust temperature is a predetermined rate of change Ain_th (negative value, for example, −5[° C./s]) or less. Further, if the rate of change over time Ain of the first exhaust temperature is the predetermined rate of change Ain_th or less, the electronic control unit 200 judges that the state is one where the first exhaust temperature is falling and proceeds to the processing of step S34. On the other hand, if the rate of change over time Ain of the first exhaust temperature is less than the predetermined rate of change Ain_th, the electronic control unit 200 proceeds to the processing of step S35.

In the present embodiment explained above as well, the electronic control unit 200 (control device) for controlling the internal combustion engine 100 is provided with, like in the first embodiment, a first exhaust temperature calculation part, second exhaust temperature calculation part, rate of change overtime calculation part, and judgment part. Further, the judgment part is configured so as to judge whether the state is a removed state when a predetermined condition stands. As a predetermined condition, the rate of change over time Ain of the first exhaust temperature being a predetermined rate of change Ain_th or less taking a negative value is further added. Due to this, it is possible to better improve the accuracy of judgment of whether the state is a removed state.

Fifth Embodiment

Next, a fifth embodiment of the present invention will be explained. This embodiment differs from the above embodiments in the contents of the processing for run condition judgment. Below, the points of difference will be focused on in the explanation.

As in the above-mentioned fourth embodiment, as a run condition for performing judgment of whether the state is a removed state, if adding, in addition to the exhaust flow rate Ge being the lower limit flow rate Ge_l or more, the state where the first exhaust temperature is falling (rate of change over time Ain of first exhaust temperature being a predetermined rate of change Ain_th or less), in the case of a vehicle where the internal combustion engine 100 is started and stopped a plurality of times in one trip (below, referred to as an "engine intermittent operation vehicle"), the following such problem is liable to arise.

Figure 13:
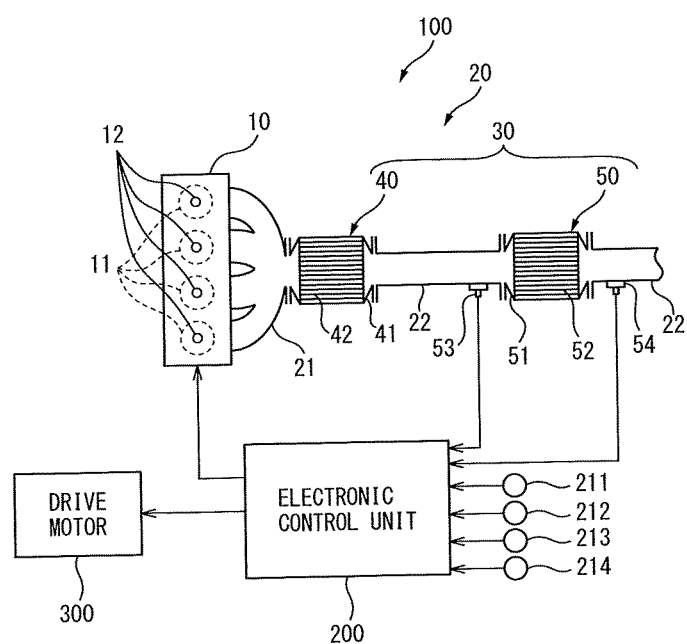
FIG. 13 is a schematic view of the configuration of a hybrid vehicle.

Note that, as an example of an engine intermittent operation vehicle, a vehicle provided with an idling stop function (that is, a vehicle performing idling stop control by the electronic control unit 200 as control of the internal combustion engine 100) or a hybrid vehicle as shown in FIG. 13 provided with, as a source of vehicle drive power, an internal combustion engine 100 plus a drive motor 300 and performing control to switch between an EV (mode driven by power of drive motor 300) and HV mode (mode driven by power of drive motor 300 plus drive power of internal combustion engine 100 in accordance with vehicle demanded torque) etc. may be mentioned.

Idling stop control is control automatically making the internal combustion engine 100 stop when a predetermined engine stop condition stands and automatically making the internal combustion engine 100 restart when a predetermined engine restart condition stands. As an engine stop condition, for example, the speed of the home vehicle (vehicle speed) being 0 [km/h], the brake pedal being depressed (that is, the amount of brake depression being a constant amount or more), the accelerator pedal not being depressed (that is, the amount of accelerator depression being zero), the state of charge of the battery being a predetermined amount or more, etc. may be mentioned. Further, as an engine restart condition, for example, the brake pedal not being depressed (that is, the amount of brake depression being zero), the shift lever being a drive range (for example, D range or R range), etc. may be mentioned.

Further, in the following explanation, a vehicle driven without stopping the internal combustion engine 100 during one trip will be referred to as an "ordinary vehicle") to differentiate it from an engine intermittent operation vehicle.

Figure 14A:
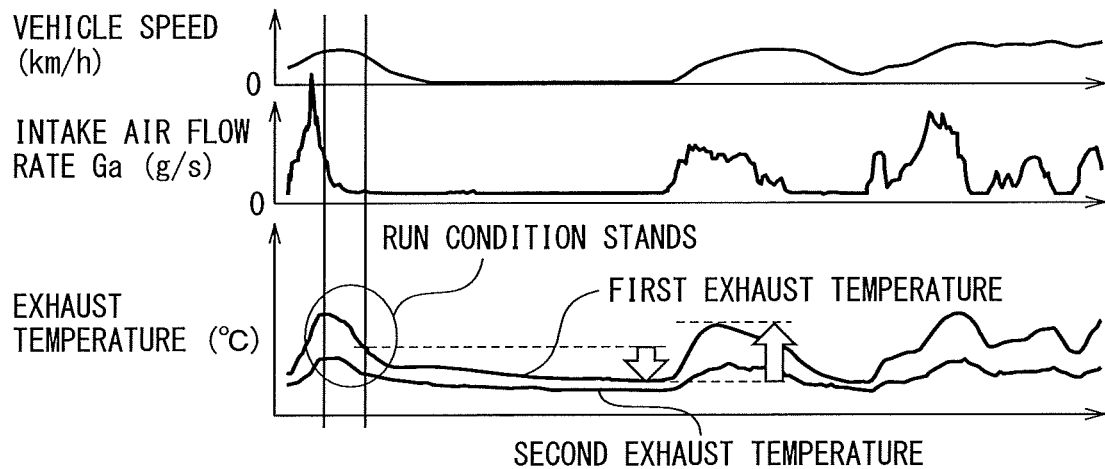
FIG. 14A is a time chart showing a temperature change etc. of a first exhaust temperature and a second exhaust temperature when an internal combustion engine is operated in a normal state where a PM trapping device is not removed at a normal vehicle.
Figure 14B:
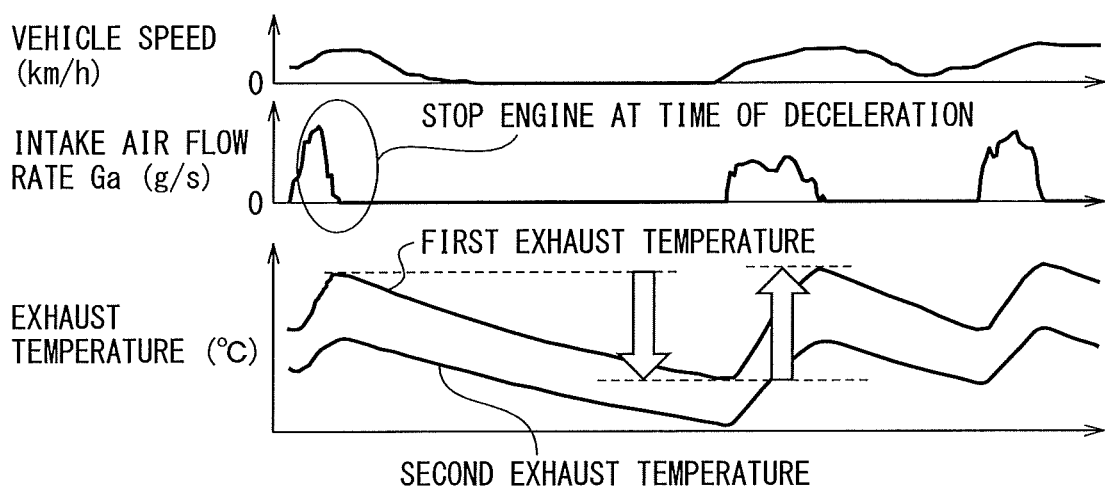
FIG. 14B is a time chart showing a temperature change etc. of a first exhaust temperature and a second exhaust temperature when an internal combustion engine is operated in a normal state where a PM trapping device is not removed at a hybrid vehicle as an engine intermittent operation vehicle.

FIG. 14A is a time chart showing the changes in temperature etc. of the first exhaust temperature and the second exhaust temperature in an ordinary vehicle when the internal combustion engine 100 has been operated in the normal state where the PM trapping device 50 has not been removed. FIG. 14B is a time chart showing the changes in temperature etc. of the first exhaust temperature and the second exhaust temperature in a hybrid vehicle as an engine intermittent operation vehicle when the internal combustion engine 100 has been operated in the normal state where the PM trapping device 50 has not been removed.

As shown in FIG. 14A, in the case of an ordinary vehicle, even if the vehicle demanded torque falls at the time of steady state driving after acceleration or at the time of deceleration, the internal combustion engine 100 will never be stopped, so along with a drop in the vehicle demanded torque, the flow rate of intake air Ga and in turn the exhaust flow rate Ge will fall and the first exhaust temperature will fall. For this reason, in the case of an ordinary vehicle, at the time of steady state operation, the time of deceleration, etc., in the state where the first exhaust temperature is falling, the exhaust flow rate Ge will fall within a predetermined range (lower limit flow rate Ge_l to upper limit flow rate Ge_h) and the run condition will stand.

As opposed to this, as shown in FIG. 14B, in the case of a hybrid vehicle, if accelerating by the drive power of the internal combustion engine 100 and drive motor 300, then at the time of steady state operation or the time of deceleration, the vehicle demanded torque falls and the vehicle demanded torque becomes less than a predetermined torque, the internal combustion engine 100 is temporarily stopped. For this reason, in the case of a hybrid vehicle, at the time of steady state driving, the time of deceleration, etc. where the first exhaust temperature will easily fall, the internal combustion engine 100 is temporarily stopped and the flow rate of intake air Ga and in turn the exhaust flow rate Ge will become zero and become the lower limit flow rate Ge_l or less, compared with the case of an ordinary vehicle, the frequency of the run condition standing will become smaller. Therefore, in the case of a hybrid vehicle, as a run condition, it is not preferable to add the state being one where the first exhaust temperature is falling.

Here, as shown in FIG. 14A, in the case of an ordinary vehicle, even at the time when the vehicle is stopped, the internal combustion engine 100 becomes an idling operation state, so exhaust is discharged from the engine body 10. For this reason, in the case of an ordinary vehicle, even at the time when the vehicle is stopped, the drop in the first exhaust temperature and the second exhaust temperature becomes moderate.

As opposed to this, as shown in FIG. 14B, in the case of a hybrid vehicle, even at the time when the vehicle is stopped, the internal combustion engine 100 is left stopped and no exhaust is discharged from the engine body 10, so due to the radiation of heat from the exhaust pipe 22, the first exhaust temperature and the second exhaust temperature greatly fall from the levels of an ordinary vehicle. For this reason, in the case of a hybrid vehicle, at the time of acceleration after restart, the first exhaust temperature greatly rises from the fallen state. That is, in the case of a hybrid vehicle, compared with an ordinary vehicle, at the time of acceleration after restart, the rate of change over time Ain of the first exhaust temperature becomes larger. Further, in a vehicle provided with an idling stop function as well, in the same way, at the time of vehicle stop, the internal combustion engine 100 is stopped, so at the time of acceleration after restart, the rate of change over time Ain of the first exhaust temperature becomes larger.

In this way, in the case of an engine intermittent operation vehicle, at the time of acceleration after restart, the rate of change over time Ain of the first exhaust temperature tends to become larger. At the time of acceleration after restart, a difference easily arises between the rate of change over time Ain of the first exhaust temperature and the rate of change over time Aout of the second exhaust temperature. Therefore, in the case of an engine intermittent operation vehicle, the time of acceleration after restart is suitable as a run condition for performing judgment as to if the state is a removed state.

Therefore, in the case of an engine intermittent operation vehicle, it was decided to change the content of the processing for run condition judgment so as to judge if the state is a removed state at the time of acceleration after restart.

Figure 15:
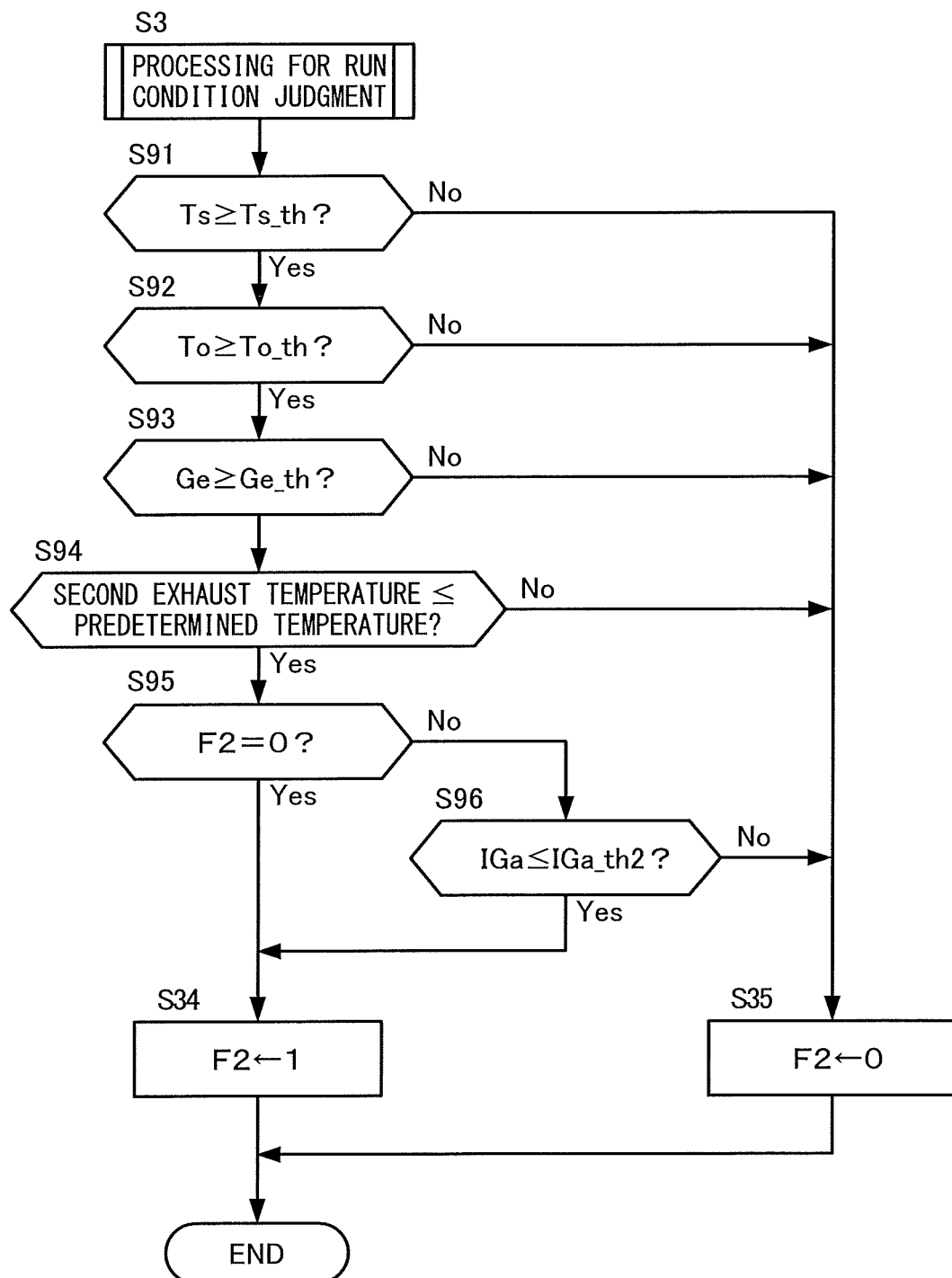
FIG. 15 is a flow chart for explaining details of processing for run condition judgment according to a fifth embodiment of the present invention.

FIG. 15 is a flow chart for explaining details of processing for run condition judgment according to the present embodiment. Note that in FIG. 15, the contents of the processing of step S34 and step S35 are contents similar to the processing explained above in the first embodiment, so here explanations will be omitted.

At step S91, before the internal combustion engine 100 is started up (including restart), the electronic control unit 200 judges if the time period Ts during which the internal combustion engine 100 was stopped (below, referred to as the "engine stopping time") is a first predetermined time Ts_th (for example, 10 seconds) or more. If the engine stopping time Ts is the first predetermined time Ts_th or more, the electronic control unit 200 proceeds to the processing of step S92. On the other hand, if the engine stopping time Ts is less than the first predetermined time Ts_th, the electronic control unit 200 proceeds to the processing of step S35.

Such a judgment is performed because if the engine stopping time is short, the extent of drop of the first exhaust temperature is small and, as a result, the amount of rise of the first exhaust temperature at the time of acceleration after engine startup also becomes small, so at the time of acceleration after engine startup, it becomes hard for a difference to form between the rate of change over time Ain of the first exhaust temperature and the rate of change over time Aout of the second exhaust temperature and the accuracy of the judgment of whether the state is a removed state is liable to fall.

At step S92, the electronic control unit 200 judges if the elapsed time To from when the internal combustion engine 100 is started up (including restarted) (below, referred to as the "post-start elapsed time") is a second predetermined time To_th (for example, 3 seconds) or more. Such a judgment is performed because there is a certain time lag from when starting the internal combustion engine 100 to when the first exhaust temperature rises. If the post-start elapsed time To is the second predetermined time To_th or more, the electronic control unit 200 proceeds to the processing of step S92. On the other hand, if the post-start elapsed time To is less than the second predetermined time To_th, the electronic control unit 200 proceeds to the processing of step S35.

At step S93, the electronic control unit 200 judges if the exhaust flow rate Ge is a predetermined flow rate Ge_th (for example, 18 [g/s]) or more. If the exhaust flow rate Ge is the predetermined flow rate Ge_th or more, the electronic control unit 200 proceeds to the processing of step S94. On the other hand, if the exhaust flow rate Ge is less than the predetermined flow rate Ge_th, the electronic control unit 200 proceeds to the processing of step S35.

Note that, such a judgment is performed for the following reason. That is, the temperature of the exhaust discharged from the engine body 10 basically tends to become higher the higher the engine load, in other words, the greater the flow rate of intake air Ga and in turn the greater the exhaust flow rate Ge. Therefore, the greater the exhaust flow rate Ge, the larger the amount of rise of the first exhaust temperature at the time of acceleration after engine startup and the larger the rate of change over time Ain of the first exhaust temperature as well. Conversely speaking, when the engine load is low and the exhaust flow rate Ge is small, the amount of rise of the first exhaust temperature is small and the rate of change over time Ain of the first exhaust temperature becomes small, so it becomes hard for a difference to form between the rate of change over time Ain of the first exhaust temperature and the rate of change over time Aout of the second exhaust temperature. For this reason, the accuracy of the judgment of whether the state is a removed state is liable to fall. Therefore, in the present embodiment, it is judged if the exhaust flow rate Ge is a predetermined flow rate Ge_th or more, that is, it is judged if the engine load is a constant load or more (if a flat road, whether the degree of acceleration is a certain acceleration degree or more).

At step S94, the electronic control unit 200 judges if the temperature of the PM trapping device 50 is a predetermined temperature (for example, 380[° C.]) or less. In the present embodiment, the electronic control unit 200 deems the second exhaust temperature to be the temperature of the PM trapping device 50 to judge if the second exhaust temperature is the predetermined temperature or less. If the second exhaust temperature is the predetermined temperature or less, the electronic control unit 200 proceeds to the processing of step S95. On the other hand, if the second exhaust temperature is higher than the predetermined temperature, the electronic control unit 200 proceeds to the processing of step S35.

Note that such a judgment is performed for the following reason. That is, the lower the temperature of the PM trapping device 50, the more the exhaust temperature falls in the process of passing through the PM trapping device 50, so compared with the rate of temperature change Ain of the first exhaust temperature (rate of temperature rise), the rate of temperature change Aout of the second exhaust temperature (rate of temperature rise) tends to become smaller. Therefore, the lower the temperature of the PM trapping device 50, the more easily it becomes for a difference to form between the rate of change over time Ain of the first exhaust temperature and the rate of change over time Aout of the second exhaust temperature at the time of acceleration after engine start and the more possible it becomes to accurately judge if the state is a removed state.

At step S95, the electronic control unit 200 judges if the run condition standing flag F2 has been set to "0". If the run condition standing flag F2 has been set to "0", the electronic control unit 200 proceeds to the processing of step S34. On the other hand, if the run condition standing flag F2 has been set to "1", the electronic control unit 200 proceeds to the processing of step S96.

At step S96, the electronic control unit 200 judges if an integrated value IGa of the flow rate of intake air Gas from when the internal combustion engine 100 was started up is a predetermined second integrated value IGa_th2 (for example, 150[g]) or less. If the integrated value IGa is the second integrated value IGa_th2 or less, the electronic control unit 200 proceeds to the processing of step S34. On the other hand, if the integrated value IGa becomes larger than the second integrated value IGa_th2, the electronic control unit 200 proceeds to the processing of step S35.

Note that, such a judgment is performed for the following reason:

If the conditions from step S91 to step S95 stand and the run condition standing flag F2 becomes "1" at step S34, the processing for removal judgment is performed, but the rate of change over time Ain of the first exhaust temperature (rate of temperature rise) at the time of acceleration after engine start gradually becomes smaller as the first exhaust temperature becomes higher at the time of acceleration. That is, if the total amount of heat of exhaust from the start of acceleration exceeds a certain amount, the rate of change over time Ain of the first exhaust temperature (rate of temperature rise) becomes gradually smaller.

Here, the total amount of heat of the exhaust is proportional to the amount of exhaust from the start of acceleration, that is, an integrated value IGa of the flow rate of intake air Ga. Therefore, if the integrated value IGa of the flow rate of intake air Ga from when starting up the internal combustion engine 100 becomes greater than a second integrated value IGa_th2, the rate of change over time Ain of the first exhaust temperature becomes smaller, so it becomes harder for a difference to form between the rate of change over time Ain of the first exhaust temperature and the rate of change over time Aout of the second exhaust temperature and the accuracy of the judgment of whether the state is a removed state is liable to fall. Therefore, in the present embodiment, it is decided that when the run condition standing flag F2 becomes "1" and processing for removal judgment is being performed, it is judged whether the integrated value IGa of the flow rate of intake air Ga is the second integrated value IGa_th2 or less.

The electronic control unit 200 of the internal combustion engine 100 according to the present embodiment explained above, like in the first embodiment, is provided with a first exhaust temperature calculation part, second exhaust temperature calculation part, rate of change over time calculation part, and judgment part. Further, in the present embodiment, the electronic control unit 200 is further provided with an engine stopping time calculation part calculating the engine stopping time from when the internal combustion engine 100 is stopped to when it is started up. Further, the judgment part is further configured to judge whether the state is a removed state based on the difference between the rate of change over time Ain of the first exhaust temperature and the rate of change over time Aout of the second exhaust temperature when a predetermined condition stands. The predetermined condition is that the engine stopping time Ts before the internal combustion engine 100 is started up be the first predetermined time Ts_th (predetermined time) or more and the exhaust flow rate Ge after the internal combustion engine 100 is started up be the predetermined flow rate Ge_th or more.

Due to this, when the first exhaust temperature falls while the engine is stopped, then the internal combustion engine 100 is started and the engine load becomes a certain level or more (when the vehicle is accelerating), that is, when the rate of change over time Ain of the first exhaust temperature becomes larger, it is possible to judge if the state is the removed state. For this reason, a difference is easily formed between the rate of change over time Ain of the first exhaust temperature and the rate of change over time Aout of the second exhaust temperature and it is possible to improve the accuracy of judgment of whether the state is a removed state.

Further, the electronic control unit 200 according to the present embodiment is further provided with an elapsed time calculation part calculating an elapsed time from when the internal combustion engine 100 was started as a post-start elapsed time To. As a predetermined condition in the present embodiment, the post-start elapsed time To being the second predetermined time To_th (predetermined time) or more is further added.

As explained above, there is a certain time lag from when starting the internal combustion engine 100 to when the first exhaust temperature rises. Therefore, by considering such a time lag and not judging whether the state is a removed state for a certain time period right after startup of the internal combustion engine 100, it is possible to better improve the accuracy of judgment of whether the state is a removed state.

Further, in the present embodiment, as a predetermined condition, the temperature of the PM trapping device 50 being a predetermined temperature or less is further added.

As explained above, the lower the temperature of the PM trapping device 50, the more the exhaust temperature falls in the process of passing through the PM trapping device 50, so the rate of temperature change (rate of temperature change) Aout of the second exhaust temperature tends to become smaller compared with the rate of temperature change (rate of temperature change) Ain of the first exhaust temperature. That is, at the time of acceleration after engine startup, the lower the temperature of the PM trapping device 50, the easier it is for a difference to form between the rate of change over time Ain of the first exhaust temperature and the rate of change over time Aout of the second exhaust temperature and the more the accurately the judgment of whether the state is a removed state can be performed. Therefore, by making it so as not to judge whether the state is a removed state when the temperature of the PM trapping device 50 is higher than a predetermined temperature, it is possible improve more the accuracy of judgment of whether the state is a removed state.

Further, in the present embodiment, as a predetermined condition, the integrated value IGa of the flow rate of intake air Ga from when the internal combustion engine 100 is started up being the second integrated value IGa_th2 (predetermined integrated value) or less is further added.

Due to this, it is possible to judge whether the state is a removed state when the rate of change over time Ain of the first exhaust temperature relatively becomes larger right after acceleration after the internal combustion engine 100 has been started up. For this reason, it is possible improve more the accuracy of judgment of whether the state is a removed state.

Sixth Embodiment

Next, a sixth embodiment of the present invention will be explained. The present embodiment differs from the fourth embodiment in the content of the processing for run condition judgment. Below, the points of difference will be focused on in the explanation.

At the time of acceleration and other cases where the first exhaust temperature rises, when the temperature of the filter 52 is lower than the first exhaust temperature, the filter 52 inside the PM trapping device 50 is, for example, heated by the heat of the exhaust flowing into the PM trapping device 50. More specifically, in the process of the exhaust which flows to the inside of the PM trapping device 50 flowing through the inside of the PM trapping device 50 from the inlet side to the outlet side, the heat of the exhaust is gradually robbed by the filter 52 whereby the filter 52 is heated.

Therefore, the temperature of the exhaust flowing into the inside of the PM trapping device 50 gradually falls in the process of the exhaust flowing through the inside of the PM trapping device 50 from its inlet side to outlet side. As a result, the filter 52 is heated by the relatively high temperature exhaust at the inlet side of the inside of the PM trapping device 50 while is heated by the relatively low temperature exhaust at the outlet side of the inside of the PM trapping device 50.

For this reason, if comparing the temperature of the part of the filter 52 positioned at the inlet side of the PM trapping device 50 (below, referred to as the "filter upstream part") and the temperature of the part positioned at the outlet side (below, referred to as the "filter downstream part"), during heating of the filter 52, the temperature of the filter downstream part tends to become lower than the temperature of the filter upstream part and the unevenness in the temperature distribution of the filter 52 tends to become greater. This unevenness in the temperature distribution of this filter 52 is gradually reduced by continuation of steady state operation (operation with little fluctuation in first exhaust temperature) for a certain extent after acceleration.

Further, like in the above-mentioned fourth embodiment, if adding as a run condition for performing judgment of whether the state is a removed state, for example, the time being one of deceleration or the state otherwise being one where the first exhaust temperature falls (the rate of change over time Ain of the first exhaust temperature is a predetermined rate of change Ain_th or less), so as to improve the accuracy of judgment of whether the state is a removed state, the following problem is liable to arise due to the unevenness of the temperature distribution of this filter 52.

That is, for example, in the case where after acceleration, deceleration is immediately started and the first exhaust temperature falls etc., it is judged whether the state is a removed state in the state of a large unevenness of temperature distribution of the filter 52 (state where temperature of filter downstream part becomes a predetermined temperature or more lower than the temperature of the filter upstream part). This being so, compared to the case where the unevenness of temperature distribution of the filter 52 is small, the amount of heat received by the exhaust from the filter 52 at the filter downstream part ends up becoming smaller. As a result, the amount of heat which the exhaust flowing into the PM trapping device 50 receives from the filter 52 of the PM trapping device 50 ends up becoming smaller, so it becomes harder for a difference to form between the rate of change over time Ain of the first exhaust temperature and the rate of change over time Aout of the second exhaust temperature and the accuracy of the judgment of whether the state is a removed state is liable to fall.

Therefore, in the present embodiment, as a run condition for judging whether the state is a removed state, the state being one where the first exhaust temperature is falling was added and the state being one where the unevenness of temperature distribution of the filter 52 was small (state where temperature difference of filter upstream part and filter downstream part is less than a predetermined temperature difference) is further added.

Figure 16:
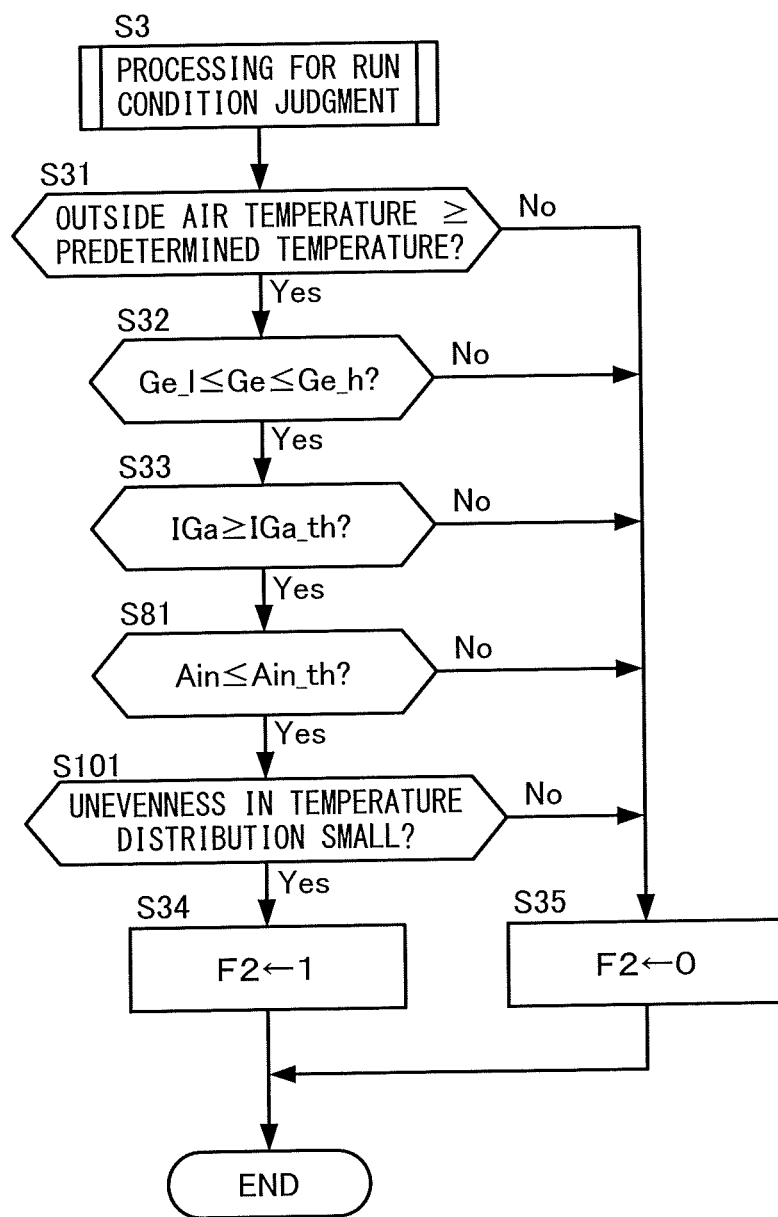
FIG. 16 is a flow chart for explaining details of processing for run condition judgment according to a sixth embodiment of the present invention.

FIG. 16 is a flow chart for explaining details of processing for run condition judgment according to the present embodiment. Note that in FIG. 16, the contents of the processing from step S31 to step S35 and the processing of step S81 are contents similar to the processing explained above in the first embodiment etc., so here explanations will be omitted.

At step S101, the electronic control unit 200 judges if the state is one where the unevenness of temperature distribution of the filter 52 is small, that is, if it is one where the degree of unevenness of temperature distribution of the filter 52 is a predetermined degree of unevenness or less. If the state is one where the unevenness of temperature distribution of the filter 52 is small, the electronic control unit 200 proceeds to the processing of step S34, while if the state is one where the unevenness of temperature distribution of the filter 52 is large, the electronic control unit 200 proceeds to the processing of step S35.

Note that, whether the state is one where the unevenness of temperature distribution of the filter 52 is small, for example, can be judged by whether a steady state operation has continued for a predetermined time. The technique for judging whether a steady state operation has continued for a predetermined time is not particularly limited. For example, if the rate of change over time Ain of the first exhaust temperature falls within a predetermined range (for example, −6[° C./s] to 6[° C./s] in range) in a predetermined time, it can be judged that a steady state operation has continued for a predetermined time. Further, for example, if the rate of change over time of the flow rate of intake air Ga falls within a predetermined range (for example, −5[(g/s)/s]

to 5[(g/s)s] in range) in a predetermined time, it can be judged that a steady state operation has continued for a predetermined time. Further, for example, if estimating the temperature of the filter 52 in accordance with the engine operating state etc., if the rate of change over time of the estimated temperature of the filter 52 falls within a predetermined range (for example, −5[° C./s] to 5[° C./s] in range) in a predetermined time, it can be judged that the steady state operation has continued for a predetermined time.

According to the present embodiment explained above, as predetermined conditions for judgment of whether the state is a removed state, the rate of change over time Ain of the first exhaust temperature being a negative value predetermined rate of change Ain_th or less and the degree of unevenness of the temperature distribution inside the PM trapping device 50 being a predetermined degree of bias or less are included.

Due to this, when the degree of unevenness of the temperature distribution in the PM trapping device 50 at the time of deceleration is large, that is, when it becomes hard for a difference to form between the rate of change over time Ain of the first exhaust temperature and the rate of change over time Aout of the second exhaust temperature at the time of deceleration and the accuracy of judgment is liable to deteriorate, judgment of whether the state is a removed state is not performed, so it is possible to further improve the accuracy of judgment at the time of judgment of whether the state is a removed state at the time of deceleration.

Seventh Embodiment

Next, a seventh embodiment of the present invention will be explained. The present embodiment differs from the fifth embodiment in the content of the processing for run condition judgment. Below, the points of difference will be focused on in the explanation.

In the above-mentioned fifth embodiment, in the case of engine intermittent operation vehicle, it is judged if the state is a removed state at the time of acceleration after restart, whereby the accuracy of judgment of whether the state is a removed state was improved.

However, in an engine intermittent operation vehicle, for example, when an abnormality occurs in the battery or other part of the electrical system, when a drive motor 300 is provided and an abnormality occurs in the drive motor 300, or when for any other reason the engine intermittent operation is prohibited and the state becomes one where the internal combustion engine 100 has to be made to operate without stopping, the run condition ends up no longer standing and the processing for removal judgment of the PM trapping device 50 can no longer be performed.

Therefore, in the present embodiment, when engine intermittent operation is prohibited, it is decided to replace the processing for run condition judgment explained in the fifth embodiment with the processing for run condition judgment explained in the first embodiment, fourth embodiment, or the sixth embodiment. Due to this, in an engine intermittent operation vehicle, even when engine intermittent operation is prohibited, it is possible to secure the frequency of performing the processing for removal judgment of the PM trapping device 50.

Figure 17:
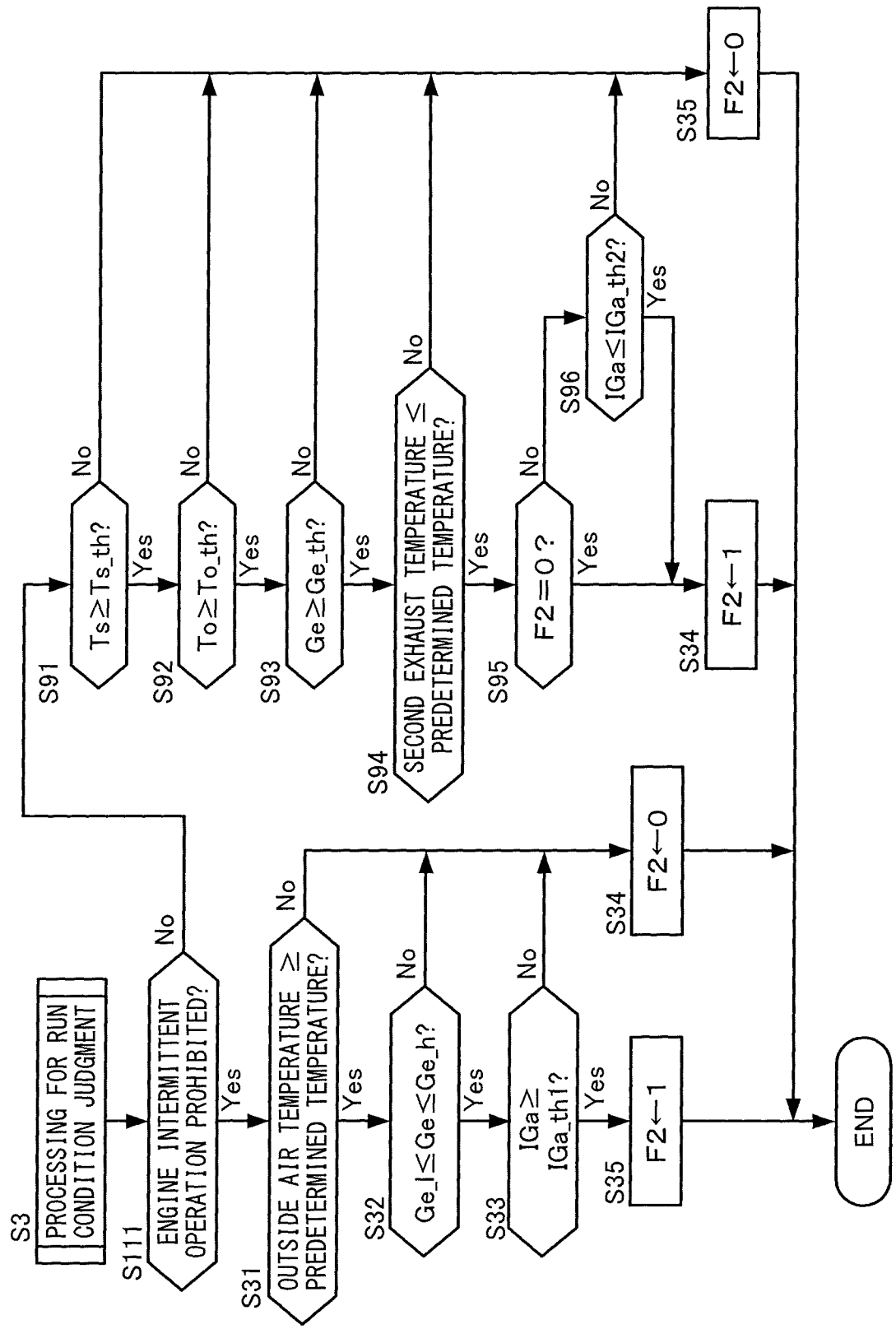
FIG. 17 is a flow chart for explaining details of processing for run condition judgment according to a seventh embodiment of the present invention.

FIG. 17 is a flow chart for explaining details of the processing for run condition judgment according to the present embodiment. Note that in FIG. 17, the contents of the processing from step S31 to step S35 and the processing of step S91 to step S96 are contents similar to the processing explained above in the first embodiment and the fifth embodiment, so here explanations will be omitted.

At step S11, the electronic control unit 200 judges if engine intermittent operation has been prohibited. If engine intermittent operation has been prohibited, the electronic control unit 200 proceeds to the processing of step S31. On the other hand, if the engine intermittent operation has not been prohibited, the electronic control unit 200 proceeds to the processing of step S91. Note that in the present embodiment, when engine intermittent operation has been prohibited, the processing for run condition judgment explained in the first embodiment is performed, but as explained above, the processing for run condition judgment explained in the fourth embodiment or the sixth embodiment may also be performed.

According to the present embodiment explained above, the electronic control unit 200 (control device) controlling the internal combustion engine 100 is further provided with an intermittent operation run part making the internal combustion engine 100 operate intermittently. Further, the judgment part according to the present embodiment judges whether the state is a removed state when a predetermined condition stands based on the difference between the rate of change over time Ain of the first exhaust temperature and the rate of change over time Aout of the second exhaust temperature and is further configured to change the content of the predetermined condition between when intermittent operation of the internal combustion engine 100 is permitted and when it is not permitted.

The predetermined condition, for example, in the case where intermittent operation of the internal combustion engine 100 is permitted, is made that the engine stopping time Ts before the internal combustion engine 100 is started be a first predetermined time Ts_th (predetermined time) or more and an exhaust flow rate Ge after the internal combustion engine 100 is started be a predetermined flow rate Ge_th or more, while in the case where intermittent operation of the internal combustion engine 100 is not permitted, is made that the rate of change over time Ain of the first exhaust temperature be a negative value predetermined rate of change Ain_th or less.

Due to this, in an engine intermittent operation vehicle, even if engine intermittent operation is prohibited, it is possible to secure the frequency of performance of processing for removal judgment of the PM trapping device 50 while judging any removed state under suitable conditions both when engine intermittent operation is permitted and when it is prohibited.

Eighth Embodiment

Next, an eighth embodiment of the present invention will be explained. The present embodiment differs from the above embodiments in the contents of the processing for removal judgment. Below, the points of difference will be focused on in the explanation.

In the above-mentioned fourth embodiment, as a run condition for performing judgment of whether the state is a removed state, for example, the time being one of deceleration or otherwise the state being one where the first exhaust temperature was falling (the rate of change over time Ain of the first exhaust temperature being a predetermined rate of change Ain_th or less) was added to improve the accuracy of judgment of whether the state is a removed state.

Here, the first exhaust temperature changes according to the engine operating state, so, depending on the engine operating state before deceleration, at the time of deceleration, sometimes the first exhaust temperature falls from a relatively high state and sometimes it falls from a relatively low state. Further, if at the time of deceleration, the first exhaust temperature has fallen from a relatively high state, the PM trapping device 50 is heated by relatively high temperature exhaust before deceleration and the PM trapping device 50 tends to become relatively high in temperature. On the other hand, if at the time of deceleration, the first exhaust temperature has fallen from a relatively low state, the PM trapping device 50 is heated by relatively low temperature exhaust before deceleration and the PM trapping device 50 tends to become relatively low in temperature.

Therefore, in the case where at the time of deceleration, the first exhaust temperature has fallen from a relatively low state, compared with the case where at the time of deceleration, the first exhaust temperature has fallen from a relatively high state, the amount of heat which the exhaust flowing into the PM trapping device 50 receives from the PM trapping device 50 tends to become smaller. That is, in the case where at the time of deceleration, the first exhaust temperature has fallen from a relatively low state, it is hard for a difference to form between the rate of change over time Ain of the first exhaust temperature and the rate of change over time Aout of the second exhaust temperature.

For this reason, between the case where at the time of deceleration the first exhaust temperature had fallen from a relatively low state and the case where it had fallen from a relatively high state, even if assuming that the run condition for judging if the state is the removed state has stood for exactly the same time, the magnitude of the integrated value IDio of the differential value Dio calculated within that time frame becomes smaller in the case where at the time of deceleration the first exhaust temperature has fallen from a relatively low state. As a result, in the case where at the time of deceleration the first exhaust temperature has fallen from a relatively low state, even in the normal state, the integrated value IDio will not become the predetermined threshold value Ith or more and it is liable to end up mistakenly judging the state to be a removed state.

As a result, for example, if, like in the first embodiment, comparing the integrated value IDio of the differential value Dio with the predetermined threshold value Ith to judge if the state is a removed state, when at the time of deceleration the first exhaust temperature has fallen from the relatively low state, even at the normal state, the integrated value IDio will not become the predetermined threshold value Ith or more and it is liable to end up mistakenly judging the state to be a removed state. Further, for example, when, like in the second embodiment, comparing the average value ADio of the differential value Dio with the predetermined threshold value Ath to judge if the state is a removed state, when at the time of deceleration the first exhaust temperature has fallen from a relatively low state, even at the normal state, the average value ADio will not become the predetermined threshold value Ath or more and it is liable to end up mistakenly judging the state to be a removed state.

Therefore, in the present embodiment, it was decided to correct the predetermined threshold value Ith or predetermined threshold value Ath based on the average value of the first exhaust temperature when the precondition and run condition stand in the time period of calculating the integrated value IDio or average value ADio of the differential value Dio. Below, an embodiment correcting the predetermined threshold value Ath based on the average value of the first exhaust temperature when the precondition and run condition stand in the time period of calculating the average value ADio of the differential values Dio will be explained.

Figure 18:
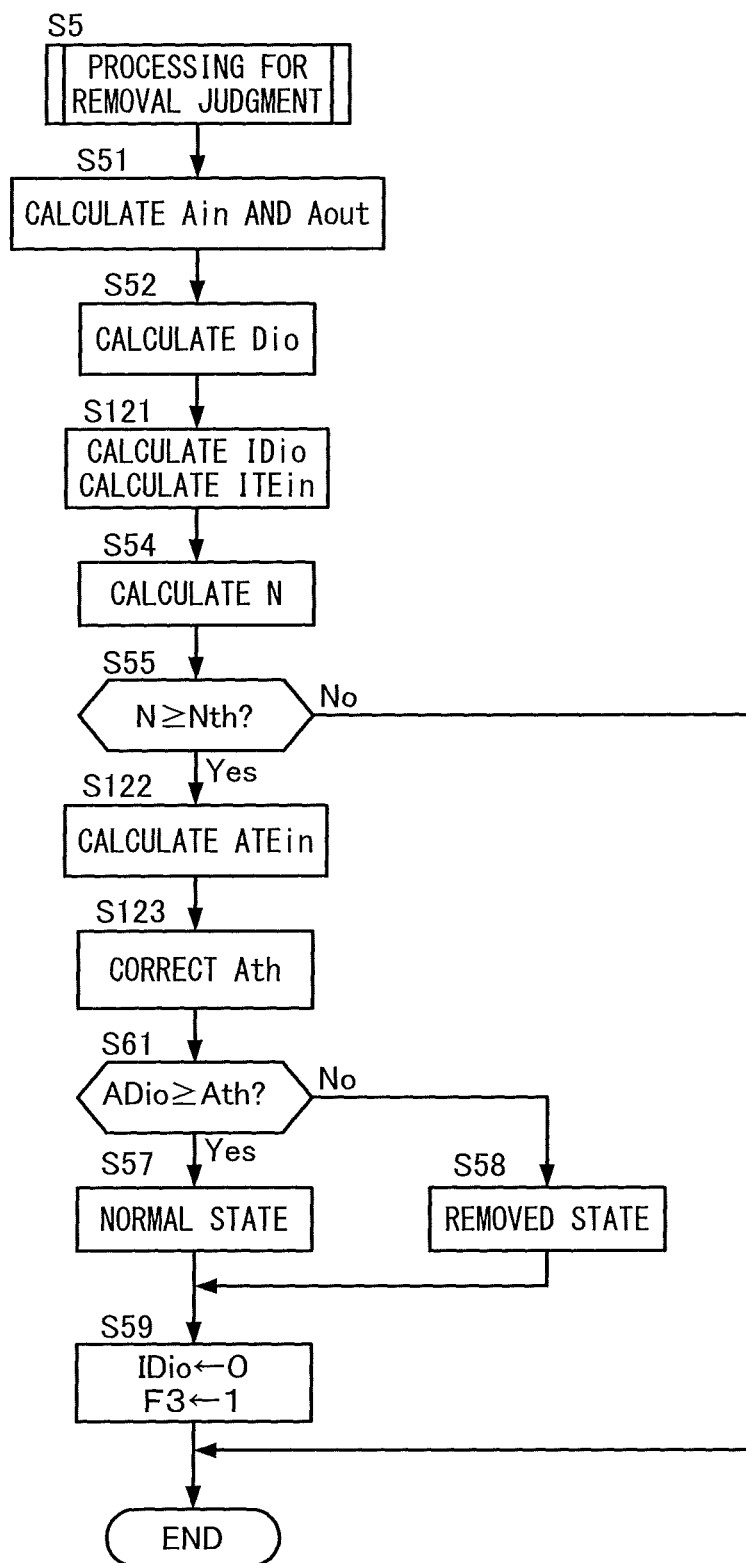
FIG. 18 is a flow chart for explaining processing for removal judgment according to an eighth embodiment of the present invention.

FIG. 18 is a flow chart for explaining details of processing for removal judgment according to the present embodiment. Note that in FIG. 18, the contents of the processing from step S51 to step S59 and the processing of step S61 are contents similar to the processing explained above in the first embodiment and fifth embodiment, so here explanations will be omitted.

At step S121, the electronic control unit 200 calculates the integrated value IDio of the differential value Dio (=IDio (previous value)+Dio) and calculates the integrated value ITEin (=ITEin (previous value)+TEin) of the first exhaust temperature TEin.

At step S122, the electronic control unit 200 divides the integrated value ITEin of the first exhaust temperature TEin by the number of samples N to calculate the average value ATEin of the first exhaust temperature TEin.

Figure 19:
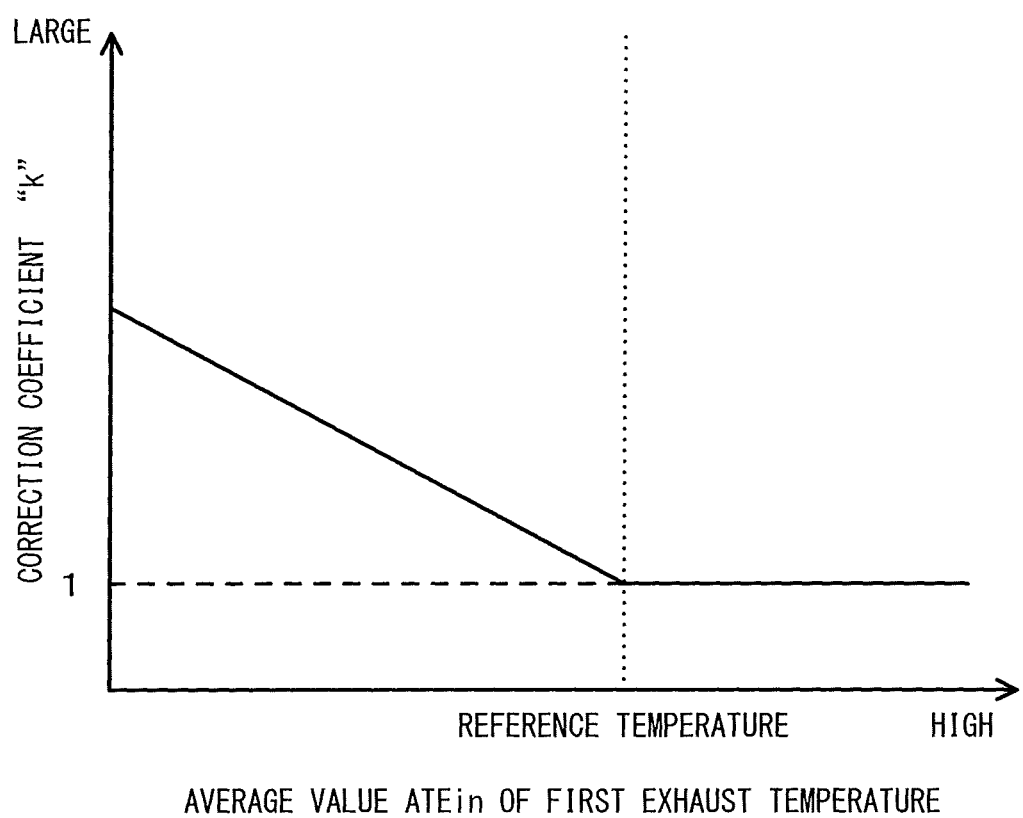
FIG. 19 shows one example of a table for calculating a correction coefficient based on an average value of first exhaust temperature.

At step S23, the electronic control unit 200 refers to the table of FIG. 19 and calculates the correction coefficient "k" for correcting the predetermined threshold value Ath based on the average value ATEin of the first exhaust temperature TEin. Further, the electronic control unit 200 multiplies the correction coefficient "k" with a predetermined threshold value Ath to correct the predetermined threshold value Ath.

As shown in the table of FIG. 19, the correction coefficient "k" is set to a value whereby the predetermined reference temperature Ath becomes larger the lower the average value ATEin of the first exhaust temperature TEin from the reference temperature (for example, 600[° C.]) This is because, as explained above, at the time of deceleration, the more the first exhaust temperature fell relatively from the low state, the smaller the integrated value IDio of the differential value Dio tends to become. Note that in the present embodiment, the correction coefficient "k" is set to "1" if the average value ATEin of the first exhaust temperature TEin is higher than a certain reference temperature, but this is because if the average value ATEin of the first exhaust temperatures TEin is higher than a certain reference temperature, almost no difference arises in the integrated value IDio of the differential value Dio.

Figure 20:
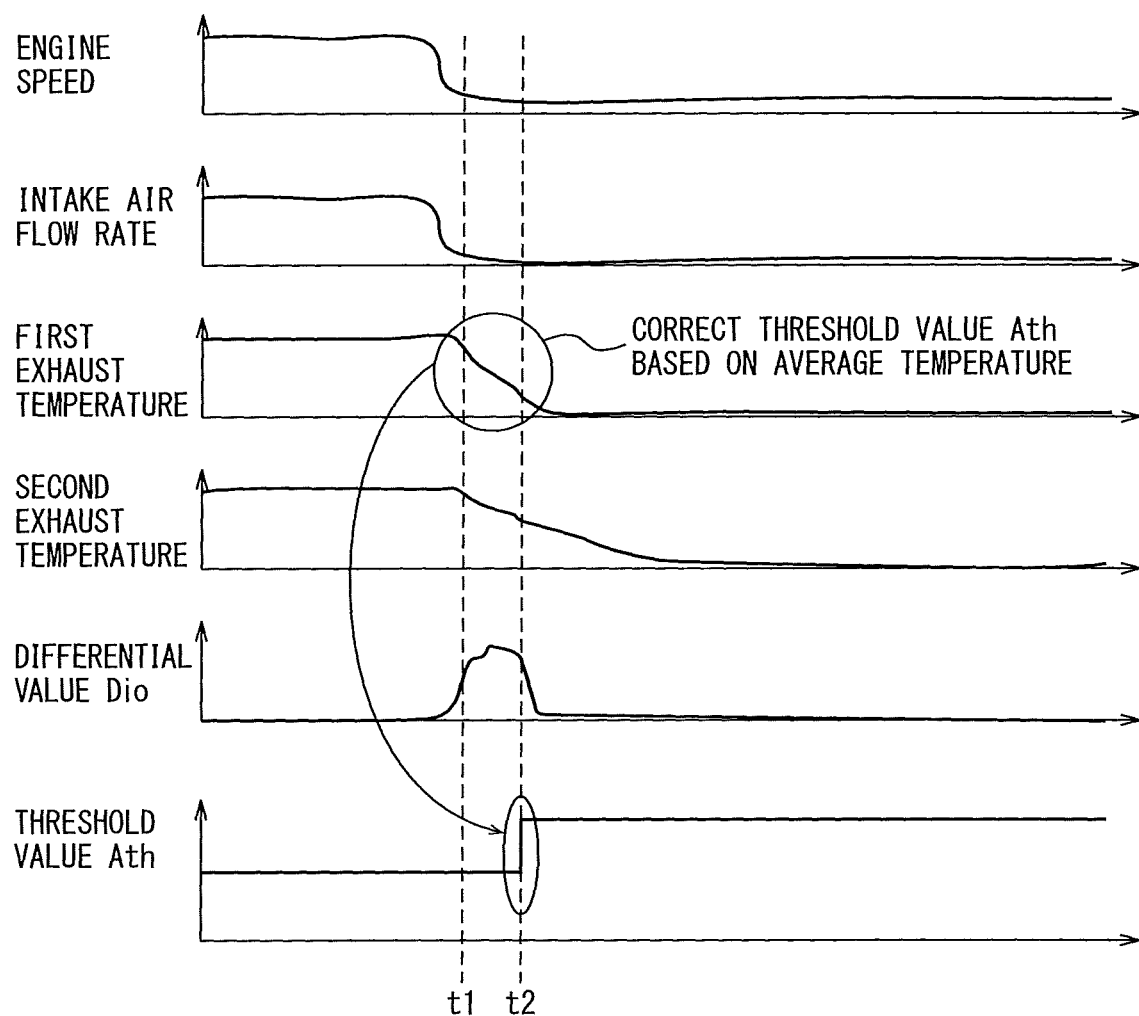
FIG. 20 is a time chart explaining an operation for processing for removal judgment according to the eighth embodiment of the present invention.

FIG. 20 is a time chart explaining operation of processing for removal judgment according to the present embodiment.

If at the time t1 the precondition and run condition stand, the differential value Dio is calculated every control period of the electronic control unit 200.

If at the time t2 the number of samples N of the differential values Dio becomes the predetermined number Nth or more, the correction coefficient "k" is calculated based on the average value ATEin of the first exhaust temperature TEin acquired in the period during which the differential value Dio was calculated. Further, the predetermined threshold value Ath is corrected based on the correction coefficient "k".

Note that in the present embodiment, the correction coefficient "k" was calculated based on the average value ATEin of the first exhaust temperatures TEin, but the invention is not limited to this. The correction coefficient "k" may also be calculated based on a parameter correlated with the average value ATEin in a correspondence relationship with the average value ATEin of the first exhaust temperature TEin (for example, the bed temperature of the PM trapping device 50 etc.).

Figure 21:
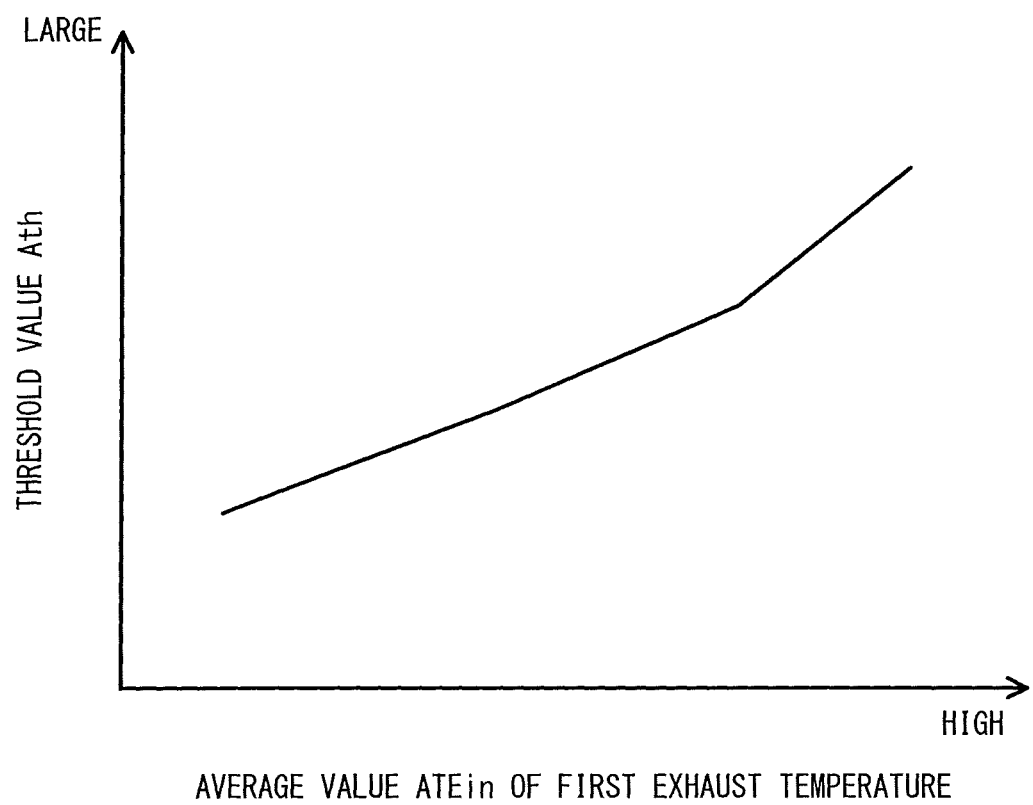
FIG. 21 shows one example of a table for setting a threshold value based on an average value of first exhaust temperature.

Further, in the present embodiment, the predetermined threshold value Ath when the average value ATEin of the first exhaust temperature TEin is a certain reference temperature was used as the reference to correct that predetermined threshold value Ath, but the invention is not limited to this. For example, as shown in the table of FIG. 21, it is also possible to set the value of the predetermined threshold value Ath for each average value ATEin of the first exhaust temperature TEin and refer to the table to set the value of the predetermined threshold value Ath based on the average value ATEin of the first exhaust temperature TEin. As mentioned above, even if the run condition for performing judgment of whether the state is a removed state stands for exactly the same time period, the magnitude of the integrated value IDio of the differential value Dio calculated in that time period becomes smaller at the time of deceleration when the first exhaust temperature has fallen from a relatively low state. Therefore, as shown in FIG. 21, the smaller the average value ATEin of the first exhaust temperature TEin, the smaller the value of the predetermined threshold value Ath.

The judgment part according to the present embodiment explained above is further provided with a correction part correcting the predetermined threshold value Ith (or predetermined threshold value Ath) based on the average value ATEin of the first exhaust temperature in the time period of calculation of the differential value Dio or a parameter with correspondence with this average value ATEin. The parameter with correspondence with the average value ATEin of the first exhaust temperature is, for example, the temperature of the filter 52 of the PM trapping device 50.

Further, the correction part is configured so that it increases the predetermined threshold value Ith (or predetermined threshold value Ath) when the average value ATEin of the first exhaust temperature or the parameter with correspondence with the average value ATEin is small, compared to when it is large.

Due to this, at the time of deceleration, in judging if the state is a removed state, it is possible to set a suitable threshold voltage in accordance with the engine operating state before deceleration. For this reason, at the time of deceleration, it is possible to further improve the accuracy of judgment of whether the state is a removed state.

Ninth Embodiment

Next, a ninth embodiment of the present invention will be explained. The present embodiment differs from the above embodiments in contents of the processing for removal judgment. Below, the points of difference will be focused on in the explanation.

In the above-mentioned first embodiment, the differential value Dio (=|Ain|−Aout) between the absolute value of the rate of change over time Ain of the first exhaust temperature and the absolute value of the rate of change over time Aout of the second exhaust temperature when the precondition and run condition stand was calculated and the integrated value IDio of the differential value Dio was compared with the predetermined threshold value Ith to thereby judge if the state was a removed state.

As opposed to this, in the present embodiment, the integrated value IRio of the ratio Rio (=Aout/Ain) of the rate of change over time Aout of the second exhaust temperature with respect to the rate of change over time Ain of the first exhaust temperature is compared with a predetermined threshold value IRth to thereby judge if the state is a removed state. Below, the reason for this will be explained.

If defining the amount of change per micro time of the first exhaust temperature as dTEin, defining the mass of the exhaust flowing into the PM trapping device 50 per micro time (=exhaust flowing out from the PM trapping device 50) as "m", and defining the specific heat of the exhaust as "c", the amount of change dQ1 per micro time of the amount of heat of the exhaust flowing into the PM trapping device 50 becomes as in the following formula (1). Further, if defining the amount of change per micro time of the second exhaust temperature as dTEout, the amount of change dQ2 per micro time of the amount of heat of the exhaust flowing out from the PM trapping device 50 becomes as in the following formula (2):

$$dQ1 = m \times c \times dTEin \quad (1)$$

$$dQ2 = m \times c \times dTEout \quad (2)$$

Here, the amount of change dTEin of the first exhaust temperature and the amount of change dTEout of the second exhaust temperature are respectively synonymous with the rate of temperature change Ain of the first exhaust temperature and the rate of temperature change Aout of the second exhaust temperature, so, based on the formula (1) and formula (2), the differential value Dio and ratio Rio can respectively be expressed as shown in the following formula (3) and formula (4):

$$Dio = |Ain| - |Aout| = (|dQ1| - |dQ2|)/(m \times c) \quad (3)$$

$$Rio = Aout/Ain = dQ2/dQ1 \quad (4)$$

As clear from formula (3), the differential value Dio becomes a value changing due to the effect of the mass "m" of the exhaust flowing into the PM trapping device 50 per micro time, that is, the exhaust flow rate Ge. Therefore, at the time of operation where the exhaust flow rate Ge changes (for example, at the time of acceleration or other time of transitory operation), variation easily arises in the calculated differential value Dio. Further, if in this way variation occurs in the value of the differential value Dio calculated in accordance with the exhaust flow rate Ge and in turn the engine operating state when the precondition and run condition stand, even if integrating the differential value Dio of the same number of samples N, the integrated value IDio is liable to become less than the predetermined threshold value Ith in accordance with the engine operating state or to become the predetermined threshold value Ith or more. That is, the accuracy of judgment of whether the state is a removed state is liable to fall.

On the other hand, as clear from the formula (4), the ratio Rio is not affected by the mass "m" of exhaust flowing out from the PM trapping device 50 per micro time, that is, the exhaust flow rate Ge. Therefore, even if the engine operating state changes when the exhaust flow rate Ge and in turn the precondition and run condition stand, no variation occurs in the value of the ratio Rio calculated. For this reason, rather than comparing the integrated value IDio of the differential value Dio with a predetermined threshold value Ith to judge if the state is a removed state, by comparing the integrated value IRio of the ratio Rio with a predetermined threshold value IRth to judge if the state is a removed state, it is possible to improve the accuracy of judgment by exactly the amount of lack of effect of the exhaust flow rate Ge.

Therefore, in the present embodiment, the integrated value IRio of the ratio Rio is compared with a predetermined threshold value IRth to thereby judge if the state is a removed state.

Figure 22:
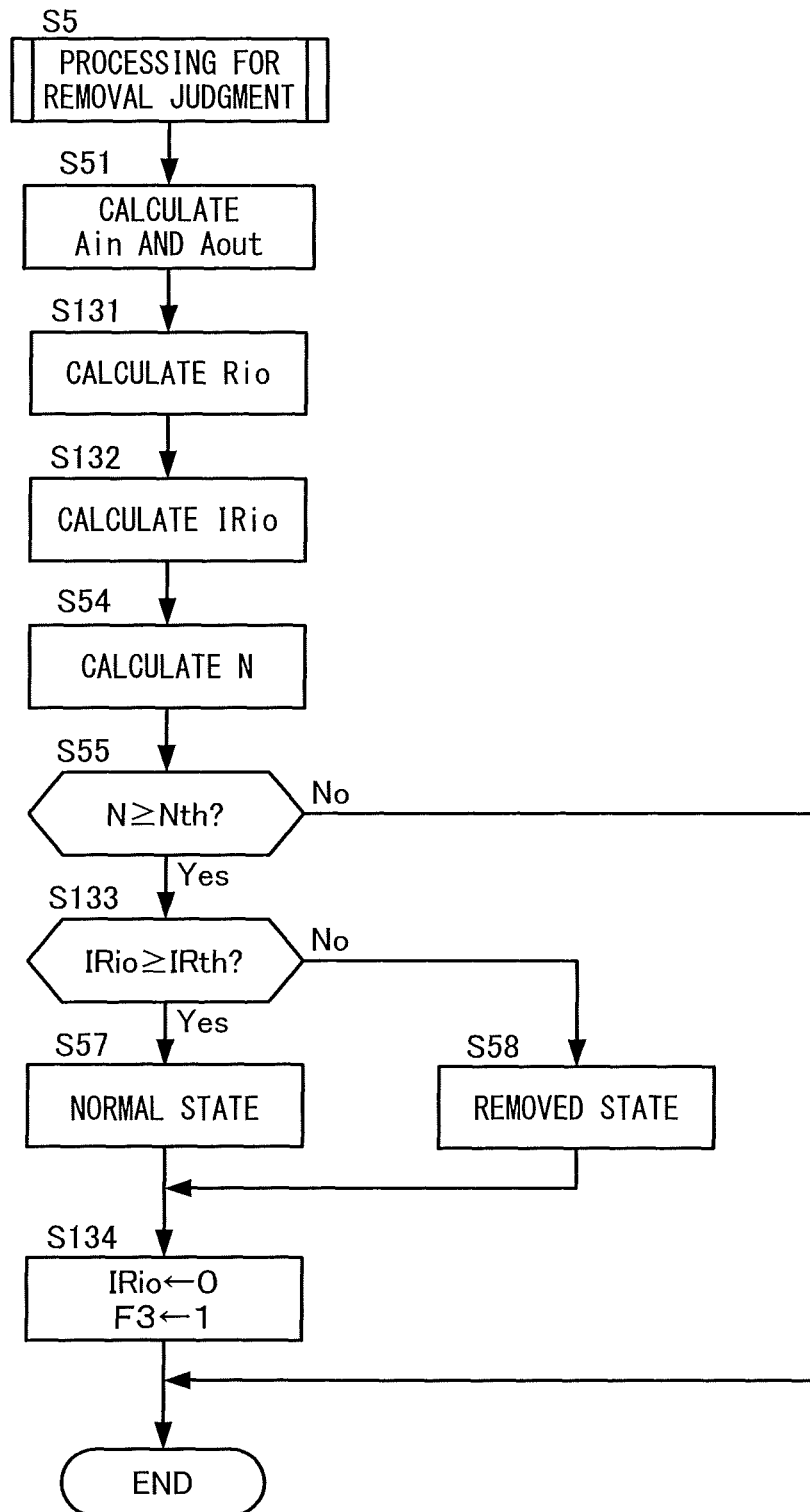
FIG. 22 is a flow chart for explaining details of processing for removal judgment according to a ninth embodiment of the present invention.

FIG. 22 is a flowchart for explaining details of processing for removal judgment according to the present embodiment. Note that in FIG. 22, the contents of the processing from step S5 to step S58 are contents similar to the processing explained above in the first embodiment, so here explanations will be omitted.

At step S131, the electronic control unit 200 calculates the ratio Rio (=Aout/Ain) of the rate of change over time Aout of the second exhaust temperature to the rate of change over time Ain of the first exhaust temperature. Note that the ratio Rio may also be calculated based on the absolute values of the rates of change over time Ain and Aout.

At step S132, the electronic control unit 200 calculates the integrated value IRio of the ratio Rio (=IRio (previous value)+Rio).

At step S133, the electronic control unit 200 judges if the integrated value IRio is a predetermined threshold value IRth or more. If the integrated value IRio is the predetermined threshold value IRth or more, the electronic control unit 200 proceeds to the processing of step S57. On the other hand, if the integrated value IRio is less than the predetermined threshold value IRth, the electronic control unit 200 proceeds to the processing of step S58.

At step S134, the electronic control unit 200 returns the integrated value IRio to the initial value of zero and sets the run completion flag F3 of the processing for removal judgment to "1". The run completion flag F3 of the processing for removal judgment is returned to the initial value of zero at the time of the end of the trip or the time of start.

Note that, in the present embodiment, the integrated value IRio of the ratio Rio was compared with a predetermined threshold value IRth, but in the same way as the above-mentioned second embodiment, it is also possible to compare the average value ARio of the ratio Rio with a predetermined threshold value ARth to thereby judge if the state is a removed state.

The judgment part according to the present embodiment explained above is provided with a ratio calculation part calculating a ratio Rio between the rate of change over time Ain of the first exhaust temperature and the rate of change over time Aout of the second exhaust temperature and an integrated value calculation part calculating an integrated value IRio obtained by integrating a certain number or more of values of the ratio Rio and is configured so as to judge that the state is a removed state if the integrated value IRio is less than the predetermined threshold value IRth.

As explained above, the ratio Rio is a parameter which is not affected by the exhaust flow rate Ge, so even if the engine operating state changes and, as a result, the exhaust flow rate Ge changes, variation easily arises in the value of the ratio Rio calculated. For this reason, by comparing the integrated value IRio of the ratio Rio with a predetermined threshold value IRth to judge if the state is a removed state, it becomes possible to improve the accuracy of judgment by exactly the amount of the effect of the exhaust flow rate Ge not being felt compared when comparing the integrated value IDio of the differential value Dio with a predetermined threshold value Ith to judge if the state is a removed state.

10th Embodiment

Next, a 10th embodiment of the present invention will be explained. The present embodiment differs from the ninth embodiment in the contents of the processing for run condition judgment. Below, the points of difference will be focused on in the explanation.

In the ninth embodiment, as explained above, the ratio Rio is not affected by the exhaust flow rate Ge, so it is possible to accurately detect if the state is a removed state even at the time of acceleration. Further, at the time of acceleration and the time of deceleration, a difference easily arises between the rate of change over time Ain of the first exhaust temperature and the rate of change over time Aout of the second exhaust temperature, so it is possible to relatively accurately judge if the state is a removed state.

Therefore, in the present embodiment, in judging if the state is a removed state by comparing the integrated value IRio of the ratio Rio with a predetermined threshold value IRth, to further improve the accuracy of judgment, it was decided to change the contents of the processing for run condition judgment so as to enable the processing for removal judgment to be performed at the time of acceleration and the time of deceleration.

Figure 23:
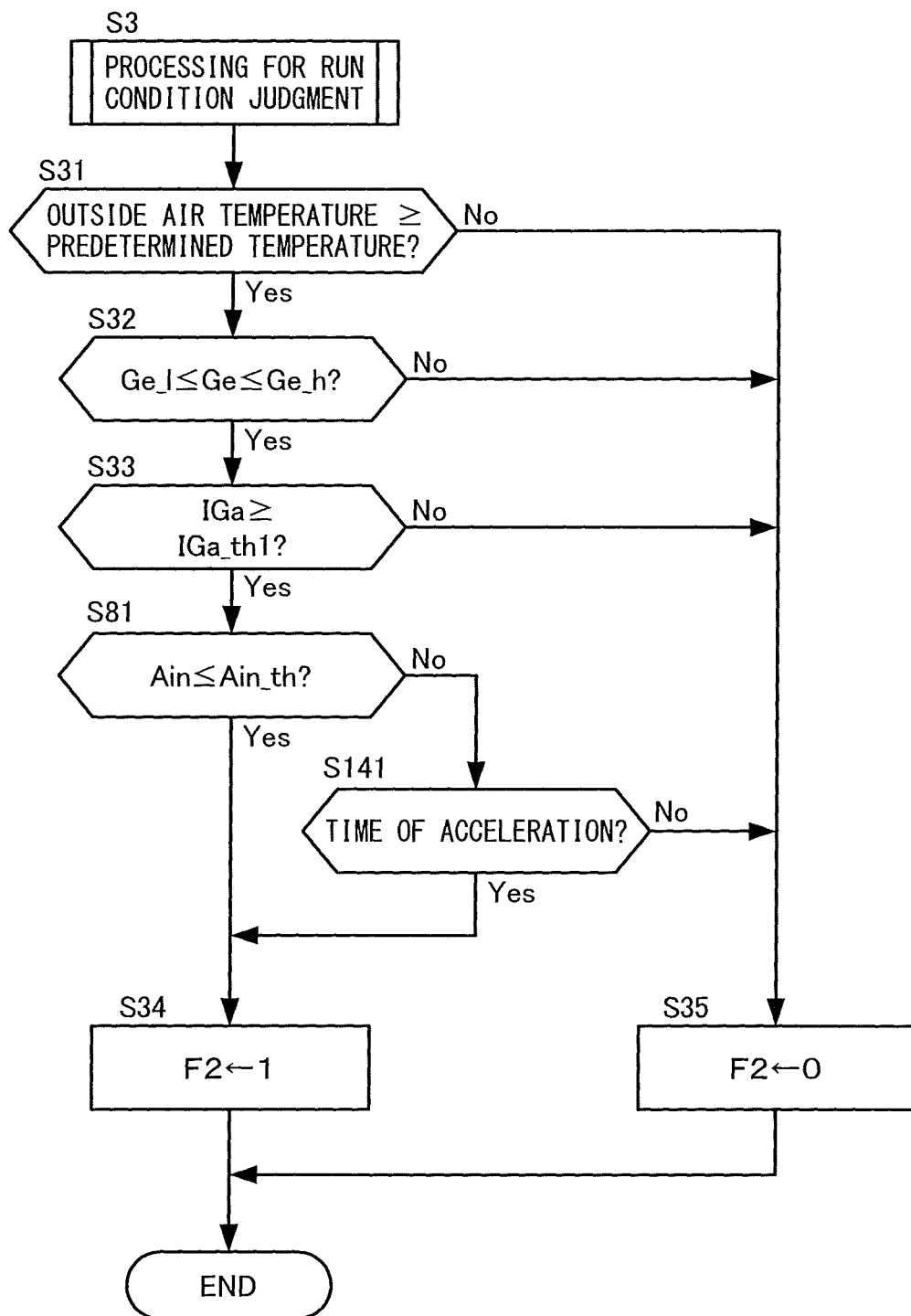
FIG. 23 is a flow chart for explaining details of processing for run condition judgment according to a 10th embodiment of the present invention.

FIG. 23 is a flowchart for explaining details of processing for run condition judgment according to the present embodiment. Note that in FIG. 23, the contents of the processing from step S31 to step S35 and the processing of step S81 are similar to the contents of the processing explained in the first embodiment etc., so explanations will be omitted here.

At step S141, the electronic control unit 200 judges if the vehicle is accelerating. The method of judging if it is accelerating is not particularly limited. For example, it is possible to judge this by detecting if the flow rate of intake air Ga is a predetermined flow rate or more, if the amount of change of the flow rate of intake air Ga in a predetermined time is a predetermined amount or more, etc. If the vehicle is accelerating, the electronic control unit 200 proceeds to the processing of step S34. On the other hand, if the vehicle is not accelerating, the electronic control unit 200 proceeds to the processing of step S35.

According to the present embodiment explained above, the integrated value IRio of the ratio Rio is compared with a predetermined threshold value IRth to judge if the state is a removed state and that judgment is performed at both the time of acceleration and the time of deceleration in which relatively accurate judgment is possible, so it is possible to improve the accuracy of judgment while increasing the frequency of judgment as well.

11th Embodiment

Next, an 11th embodiment of the present invention will be explained. The embodiment differs from the above embodiments on the point of learning the response speed of the first exhaust temperature sensor 53 and correcting the detection value of the first exhaust temperature sensor 53 (that is, first exhaust temperature) based on the learning results. Below, the points of difference will be focused on in the explanation.

As explained above, a certain degree of time is required until a detection value of the first exhaust temperature sensor 53 actually changes to a value corresponding to the exhaust temperature of the exhaust passing through the vicinity of the first exhaust temperature sensor 53. Further, for the detection value of the second exhaust temperature sensor 54 as well, similarly, a certain degree of time is required until it actually changes to a value corresponding to the exhaust temperature of the exhaust passing through the vicinity of the second exhaust temperature sensor 54.

The response speeds of the exhaust temperature sensors 53 and 54 will sometimes van within the range of allowable error (manufacturing error) even if the first exhaust temperature sensor 53 and the second exhaust temperature sensor 54 are sensors of exactly the same structures. That is, even if the first exhaust temperature sensor 53 and the second exhaust temperature sensor 54 respectively are sensors of exactly the same structures, sometimes the response speeds of the exhaust temperature sensors 53 and 54 will become slower or faster in the range of allowable error compared with the average level response speeds of sensors having the same structures. Further, this variation in the response speeds of the exhaust temperature sensors 53 and 54 becomes a factor causing deterioration of the accuracy of judgment as to whether the state is a removed state. Below, referring to FIG. 24, the reasons will be explained.

Figure 24:
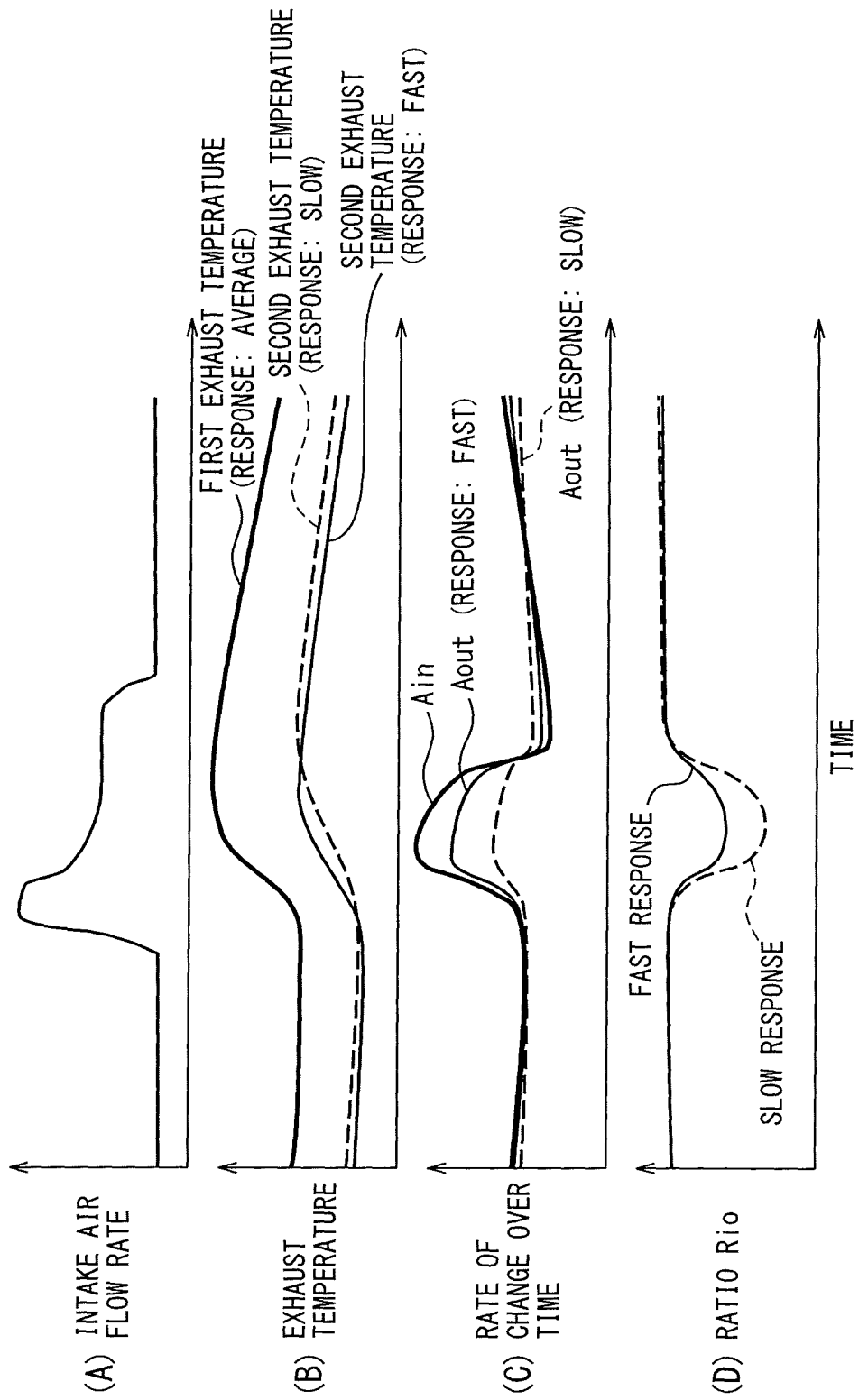
FIG. 24 is a time chart for explaining a reason why variation of response speeds of exhaust temperature sensors becomes a factor behind deterioration of an accuracy of judgment when judging if a state is a removed state.

FIG. 24 is a time chart for explaining the reason why variation of the response speeds of the exhaust temperature sensors 53 and 54 becomes a cause of deterioration of the accuracy of judgment as to whether the state is a removed state. It is a time chart showing the changes in temperature of the first exhaust temperature and the second exhaust temperature etc. at the time of acceleration when the internal combustion engine 100 is being operated in the normal state where the PM trapping device 50 has not been removed.

Note that, in the example shown in FIG. 24, the temperature of the PM trapping device 50 is lower than the first exhaust temperature and the heat of the exhaust flowing into the PM trapping device 50 is robbed at the PM trapping device 50, so the second exhaust temperature become lower than the first exhaust temperature.

Further, in FIG. 24, the temperature change of the first exhaust temperature shows the temperature change when the response speed of the first exhaust temperature sensor 53 was the average level response speed. On the other hand, regarding the temperature change of the second exhaust temperature 54, the temperature change when the response speed of the second exhaust temperature sensor 54 was faster than the average level response speed is shown by fine solid lines, while the temperature change when the response speed of the second exhaust temperature sensor 54 was slower than the average level response speed is shown by the fine broken lines.

As shown in FIG. 24(B), if the response speed of the second exhaust temperature sensor 54 is faster than the average level response speed, the temperature change of the second exhaust temperature becomes sharper compared with if it is slower. For this reason, the rate of change over time Aout of the second exhaust temperature in the case where as shown in FIG. 24(C) by the fine solid line the response speed of the second exhaust temperature sensor 54 is faster than the average level response speed becomes larger than the rate of change over time Aout of the second exhaust temperature in the case where as shown in FIG. 24(C) by the fine broken line the response speed of the second exhaust temperature sensor 54 is slower than the average level response speed.

As a result, if comparing the integrated value IRio of the ratio Rio with a predetermined threshold value IRth to judge if the state is a removed state, as shown in FIG. 24(D) by the solid line, the value of the ratio Rio (=Aout/Ain) calculated in the case where the response speed of the second exhaust temperature sensor 54 was faster than the average level response speed ends up becoming smaller than the value of the ratio Rio calculated when the response speed of the second exhaust temperature sensor 54 was slower than the average level response speed.

Further, while not shown, if comparing the integrated value IDio of the differential value Dio with a predetermined threshold value Ith to judge if the state is a removed state, the value of the differential value Dio (=|Ain|−|Aout|) calculated in the case where the response speed of the second exhaust temperature sensor 54 is faster than the average level response speed ends up becoming smaller than the value of the differential value Dio calculated in the case where the response speed of the second exhaust temperature sensor 54 was slower than the average level response speed.

Therefore, even if integrating the ratio Rio or differential value Dio of the same number of samples N acquired at the time of engine operating states of the same conditions, if there is variation in the response speeds of the exhaust temperature sensors 53 and 54, the value of the integrated value IRio or integrated value IDio ends up changing. For this reason, if there is variation in the response speeds of the exhaust temperature sensors 53 and 54, the values of the suitable threshold values to be set for judging if the removed state has occurred (values of predetermined threshold value IRth and predetermined threshold value Ith) will also end up changing.

Figure 25A:
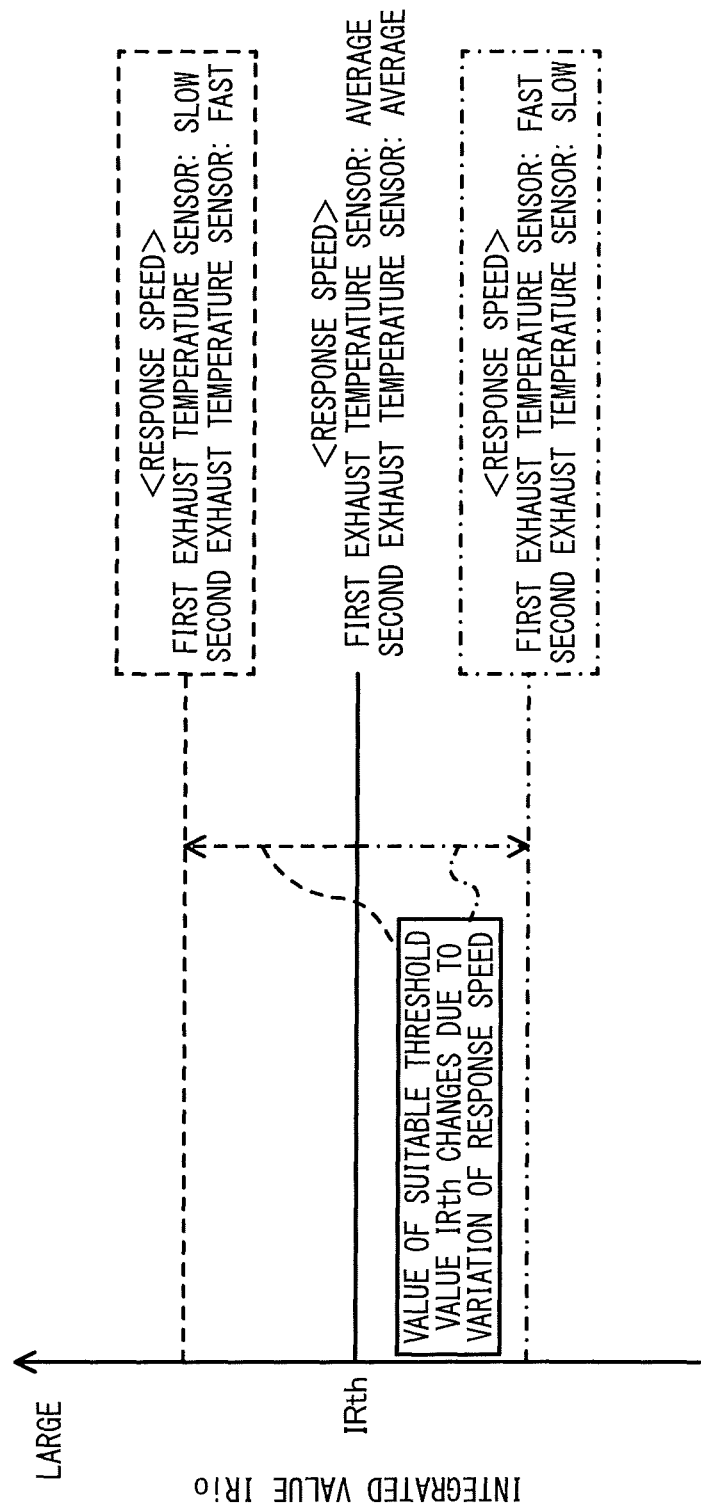
FIG. 25A is a view showing how a value which should be set as a threshold value changes due to variation of the response speeds of the exhaust temperature sensors when judging if a state is a removed state based on the ratio Rio.

FIG. 25A is a view showing how the value which should be set as the predetermined threshold value IRth changes due to variation in the response speeds of the exhaust temperature sensors 53 and 54 if comparing the integrated value IRio of the ratio Rio with a predetermined threshold value IRth to judge if the state is a removed state.

As shown in FIG. 25A, if making a suitable predetermined threshold value IRth for when the response speeds of the exhaust temperature sensors 53 and 54 are the average level response speeds the reference value, if the response speed of the first exhaust temperature sensor 53 was slower than the average level response speed and the response speed of the second exhaust temperature sensor 54 was faster than the average level response speed, the value to be set as the predetermined threshold value IRth becomes larger than the reference value. This is because if the response speed of the first exhaust temperature sensor 53 becomes slower than the average level response speed, the rate of change over time Ain of the first exhaust temperature becomes relatively small, while if the response speed of the second exhaust temperature sensor 54 becomes faster than the average level response speed, the rate of change over time Aout of the second exhaust temperature becomes relatively large, so the value of the ratio Rio tends to become relatively large.

Further, conversely, if the response speed of the first exhaust temperature sensor 53 is faster than the average level response speed and the response speed of the second exhaust temperature sensor 54 is slower than the average level response speed, the value to be set as the predetermined threshold value IRth becomes smaller than the reference value. This is because if the response speed of the first exhaust temperature sensor 53 is faster than the average level response speed, the rate of change over time Ain of the first exhaust temperature becomes relatively large, while if the response speed of the second exhaust temperature sensor 54 becomes slower than the average level response speed, the rate of change over time Aout of the second exhaust temperature becomes relatively small, so the value of the ratio Rio tends to become relatively small.

Figure 25B:
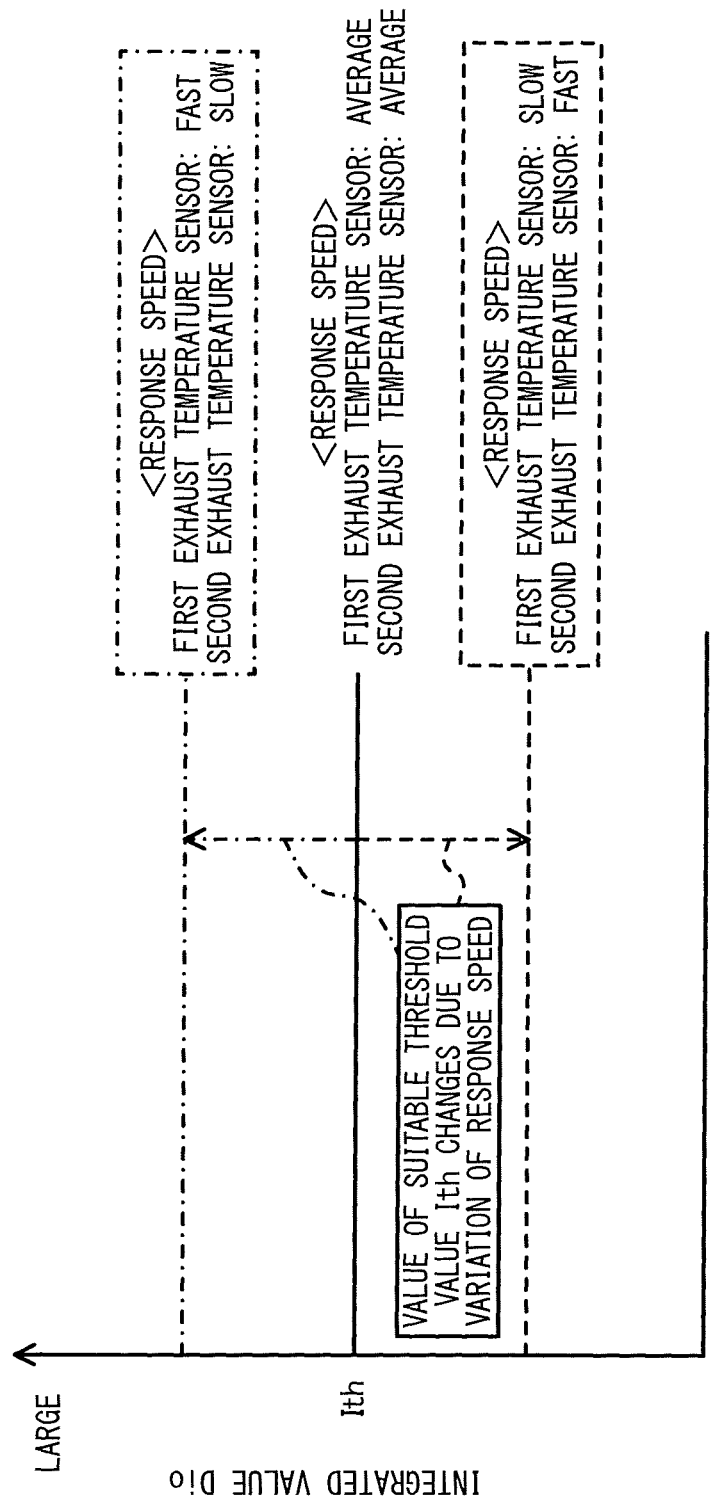
FIG. 25B is a view showing how a value to be set as a threshold value changes due to variation in response speeds of exhaust temperature sensors when judging if a state is a removed state based on a differential value Dio.

FIG. 25B is a view showing how the value to be set as the predetermined threshold value Ith changes due to variation in the response speeds of the exhaust temperature sensors 53 and 54 in the case of comparing the integrated value IDio of the differential value Dio with the predetermined threshold value th to judge if the state is a removed state.

As shown in FIG. 25B, if making a suitable predetermined threshold value Ith for when the response speeds of the exhaust temperature sensors 53 and 54 were average level response speeds the reference value, if the response speed of the first exhaust temperature sensor 53 was slower than the average level response speed and the response speed of the second exhaust temperature sensor 54 was faster than the average level response speed, the value to be set as the predetermined threshold value Ith becomes smaller than the reference value. This is because if the response speed of the first exhaust temperature sensor 53 becomes slower than the average level response speed, the rate of change over time Ain of the first exhaust temperature becomes relatively small, while if the response speed of the second exhaust temperature sensor 54 becomes faster than the average level response speed, the rate of change over time Aout of the second exhaust temperature becomes relatively large, so the value of the differential value Dio tends to become relatively small.

Further, conversely, if the response speed of the first exhaust temperature sensor 53 was faster than the average level response speed and the response speed of the second exhaust temperature sensor 54 was slower than the average level response speed, the value to be set as the predetermined threshold value Ith becomes larger than the reference value. This is because if the response speed of the first exhaust temperature sensor 53 becomes faster than the average level response speed, the rate of change over time Ain of the first exhaust temperature becomes relatively large, while if the response speed of the second exhaust temperature sensor 54 becomes slower than the average level response speed, the rate of change over time Aout of the second exhaust temperature becomes relatively small, so the value of the differential value Dio tends to become relatively large.

If in this way there is variation in the response speeds of the exhaust temperature sensors 53 and 54, the suitable values of threshold values to be set for judging if the state is a removed state (values of predetermined threshold value IRth and predetermined threshold value Ith) change. Further, the values of these threshold values are usually determined based on the ratio Rio or differential value Dio obtained when the response speeds of the exhaust temperature sensors 53 and 54 were the average level response speeds. For this reason, for example, if there is variation in the response speeds of the exhaust temperature sensors 53 and 54 and value of the ratio Rio or the differential value Dio becomes relatively small or large, the accuracy of judgment of whether the state is a removed state falls.

As a method for solving such a problem, for example, it may be considered to perform learning of the response speeds of the exhaust temperature sensors 53 and 54 and, based on the results of learning, correct the rate of change over time Ain of the first exhaust temperature or the rate of change over time Aout of the second exhaust temperature to the rate of change over time Ain of the first exhaust temperature or the rate of change over time Aout of the second exhaust temperature for which the response speeds of the exhaust temperature sensors 53 and 54 were the average level response speeds.

However, to perform learning of the first exhaust temperature sensor 53 and the response speed of the second exhaust temperature sensor 54 with good accuracy, it is necessary to compare the first exhaust temperature sensor 53 and the response speed of the second exhaust temperature sensor 54 under the same conditions.

At this time, the first exhaust temperature basically depends on the engine operating state, so in comparing the response speed of the first exhaust temperature sensor 53 under the same conditions, it is sufficient to detect the response speed of the first exhaust temperature sensor 53 at the time of a certain limited engine operating state. However, the second exhaust temperature is affected by the temperature of the PM trapping device 50 in addition to the engine operating state, so even if detecting the response speed of the second exhaust temperature sensor 54 at the time of a certain limited engine operating state, sometimes the temperature of the PM trapping device 50 at that time will differ. For this reason, for the second exhaust temperature sensor 54, it is difficult to compare the response speed under the same conditions.

Therefore, in the present embodiment, it was decided to perform learning of only the response speed of the first exhaust temperature sensor 53 and, based on the results of learning, correct only the rate of change over time Ain of the first exhaust temperature to the rate of change over time Ain of the first exhaust temperature in the case where the response speed of the first exhaust temperature sensor 53 was the average level response speed.

Figure 26:
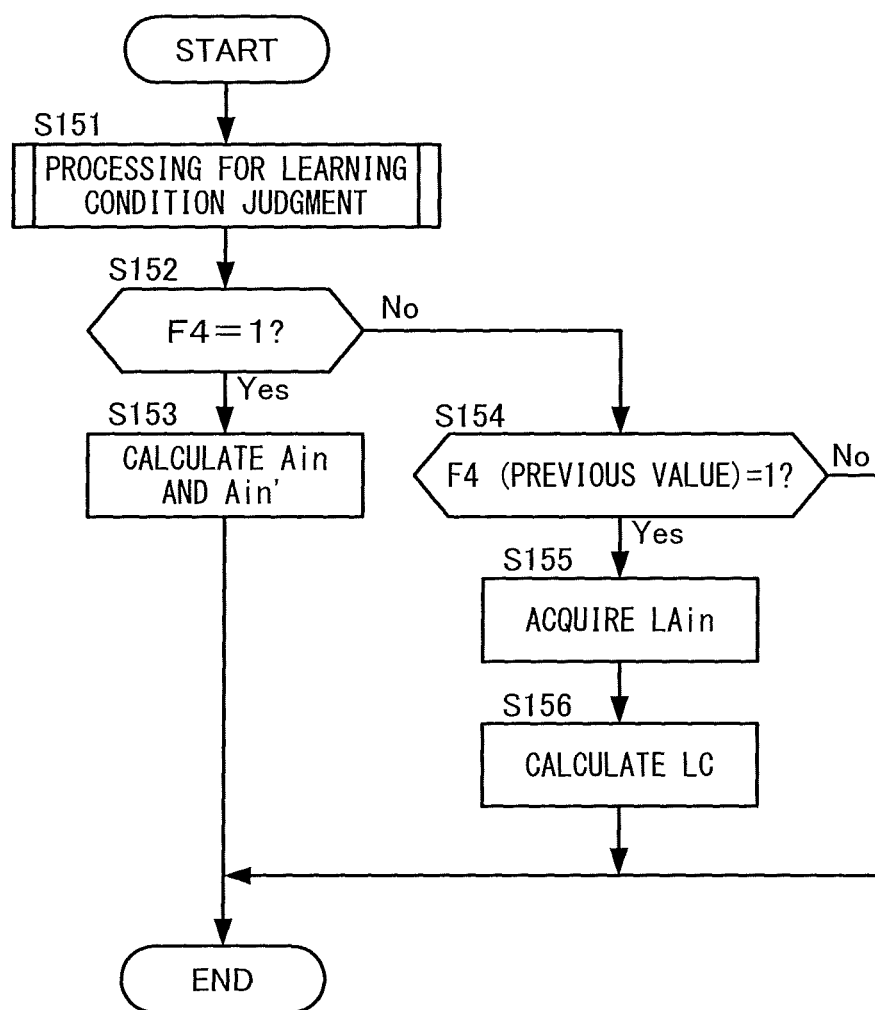
FIG. 26 is a flow chart for explaining learning control according to an 11th embodiment of the present invention for learning a response speed of the first exhaust temperature sensor.

FIG. 26 is a flow chart explaining learning control according to the present embodiment for learning of the response speed of the first exhaust temperature sensor 53.

At step S151, the electronic control unit 200 performs processing for learning condition judgment for judging if the learning condition for accurately learning of the response speed of the first exhaust temperature sensor 53 stands. Below, details of the processing for learning condition judgment will be explained with reference to FIG. 27.

Figure 27:
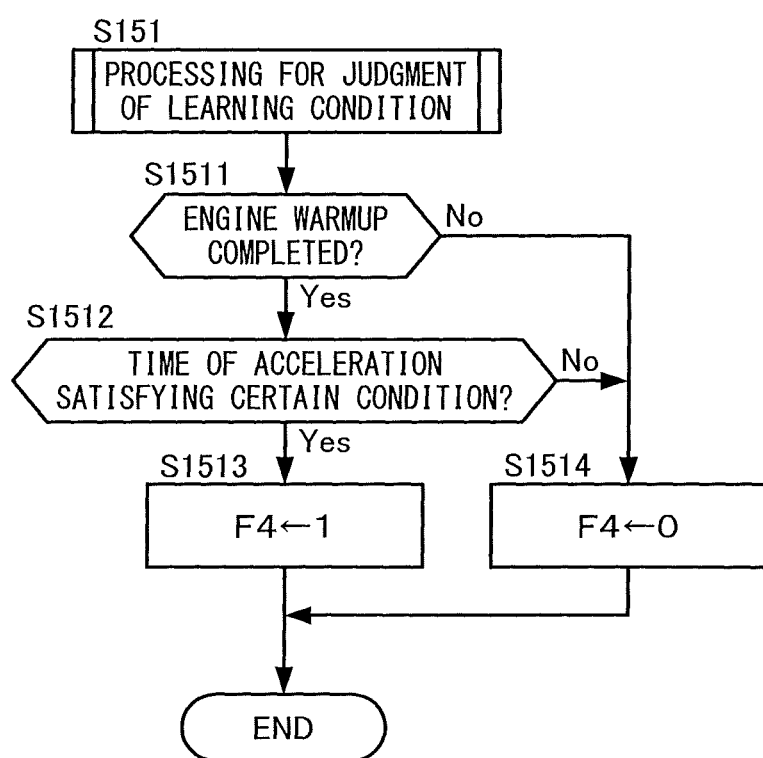
FIG. 27 is a flow chart for explaining details of processing for judgment of a learning condition.

FIG. 27 is a flow chart for explaining details of processing for learning condition judgment.

At step S1511, the electronic control unit 200 judges if the internal combustion engine 100 has finished being warmed up. This is because before the internal combustion engine 100 finishes being warmed up, the exhaust pipe 22 is not warmed and the first exhaust temperature is liable to end up changing due to the effect of radiation of heat from the exhaust pipe 22. If the internal combustion engine 100 finishes being warmed up, the electronic control unit 200 proceeds to the processing of step S1512. On the other hand, if the internal combustion engine 100 has not finished being warmed up, the electronic control unit 200 proceeds to the processing of step S1514.

Note that in the present embodiment, if the integrated value IGa of the flow rate of intake air Ga from when starting the internal combustion engine 100 is the first integrated value IGa_th1 or more, the electronic control unit 200 judges that the internal combustion engine 100 has finished being warmed up, but in place of this or together with this, for example, it is also possible to judge that the temperature of the cooling water for cooling the engine body 10 has become a predetermined temperature or more and judge if the internal combustion engine 100 has finished being warmed up.

At step S1512, the electronic control unit 200 judges if the time is that of acceleration where a certain constant condition is satisfied. It is first judged whether the time is that of acceleration in this way because at the time of acceleration, the change of temperature of the first exhaust temperature (temperature rise) tends to become larger which makes it suitable for detecting a difference in change of temperature due to a difference in the response speed of the first exhaust temperature sensor 53. Further, the time is limited to that of acceleration where a certain constant condition is satisfied from among the times of acceleration because even at the time of acceleration, if a condition of acceleration (for example, engine operating state before acceleration, engine operating state at the time of acceleration, etc.) differs, the rate of change over time of the first exhaust temperature Ai will end up changing and the accuracy of learning will end up deteriorating.

In the present embodiment, the electronic control unit 200 judges if the first exhaust temperature at the time of start of acceleration (before acceleration) falls within a predetermined range (for example, a range of 250[° C.] to 350[° C.]), whether the flow rate of intake air Ga at the time of acceleration falls within a predetermined range (for example, a range of 20 [g/s] to 25 [g/s]) etc. and, if these conditions are satisfied, proceeds to the processing of step S1513. On the other hand, if these conditions do not stand, the routine proceeds to the processing of step S1514. Note that, in the case of an engine intermittent operation vehicle, as an above-mentioned condition, judgment of whether the engine stopping time Ts is a time of acceleration after a predetermined time may also be added.

At step S1513, the electronic control unit 200 sets the learning condition standing flag F4 to "1".

At step S1514, the electronic control unit 200 sets the learning condition standing flag F4 to "0".

Returning to FIG. 26, at step S152, the electronic control unit 200 judges if the learning condition standing flag F4 has been set to "1". The learning condition standing flag F4 is a flag which is set to "1" or "0" in processing for judgment of the learning condition. The learning condition standing flag F4 is set to an initial value of "0". When it is judged in the processing for judgment of the learning condition that the learning condition stands, it is set to "1". If the learning condition standing flag F4 has been set to "1", the electronic control unit 200 proceeds to the processing of step S153. On the other hand, if the learning condition standing flag F4 has been set to "0", the electronic control unit 200 proceeds to the processing of step S154.

At step S153, the electronic control unit 200 calculates the rate of changeover time Ain of the first exhaust temperature (=first order time derivative of first exhaust temperature) and the time derivative Ain' of the rate of change over time Ain (=second order time derivative of first exhaust temperature) based on the detection value of the first exhaust temperature sensor 53.

At step S154, the electronic control unit 200 judges if the previous value of the learning condition standing flag F4 was "1". That is, it judges if the learning condition stood up to right before and whether the rate of change over time Ain of the first exhaust temperature and the time derivative Ain' of the rate of change over time Ain were acquired. If the previous value of the learning condition standing flag F4 was "1", the electronic control unit 200 proceeds to the processing of step S155. On the other hand, if the previous value of the learning condition standing flag F4 was "0", the electronic control unit 200 ends the current processing.

At step S155, the electronic control unit 200 acquires as the learning use rate of change over time LAin the rate of change over time Ain at which the time derivative Ain' becomes maximum from the rates of change over time Ain of the first exhaust temperature acquired in the time period during which the learning condition stood. This is because at the timing when the speed of response to a temperature change became greatest, the difference in response due to a difference in the speed of response of the first exhaust temperature sensor 53 tends to greatly appear.

At step S156, the electronic control unit 200 calculates the learning coefficient LC based on the learning use rate of change over time LAin. The specific method of calculation of this learning coefficient LC will be explained while referring to FIG. 28.

Figure 28:
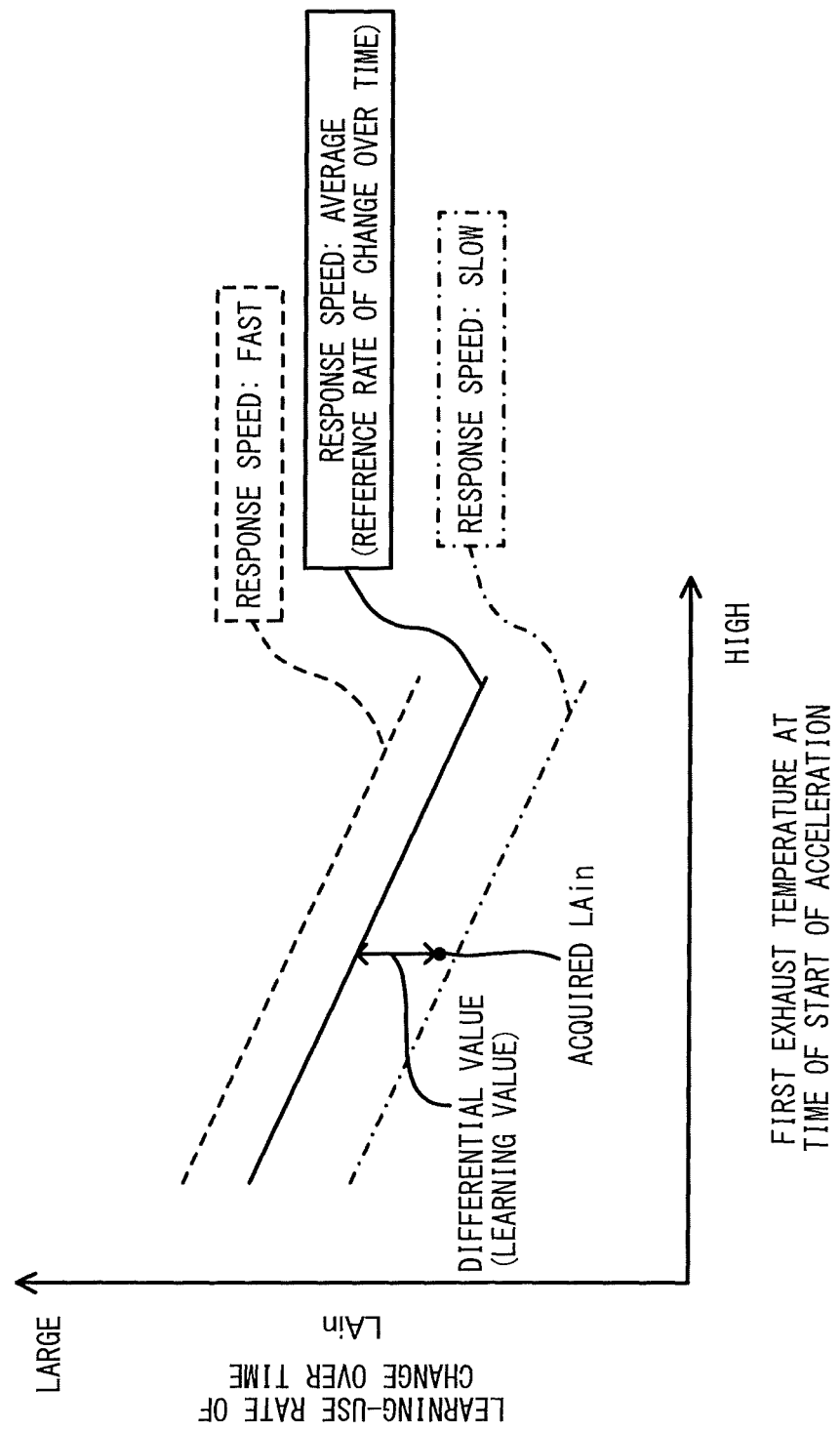
FIG. 28 is a view showing a difference in a learning use rate of change over time LAin when acquiring a rate of change over time where a time derivative Ain' becomes maximum as the learning use rate of change over time LAin for each response speed of first exhaust temperature sensor from among rates of change over time Ain of the first exhaust temperature acquired at the time of acceleration where a certain constant condition is satisfied for each first exhaust temperature at the time of start of acceleration.

FIG. 28 is a view showing, for each first exhaust temperature at the time of start of acceleration, the difference of the learning use rate of change over time LAin when acquiring the rate of change over time Ain where the time derivative Ain' becomes maximum as the learning use rate of change over time Lain for each response speed of first exhaust temperature sensor 53 from among the rates of change over time Ain of the first exhaust temperature acquired at the time of acceleration where certain constant conditions explained above were satisfied.

As shown in FIG. 28, regardless of the response speed of the first exhaust temperature sensor 53, the higher the first exhaust temperature at the start of acceleration, the smaller the learning use rate of change over time LAin.

On the other hand, if comparing the learning use rate of change over time LAin in the case where the response speed of the first exhaust temperature sensor 53 is the average level response speed and the learning use rate of change over time LAin in the case where the response speed of the first exhaust temperature sensor 53 is slower than the average level response speed, the differential value of these becomes generally constant regardless of the first exhaust temperature at the time of start of acceleration. Further, even if comparing the learning use rate of change over time LAin in the case where the response speed of the first exhaust temperature sensor 53 is the average level response speed and the learning use rate of change over time LAin in the case where the response speed of the first exhaust temperature sensor 53 is faster than the average level response speed, the differential value of these becomes generally constant regardless of the first exhaust temperature at the time of start of acceleration.

Therefore, if finding the learning use rate of change over time LAin in the case where the response speed of the first exhaust temperature sensor 53 is the average level response speed for each first exhaust temperature at the time of start of acceleration as the reference rate of change over time LAin_b in advance by experiments etc., it is possible to calculate the differential value of the reference rate of change over time LAin_b corresponding to the first exhaust temperature at the time of start of acceleration and the acquired learning use rate of change over time LAin.

Further, in the present embodiment, based on the thus calculated current differential value and the past calculated differential values, the average value of the differential values calculated up to now is calculated as the learning coefficient LC. Due to this, by adding this learning coefficient LC to the rate of change over time Ain of the first exhaust temperature, it is possible to correct the rate of change over time Ain of the first exhaust temperature to the rate of change over time Ain in the case where the response speed of the first exhaust temperature sensor 53 was an average level response speed.

Figure 29:
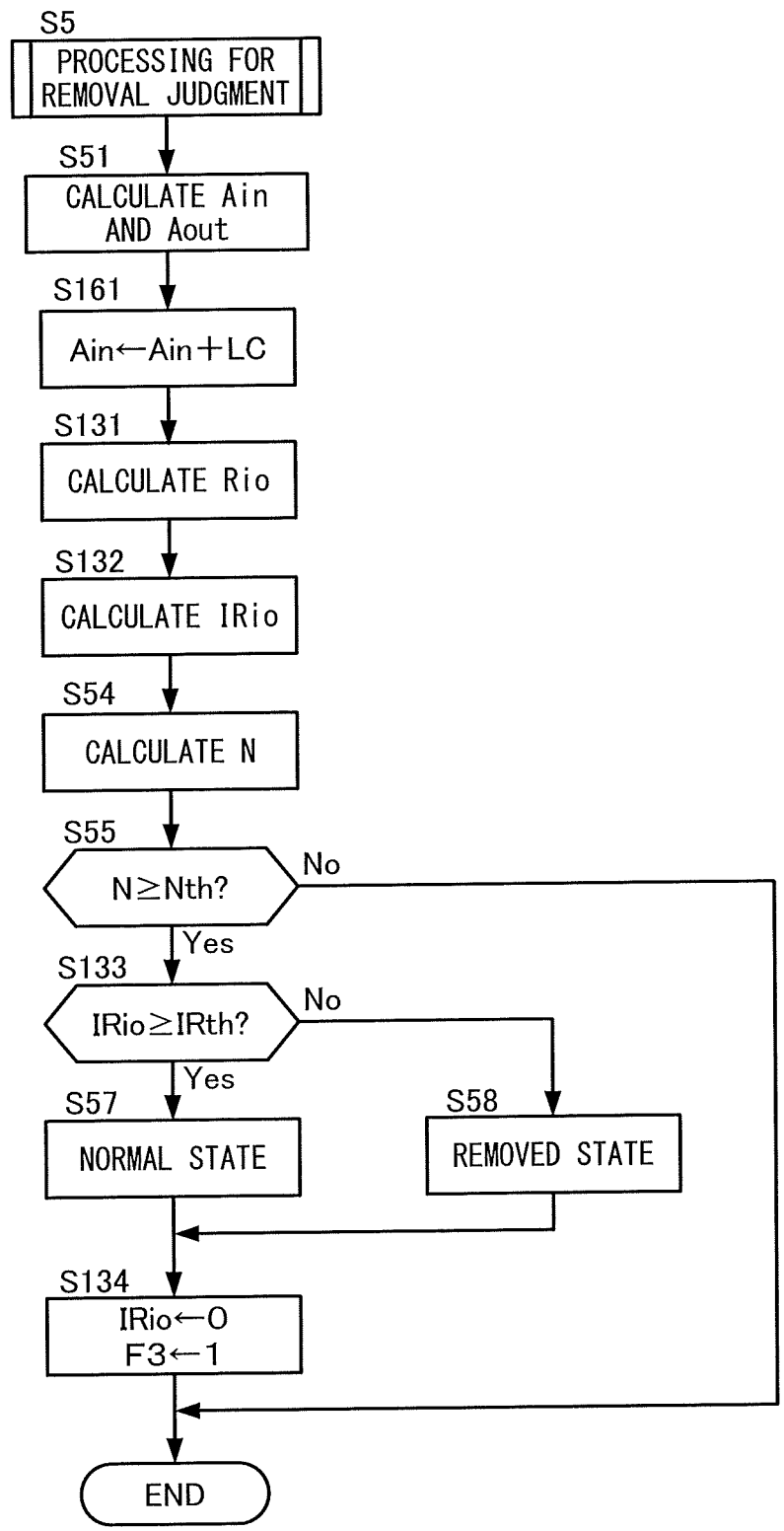
FIG. 29 is a flow chart for explaining details of processing for removal judgment according to the 11th embodiment of the present invention.

FIG. 29 is a flowchart for explaining details of processing for removal judgment according to the present embodiment. Note that in FIG. 29, the contents of the processing from step S5 to step S58 and the contents of the processing from step S131 to step S133 are contents similar to the processing explained above in the first embodiment and the ninth embodiment, so here explanations will be omitted.

At step S161, the electronic control unit 200 adds the learning coefficient LC to the rate of change over time Ain of the first exhaust temperature calculated at step S51 to correct it to the rate of change over time Ain when the response speed of the first exhaust temperature sensor 53 was the average level response speed.

According to the present embodiment explained above, it is possible to learn the response speed of the first exhaust temperature sensor 53 and, based on the learning results, correct the rate of change over time Ain of the first exhaust temperature to the rate of change over time Ain of the first exhaust temperature when the response speed of the first exhaust temperature sensor 53 was the average level response speed. For this reason, it is possible to reduce the effect of variation of the response speed of the first exhaust temperature sensor 53, so it is possible to keep the accuracy of judgment of whether the state is a removed state from deteriorating due to variation in the response speed of the first exhaust temperature sensor 53.

12th Embodiment

Next, a 12th embodiment of the present invention will be explained. The present embodiment differs from the above embodiments in the contents of the processing for run condition judgment. Below, the points of difference will be focused on in the explanation.

In the above-mentioned 11th embodiment, if there is variation in the response speeds of the exhaust temperature sensors 53 and 54, the values of the ratio Rio and the differential value Dio will vary and the accuracy of judgment of whether the state is a removed state will fall, so the response speed of the first exhaust temperature sensor 53 was learned so as to keep accuracy of judgment of whether the state is a removed state from falling.

As opposed to this, the inventors engaged in intensive research and as a result discovered that even if there is variation in the response speeds of the exhaust temperature sensors 53 and 54, there is a timing at which the variation in the values of the ratio Rio and the differential Dio becomes smaller. Therefore, in the present embodiment, it was decided to calculate the ratio Rio or differential value Dio based on the first exhaust temperature and the second exhaust temperature detected at such a timing so as to keep the accuracy of judgment as to whether the state is a removed state from falling.

Figure 30A:
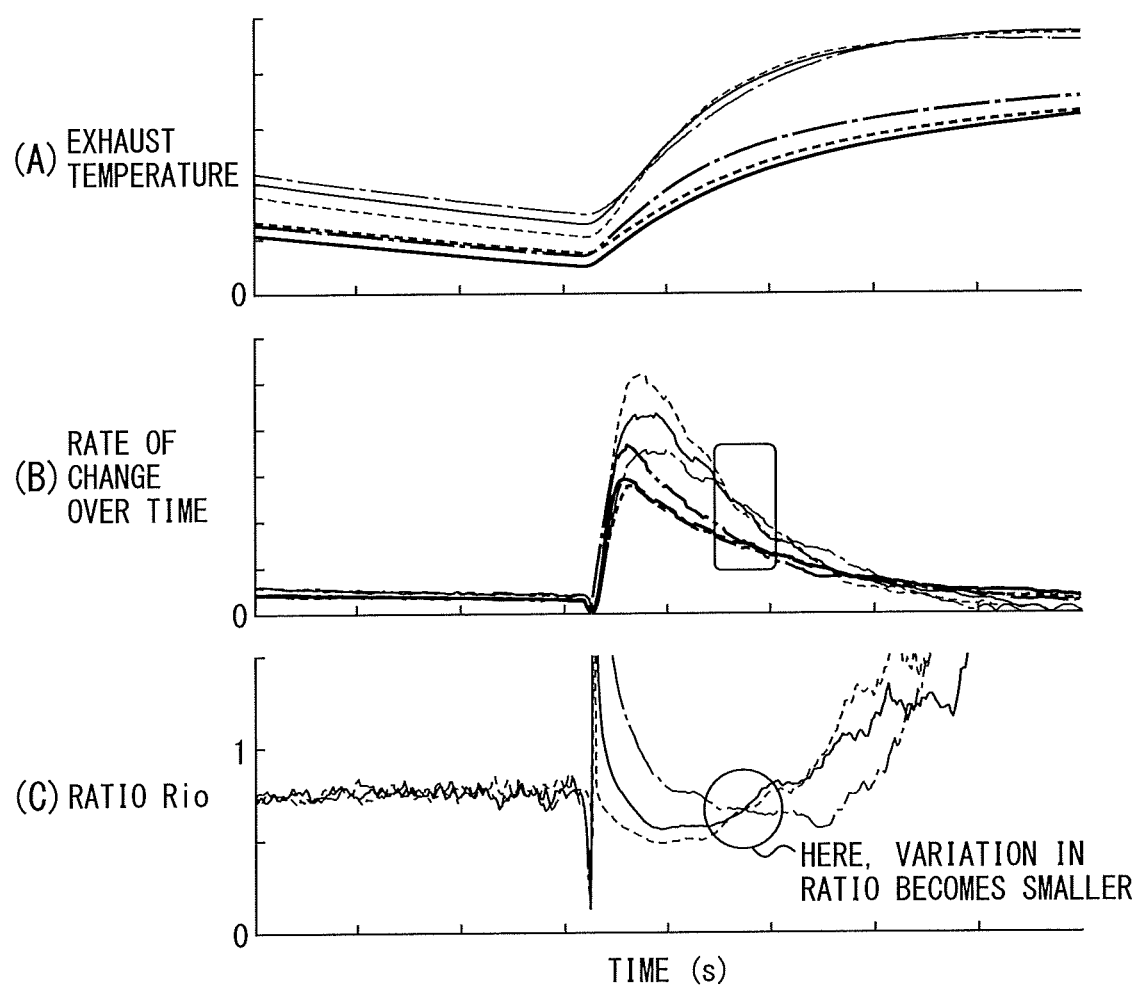
FIG. 30A is a time chart showing, for each response speed of each exhaust temperature sensor, the temperature changes etc. of a first exhaust temperature and a second exhaust temperature at a time of acceleration in a case where the internal combustion engine is being operated in a normal state where the PM trapping device is not removed.

FIG. 30A and FIG. 30B are time charts showing for each speed of response of the exhaust temperature sensors 53 and 54 the changes in temperature of the first exhaust temperature and the second exhaust temperature etc. at the time of acceleration when the internal combustion engine 100 is being operated in a normal state where the PM trapping device 50 is not removed.

Note that, in (A) and (B) of FIG. 30A and FIG. 30B, the regular lines show the temperature change and rate of change over time Ain of the first exhaust temperature. Further, among the regular lines, the solid lines, broken lines, and one-dot chain lines respectively show the case where the response speed of the first exhaust temperature sensor 53 was the average response speed, the case where it was faster than the average level response speed, and the case where it was slower than the average level response speed. Further, the bold lines show the temperature change of the second exhaust temperature and the rate of change over time Aout. Further, among the bold lines, the solid lines, broken lines, and one-dot chain lines respectively show the case where the response speed of the second exhaust temperature sensor 54 was the average response speed, the case where it was faster than the average level response speed, and the case where it was slower than the average level response speed.

Further, (C) of FIG. 30A shows the ratio Rio calculated based on the rate of change over time Ain of the first exhaust temperature and the rate of change over time Aout of the second exhaust temperature, while (C) of FIG. 30B shows the differential value Dio calculated based on the rate of change over time Ain of the first exhaust temperature and the rate of change over time Aout of the second exhaust temperature.

Further, at (C) of FIG. 30A and FIG. 30B, the solid lines show the ratio Rio and the differential value Dio in the case where the response speeds of the exhaust temperature sensors 53 and 54 are respectively the average level response speeds. The broken lines show the ratio Rio and the differential value Dio when the response speed of the first exhaust temperature sensor 53 is faster than the average level response speed and the response speed of the second exhaust temperature sensor 53 is slower than the average level response speed. The one-dot chain lines show the ratio Rio and the differential value Dio when the response speed of the first exhaust temperature sensor 53 is slower than the average level response speed and the response speed of the second exhaust temperature sensor 53 is faster than the average level response speed.

As shown in (B) of FIG. 30A and FIG. 30B, it is learned that even if there is variation in the response speed of the first exhaust temperature 53, there is a timing at which the rate of change over time Ain of the first exhaust temperature becomes generally the same value regardless of the response speed and that further, similarly, even if there is variation in the response speed of the second exhaust temperature 54, there is a timing at which the rate of change over time Aout of the second exhaust temperature becomes generally the same value regardless of the response speed. Further, as shown in (C) of FIG. 30A and FIG. 30B, it is learned that the ratio Rio and the differential value Dio calculated at this timing become substantially the same values regardless of the response speeds.

Therefore, if calculating the ratio Rio or the differential value Dio based on the first exhaust temperature and the second exhaust temperature detected at this timing, even if there is variation in the response speeds of the exhaust temperature sensors 53 and 54, it will be possible to reduce the variation in the value of the ratio Rio or the differential value Dio. As a result, even if there was variation in the response speeds of the exhaust temperature sensors 53 and 54, it is possible to keep the accuracy of judgment of whether the state is a removed state from being liable to fall.

Figure 31:
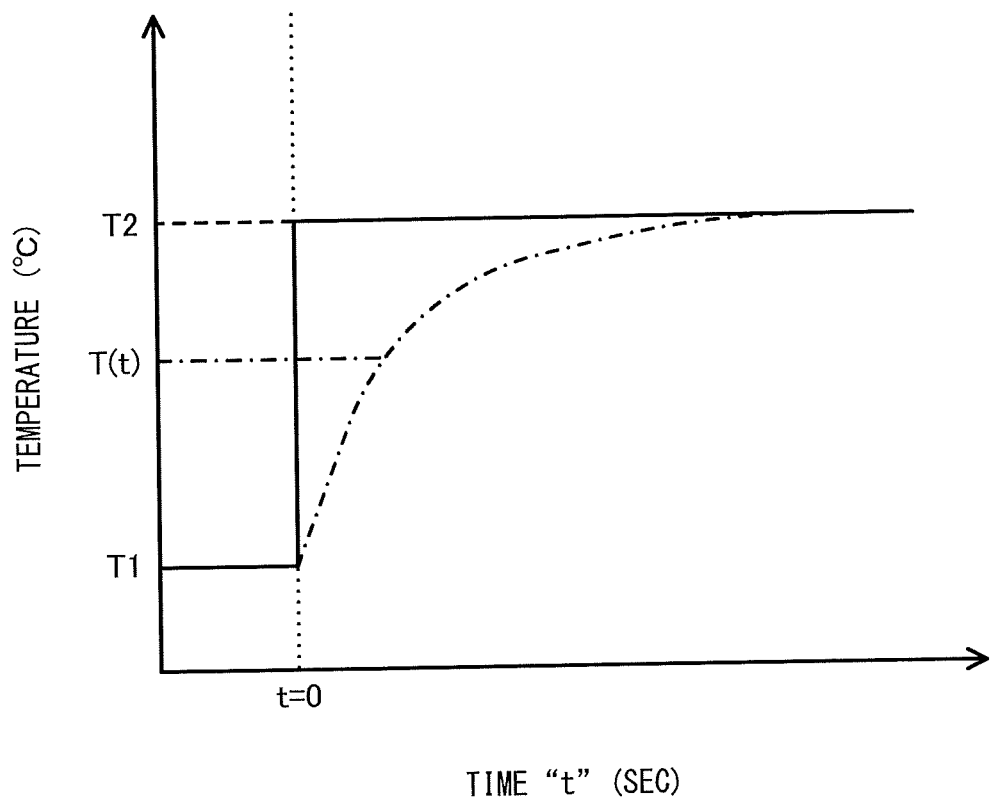
FIG. 31 is a view explaining response of a certain exhaust temperature sensor.

Note that, the fact that regardless of the response speeds of the exhaust temperature sensors 53 and 54, there will be a timing at which rate of change over time Ain of the first exhaust temperature and the rate of change over time Aout of the second exhaust temperature become generally the same values can be derived from a mathematical equation such as the following:

That is, as shown in FIG. 31, if designating as T(t) the exhaust temperature at a certain time "t" detected by an exhaust temperature sensor having the same structure as the exhaust temperature sensors 53 and 54 when the temperature around that exhaust temperature sensor rises from a predetermined first temperature T1 (corresponding to exhaust temperature at start of acceleration) to a second temperature T2 (corresponding to exhaust temperature at end of acceleration, the exhaust temperature T(t) can be expressed by the following formula (5) defining the response time constant of the exhaust temperature sensor as "τ":

[Mathematical 1]

$$T(t) = (T2 - T1)(1 - e^{\frac{t}{\tau}}) + T1 \qquad (5)$$

Therefore, the rate of change over time of the exhaust temperature at a certain time "t" (that is, dT(t)/dt) becomes as shown in the following formula (6):

[Mathematical 2]
$$\frac{dT(t)}{dt} = \frac{T2-T1}{\tau} \times e^{\frac{t}{\tau}} \quad (6)$$

Figure 32:
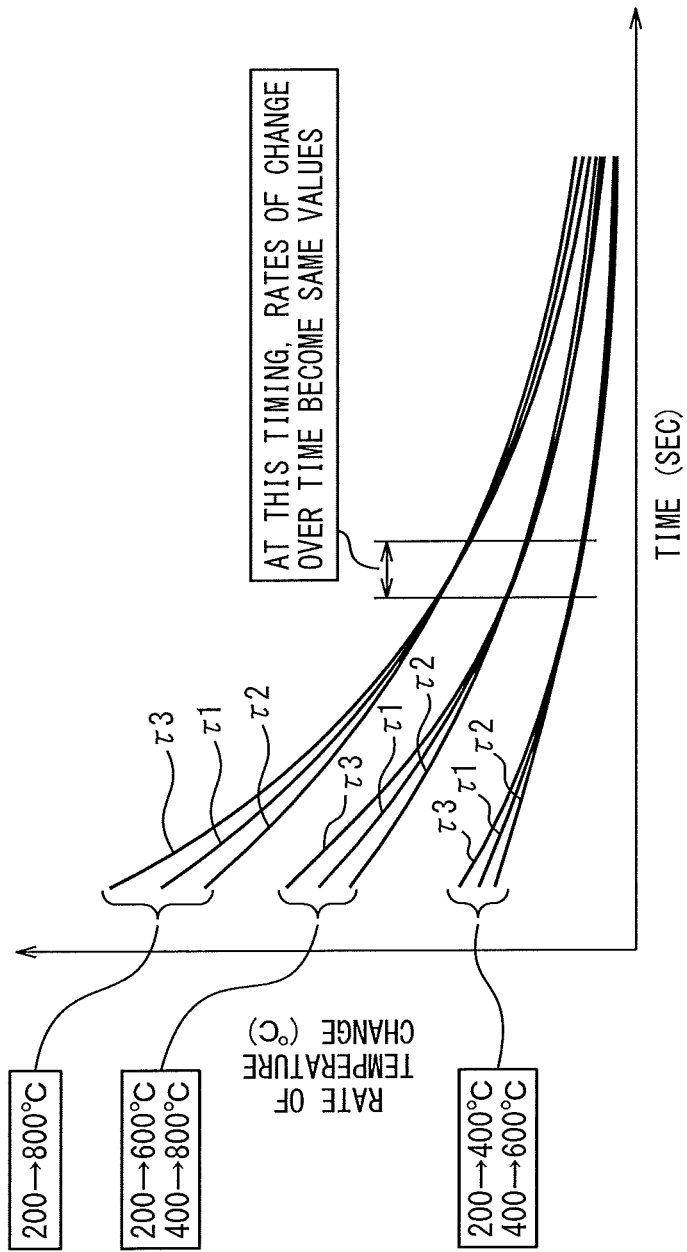
FIG. 32 is a view showing calculation of a rate of change over time of exhaust temperature in a certain time period every response time constant of the exhaust temperature sensor based on a numerical formula.

Further, FIG. 32 is a view showing calculation of the rate of change overtime of the exhaust temperature at a certain time "t" for each response time constant when the temperature around the exhaust temperature sensor rises from 200[° C.] to 400[° C.], 600[° C.], or 800[° C.] and the rate of change over time of the exhaust temperature at a certain time "t" for each response time constant when the temperature around the exhaust temperature sensor rises from 400[° C.] to 600[° C.] or 800[° C.] based on this formula (6).

Note that, in FIG. 32, the response time constant τ1 is the response time constant in the case where the response speed of the exhaust temperature sensor is an average level response speed. The response time constant τ2 is the response time constant in the case where the response speed of the exhaust temperature sensor is faster than the average level response speed. The response time constant τ3 is the response time constant in the case where the response speed of the exhaust temperature sensor is slower than the average level response speed.

As shown in FIG. 32, it will be understood that even if there is variation in the response speeds of the exhaust temperature sensors or even if the temperature difference between the first temperature T1 and the second temperature T2 differ, the rate of change over time of the exhaust temperature becomes the same value at generally the same timing.

Here, regardless of the response speeds of the exhaust temperature sensors 53 and 54, the timing when the rate of change over time Ain of the first exhaust temperature and the rate of change over time Aout of the second exhaust temperature become generally the same value, as will be understood from FIG. 30A or FIG. 30B, may for example by made after the elapse of a predetermined time from the time of start of acceleration.

Further, as will be understood from FIG. 30A or FIG. 30B, regardless of the response speeds of the exhaust temperature sensors 53 and 54, the timings where the rates of change over time of the exhaust temperatures Ain and Aout reach inflection points (timing when slants of rates of change over time change from positive to negative), that is, timings when time derivative values Ain' (=second order time derivative of first exhaust temperature) and Aout' (=second order time derivative of second exhaust temperature) of rates of change over time Ain and Aout become zero are generally the same, so the timings may also be made after the elapse of a predetermined time.

Therefore, in the present embodiment, it was decided to calculate the ratio Rio or the differential value Dio based on the first exhaust temperature and the second exhaust temperature detected when a predetermined time has elapsed from the timing used as the reference (that is, for example, the time of start of acceleration or the timing at which the second order time derivative of the exhaust temperature of the different exhaust temperatures becomes zero).

Figure 33:
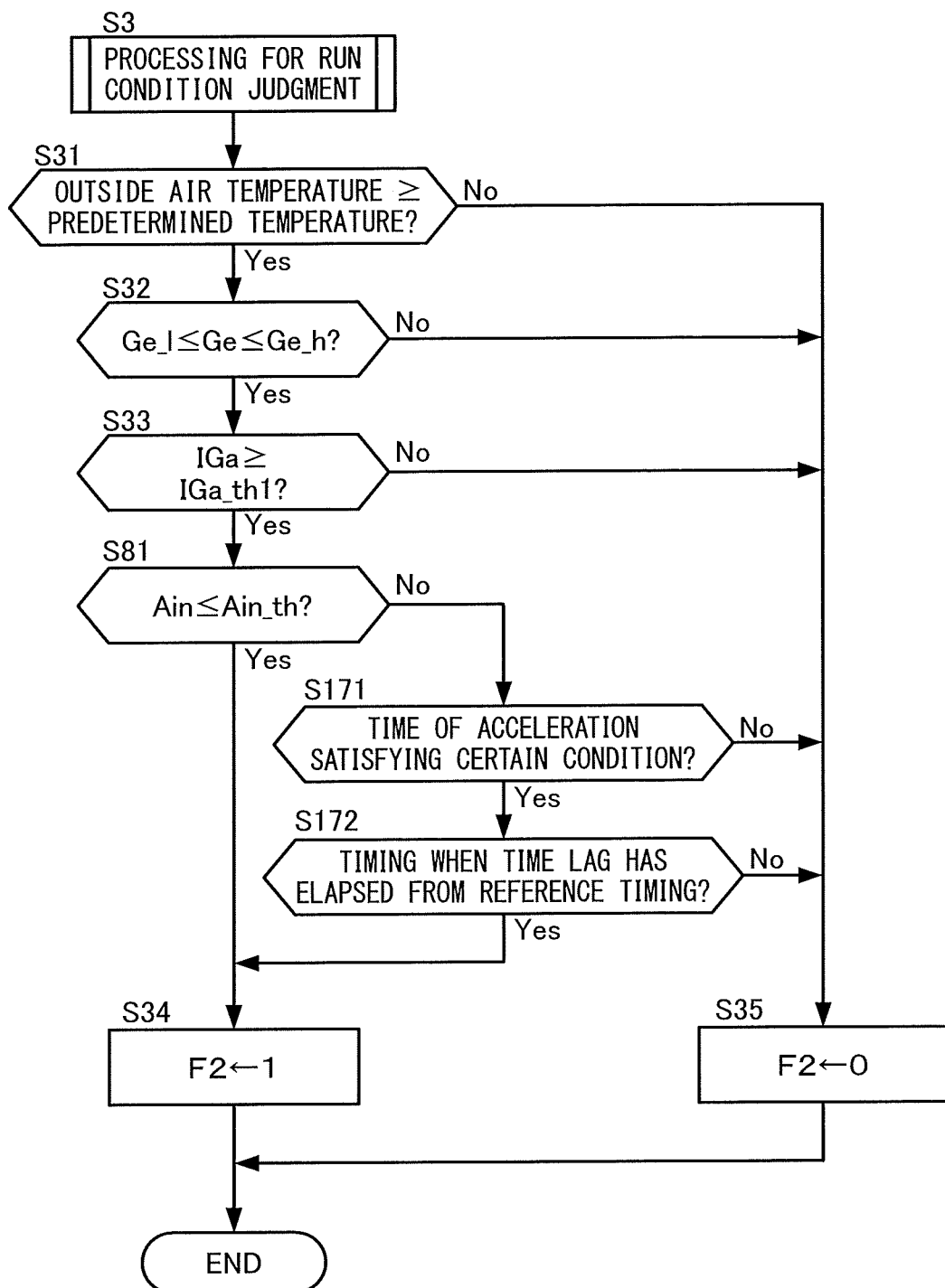
FIG. 33 is a flow chart for explaining details of processing for run condition judgment according to a 12th embodiment of the present invention.

FIG. 33 is a flowchart for explaining details of processing for run condition judgment according to the present embodiment. Note that in FIG. 33, the contents of the processing from step S31 to step S35 and the processing of step S81 are contents similar to the processing explained above in the first embodiment etc., so here explanations will be omitted.

At step S171, the electronic control unit 200 judges if the time is that of acceleration satisfying a certain condition. In the present embodiment, the electronic control unit 200 judges if the time is that of acceleration (transition) where the flow rate of intake air Ga becomes a predetermined flow rate or more within a predetermined time from when the flow rate of intake air Ga of the internal combustion engine 100 increases. The electronic control unit 200 proceeds to the processing of step S172 if the time is that of acceleration satisfying a certain condition. On the other hand, if the time is not that of acceleration satisfying a certain condition, the electronic control unit 200 proceeds to the processing of step S35.

Note that, the state of acceleration is limited in this way for the following reason. That is, in the later explained step S172, in judging whether the timing is that at which a predetermined time lag has elapsed from the reference timing, it is necessary to find the time lag in advance by experiments etc. If the state of acceleration differs, this time lag also changes. Therefore, the state of acceleration is limited so as to enable this time lag to be unambiguously determined.

At step S172, the electronic control unit 200 judges if the timing is that after a predetermined time lag elapses from a reference timing. The reference timing, as explained above, for example, can also be made the acceleration start timing and can also be made the timing when the second order time derivative of the exhaust temperatures becomes zero. If the timing is one where the predetermined time lag has elapsed from the reference timing, the electronic control unit 200 proceeds to the processing of step S34. On the other hand, if the timing is not one where the predetermined time lag has elapsed from the reference timing, the electronic control unit 200 proceeds to the processing of step S35.

The judgment part according to the present embodiment explained above is further configured to judge if the state is a removed state based on the difference of the rate of change over time Ain of the first exhaust temperature and the rate of change over time Aout of the second exhaust temperature when a predetermined condition stands. Further, in the present embodiment, as a predetermined condition, the state being a transitional one in which the flow rate of intake air Ga of the internal combustion engine 100 becomes a predetermined flow rate or more within a predetermined time from when the flow rate of intake air Ga increases and being one where a predetermined time lag has elapsed from changing to the transitional state or the state being a transitional one in which the flow rate of intake air Ga of the internal combustion engine 100 becomes a predetermined flow rate or more within a predetermined time from when the flow rate of intake air Ga increases and being one where a predetermined time lag has elapsed from when the time derivative Ain' of the rate of change over time Ain of the first exhaust temperature has become zero at the time of the transitional state.

As explained above, by calculating the ratio Rio or the differential value Dio based on the first exhaust temperature and the second exhaust temperature detected at this timing, even if there is variation in the response speeds of the exhaust temperature sensors 53 and 54, it is possible to reduce the variation in the values of the ratio Rio and the differential value Dio. As a result, even if there is variation in the response speeds of the exhaust temperature sensors 53 and 54, it is possible to keep the accuracy of judgment of whether the state is a removed state from falling.

13th Embodiment

Next, a 13th embodiment of the present invention will be explained. This embodiment differs from the above embodiments in the contents of the processing for run condition judgment. Below, the points of difference will be focused on in the explanation.

At the time of acceleration, different from the time of deceleration, load fluctuation easily occurs due to operation of the accelerator pedal by the driver. As a result, sometimes the first exhaust temperature does not uniformly rise, but rises once, then falls, then again rises. Therefore, if acquiring the ratio Rio or the differential value Dio at such a time of acceleration when the engine operating state is unstable, the ratio Rio or the differential value Dio will easily vary and the accuracy of the judgment of whether the state is a removed state is liable to fall.

Further, if acquiring the ratio Rio or differential value Dio at the time of acceleration, if the PM trapping device 50 becomes high in temperature, the heat of the exhaust will not be robbed by the PM trapping device 50 and the temperature difference between the first exhaust temperature and the second exhaust will become smaller, so the accuracy of the judgment of whether the state is a removed state is liable to fall.

Therefore, in the present embodiment, if judging if the state is a removed state at the time of acceleration, in such a scene, it is deemed that the run condition does not stand. Below, referring to FIG. 34, details of this processing for run condition judgment according to the present embodiment will be explained.

Figure 34:
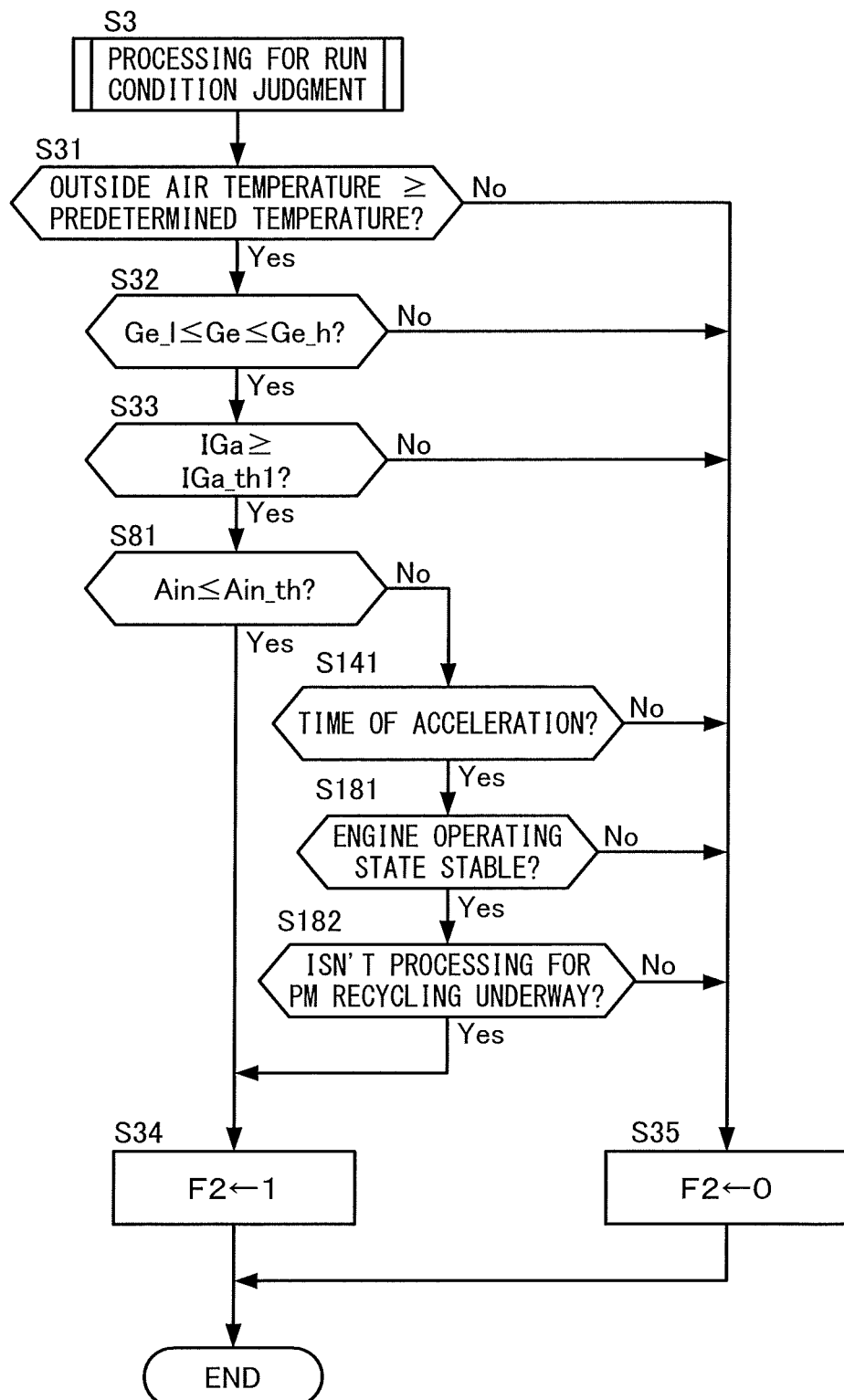
FIG. 34 is a flow chart for explaining details of processing for run condition judgment according to a 13th embodiment of the present invention.

FIG. 34 is a flowchart for explaining details of processing for run condition judgment according to the present embodiment. Note that in FIG. 34, the contents of the processing from step S31 to step S35, the processing of step S81, and the processing of step S141 are contents similar to the processing explained above in the first embodiment etc., so here explanations will be omitted.

At step S181, the electronic control unit 200 judges whether the engine operating state is stable. In the present embodiment, the electronic control unit 200 judges if the time derivative Ain' of the rate of change over time Ain of the first exhaust temperature (=second order time derivative of first exhaust temperature) falls within a predetermined range having zero as its center value. If the second order time derivative Ain' of the first exhaust temperature falls within the predetermined range, it judges that the engine operating state is stable and proceeds to the processing of step S34. This is because when the initial period of acceleration/deceleration or other momentary extent of load fluctuation is large, the rate of change over time Ain of the first exhaust temperature becomes large in slope and, as a result, the second order time derivative Ain' of the first exhaust temperature becomes larger, so if the second order time derivative Ain' of the first exhaust temperature falls within a predetermined range having zero as its center value, it is possible to judge that the extent of load fluctuation is small and the engine operating state is stable.

At step S182, the electronic control unit 200 judges if processing for burning off the PM inside the PM trapping device (so-called processing for PM regeneration) might be being performed. If not during processing for PM regeneration, the routine proceeds to the processing of step S34, while if during processing for PM regeneration, the routine proceeds to the processing of step S35. This is because if during processing for PM regeneration, the PM trapping device 50 becomes particularly high in temperature, so if ending up judging if the state is a removed state during processing for PM regeneration, the heat of the exhaust is not robbed by the PM trapping device 50, the temperature difference between the first exhaust temperature and the second exhaust becomes smaller, and the accuracy of judgment of whether the state is a removed state falls.

According to the present embodiment explained above, at the transition time when the flow rate of intake air Ga of the internal combustion engine 100 becomes a predetermined flow rate or more, the time derivative Ain' of the rate of change over time Ain of the first exhaust temperature ending up falling in a predetermined range including zero and the engine not being in the middle of processing for PM regeneration are added to the predetermined conditions when judging if the state is a removed state.

Due to this, even at the time of acceleration when fluctuations in load easily occur, it is possible to judge if the state is a removed state at the time of stable operating conditions. Further, at the time of acceleration, it is possible to prevent it being judged if the state is a removed state during processing for PM regeneration when the PM trapping device 50 becomes particularly high in temperature. Therefore, at the time of acceleration, it is possible to improve the accuracy of judgment at the time of judging if the state is a removed state.

Above, embodiments of the present invention were explained, but the embodiments only show part of the examples of application of the present invention and are not meant to limit the technical scope of the present invention to the specific configurations of the above embodiments.

For example, in the embodiments, removal of the PM trapping device 50 as the exhaust after-treatment system 30 was detected, but, for example, a similar technique may be used to detect removal of the catalyst device 40. That is, removal of a device having a certain degree of heat capacity attached to the exhaust pipe 22 can also be detected by the method explained in the above embodiments.

The invention claimed is:
1. A control device for an internal combustion engine, the internal combustion engine comprising:
   an engine body; and
   an exhaust after-treatment system installed in an exhaust passage of the engine body, wherein
the control device comprises:
   a first exhaust temperature calculation part configured to calculate a temperature of exhaust flowing into the exhaust after-treatment system as a first exhaust temperature;
   a second exhaust temperature calculation part configured to calculate a temperature of exhaust flowing out from the exhaust after-treatment system as a second exhaust temperature;
   a rate of change over time calculation part configured to calculate a rate of change over time of the first exhaust temperature and a rate of change over time of the second exhaust temperature; and
   a judgment part configured to judge if the exhaust after-treatment system is in a removed state removed from the exhaust passage based on a difference between the rate of change over time of the first exhaust temperature and the rate of change over time of the second exhaust temperature; and an engine stopping time calculation part configured to calculate an engine stopping time from when the internal combustion engine is stopped to when it is restarted, wherein the judgment part is further configured so as to judge if a state is the removed state based on the difference of the rate of change over time of the first exhaust temperature and the rate of change over time of the second exhaust temperature when a predetermined condition stands, and the predetermined condition is that the engine stopping time before the internal combustion engine is restarted is a predetermined time or more and an exhaust flow rate after the internal combustion engine is restarted is a predetermined flow rate or more.

2. The control device for the internal combustion engine according to claim 1, wherein the control device further comprises an elapsed time calculation part configured to calculate an elapsed time from when the internal combustion engine is restarted, and as the predetermined condition, the elapsed time being the predetermined time or more is further included.

3. The control device for the internal combustion engine according to claim 1, wherein, as the predetermined condition, a temperature of the exhaust after-treatment system being a predetermined temperature or less is further included.

4. The control device for the internal combustion engine according to claim 1, wherein, as the predetermined condition, an integrated value of a flow rate of intake air from when the internal combustion engine is restarted being a predetermined integrated value or less is further included.

5. The control device for the internal combustion engine according to claim 1, wherein the internal combustion engine is mounted in a hybrid vehicle.

6. The control device for the internal combustion engine according to claim 1, wherein the control device is further comprises an idling stop control part configured to perform idling stop control for automatically making the internal combustion engine stop when a predetermined engine stop condition stands and automatically making the internal combustion engine restart when a predetermined engine restart condition stands.

7. The control device for the internal combustion engine according to claim 1, wherein the first exhaust temperature calculation part comprises a drop calculation part configured to calculate an amount of drop of exhaust temperature falling in a process of flowing through the exhaust passage from a position where a first exhaust temperature sensor provided in the exhaust passage at an upstream side from the exhaust after-treatment system in an exhaust flow direction is attached to the exhaust after-treatment system, and the first exhaust temperature calculation part calculates the detection value of the first exhaust temperature sensor minus the amount of drop as the first exhaust temperature.

8. The control device for the internal combustion engine according to claim 7, wherein the drop calculation part calculates the amount of drop based on the flow rate of intake air and outside air temperature.

* * * * *